(12) United States Patent
Kato

(10) Patent No.: US 8,942,546 B2
(45) Date of Patent: Jan. 27, 2015

(54) INFORMATION PROCESSING APPARATUS, INFORMATION PROCESSING METHOD AND RECORDING MEDIUM

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/243,568

(22) Filed: Sep. 23, 2011

(65) Prior Publication Data

US 2012/0014677 A1 Jan. 19, 2012

Related U.S. Application Data

(63) Continuation of application No. 10/503,129, filed as application No. PCT/JP03/15627 on Dec. 5, 2003, now Pat. No. 8,064,746.

(30) Foreign Application Priority Data

| Dec. 18, 2002 | (JP) | 2002-367235 |
| Mar. 12, 2003 | (JP) | 2003-67025 |
| May 9, 2003 | (JP) | 2003-132193 |

(51) Int. Cl.
*H04N 5/92* (2006.01)
*H04N 5/93* (2006.01)
(Continued)

(52) U.S. Cl.
CPC ........ *H40N 21/42646* (2013.01); *G11B 27/034* (2013.01); *G11B 27/105* (2013.01);
(Continued)

(58) Field of Classification Search
USPC .......... 386/326, 332, 333, 334, 336, 346, 353
See application file for complete search history.

(56) References Cited

U.S. PATENT DOCUMENTS 5,740,304 A * 4/1998 Katsuyama et al. .......... 386/241
6,122,436 A 9/2000 Okada et al.
(Continued)

FOREIGN PATENT DOCUMENTS

EP 1 041 566 A1 10/2000
EP 1 551 180 A1 7/2005
(Continued)

OTHER PUBLICATIONS

Office Communication issued Oct. 11, 2011, in Patent Application No. 03777314.0.
(Continued)

*Primary Examiner* — Daquan Zhao
(74) *Attorney, Agent, or Firm* — Oblon, Spivak, McClelland, Maier & Neustadt, L.L.P.

(57) ABSTRACT

An information processing apparatus, as a recording apparatus, formulates a Clip Information file of a still picture file (TS file), made up by plural still pictures, and a PlayList, composed of plural PlayItems, indicating the replay path of a slide show, and records the information on a DVD along with the TS file. The Clip Information file has an EP_map, as a table indicating the relationship of correspondence between the value of the presentation time stamp PTS of the transport stream TS and the source packet number SPN in the TS the PTS value indicates. The information processing apparatus, as a reproducing apparatus, reads out and reproduces the data address of the TS, represented by the replay start time IN_time and the replay end time OUT_time of the PlayItem.

16 Claims, 38 Drawing Sheets

(51) Int. Cl.

| | | |
|---|---|---|
| *G11B 27/034* | (2006.01) | |
| *G11B 27/10* | (2006.01) | |
| *G11B 27/32* | (2006.01) | |
| *H04N 9/804* | (2006.01) | |
| *H04N 9/82* | (2006.01) | |
| *H04N 21/43* | (2011.01) | |
| *H04N 21/432* | (2011.01) | |
| *H04N 21/433* | (2011.01) | |
| *H04N 21/81* | (2011.01) | |
| *H04N 21/845* | (2011.01) | |
| *H04N 21/8547* | (2011.01) | |
| *H04N 21/482* | (2011.01) | |
| *H04N 5/89* | (2006.01) | |
| *H04N 5/783* | (2006.01) | |
| *H04N 5/85* | (2006.01) | |
| *H04N 9/806* | (2006.01) | |
| *H04N 9/808* | (2006.01) | |

(52) U.S. Cl.
CPC ............ *G11B27/329* (2013.01); *H04N 9/8042* (2013.01); *H04N 9/8227* (2013.01); *H04N 21/4307* (2013.01); *H04N 21/4325* (2013.01); *H04N 21/4334* (2013.01); *H04N 21/8153* (2013.01); *H04N 21/8455* (2013.01); *H04N 21/8547* (2013.01); *H04N 9/8205* (2013.01); *H04N 21/4825* (2013.01); *H04N 21/4828* (2013.01); *H04N 21/8456* (2013.01); *G11B 2220/216* (2013.01); *G11B 2220/2562* (2013.01); *H04N 5/85* (2013.01); *H04N 9/8063* (2013.01); *H04N 2009/8084* (2013.01)

USPC ........... 386/326; 386/332; 386/333; 386/334; 386/336; 386/346; 386/353

(56) References Cited

U.S. PATENT DOCUMENTS

| | | | |
|---|---|---|---|
| 6,529,584 | B1 | 3/2003 | Ravago et al. |
| 6,529,683 | B2 * | 3/2003 | Mori et al. ................... 386/246 |
| 7,260,313 | B2 * | 8/2007 | Date et al. ................... 386/333 |
| 7,366,066 | B2 | 4/2008 | Nakamura et al. |
| 7,496,279 | B2 | 2/2009 | Um et al. |
| 7,496,280 | B2 | 2/2009 | Sugimura et al. |
| 2002/0033889 | A1 | 3/2002 | Miyazaki |
| 2002/0135607 | A1 | 9/2002 | Kato et al. |

FOREIGN PATENT DOCUMENTS

| | | |
|---|---|---|
| EP | 1 643 765 A1 | 4/2006 |
| JP | 10-271444 | 10/1998 |
| JP | 11-331739 | 11/1999 |
| JP | 2000-3561 | 1/2000 |
| JP | 2001-339682 | 12/2001 |
| JP | 2000-158972 | 5/2002 |
| JP | 2002-158972 | 5/2002 |
| WO | WO 2004/047103 A1 | 6/2004 |

OTHER PUBLICATIONS

European Office Action issued Jun. 27, 2012 in Patent Application No. 03 777 314.0.

U.S. Appl. No. 13/240,744, filed Sep. 22, 2011, Kato.

* cited by examiner

FIG.12A

Clip Information file file_id = 1
file_name = ABCD0001.JPG
file_size = n1 [bytes]
horizontal_size = h1
vertical_size = v1 file_id = 2
file_name = ABCD0001.PNG
file_size = n2 [bytes]
horizontal_size = h2
vertical_size = v2 file_id = 3
file_name = ABCD0002.JPG
file_size = n3 [bytes]
horizontal_size = h3 file_id = 4
file_name = ABCD0003.JPG
file_size = n4 [bytes]
horizontal_size = h4
vertical_size = v4 file_id = 5
file_name = ABCD0003.PNG
file_size = n5 [bytes]
horizontal_size = h5
vertical_size = v5

FIG.12B

| ABCD0001.JPG | ABCD0001.PNG | ABCD0002.JPG | ABCD0003.JPG | ABCD0003.PNG |

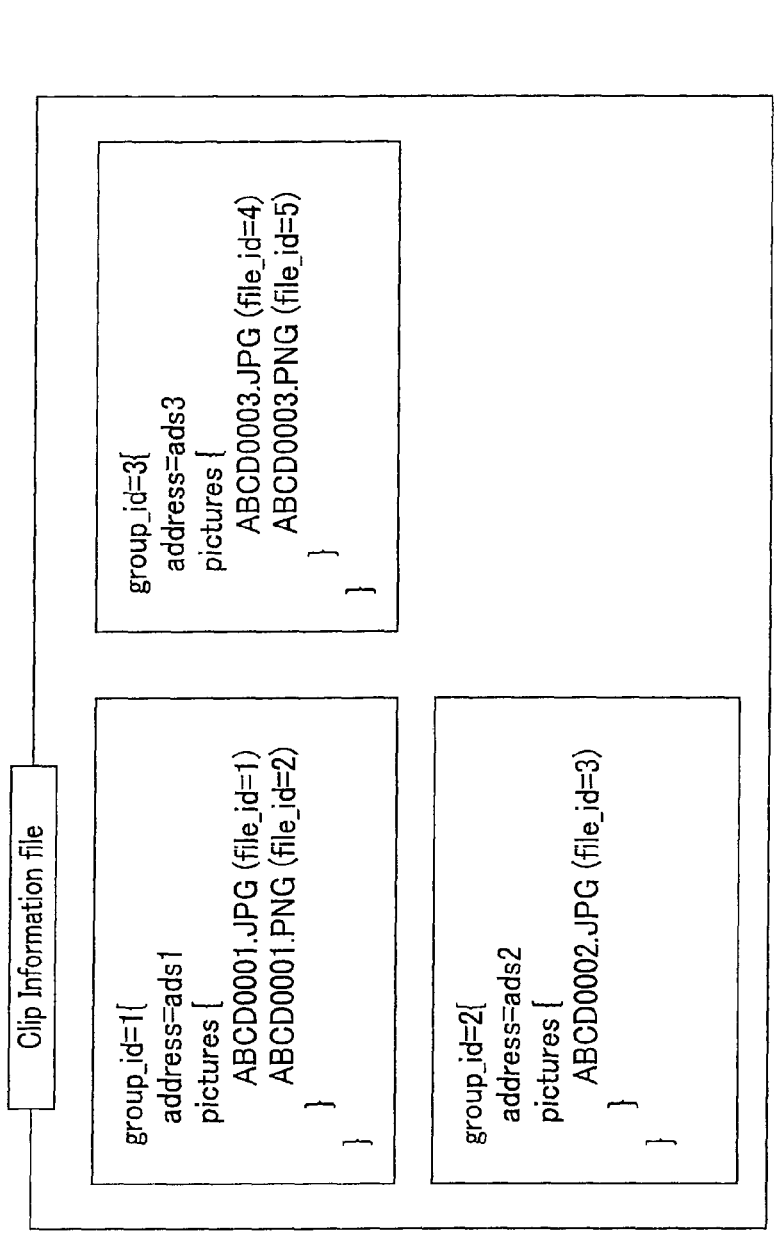
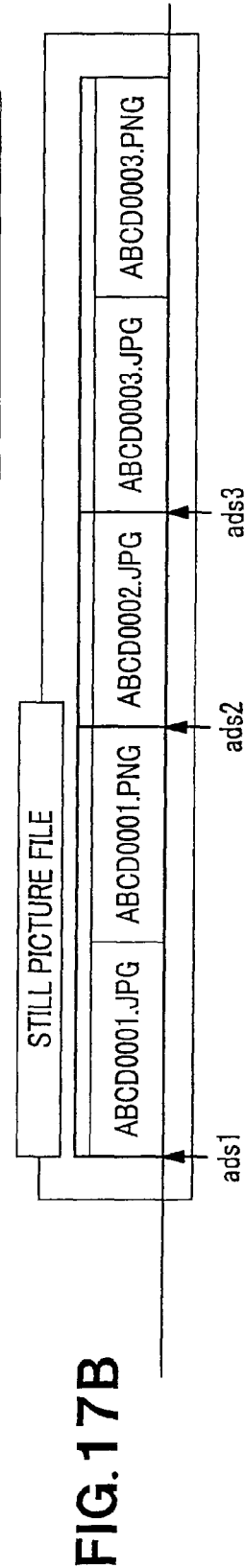
FIG. 17A
FIG. 17B

INFORMATION PROCESSING APPARATUS, INFORMATION PROCESSING METHOD AND RECORDING MEDIUM

CROSS REFERENCE TO RELATED APPLICATION

This application is a continuation of U.S. application Ser. No. 10/503,129, filed Apr. 20, 2005, and is based upon and claims the benefit of prior Japanese Patent Application No. 2002-367235, filed in Japan on Dec. 18, 2002, Japanese Patent Application No. 2003-067025, filed in Japan on Mar. 12, 2003 and Japanese Patent Application No. 2003-132193, filed in Japan on May 9, 2003, the entireties of which are incorporated by reference herein.

TECHNICAL FIELD

This invention relates to a recording medium, having recorded thereon data composed of still pictures used for a so-called slide show adapted for continuously reproducing the still pictures, and the subsidiary information therefor, an information processing method, an information processing apparatus and a program for recording and/or reproducing the data.

BACKGROUND ART

The DVD video format has realized continuous reproduction of still pictures (so-called slide show). The respective still picture signals are encoded to an intra-frame picture (I-picture) of the MPEG2 (Moving Picture Experts Group 2) video and multiplexed in a MPEG2 program. By multiplexing the I-pictures with audio data and sub-pictures into an MPEG2 program stream, the audio data and the sub-pictures may be synchronized and reproduced in the slide show. This slide show is reproduced at a preset timing based on the presentation time stamp.

The program stream for the DVD video has a structure with a VOBU (video object unit) as a unit. This conventional DVD data structure is described in, for example, the Japanese Laid-Open Patent Publication H10-271444. FIG. 1 hereof schematically shows the structure of a DVD video program stream of the conventional example 1. Referring to FIG. 1, the DVD video program stream is managed in terms of the VOBS (video object set) as a unit, which is used as a unit in, for example, a workpiece of a motion picture. This VOBS is composed of plural video objects (VOB), and is a unit of data recorded as a set or a group on a disc. The VOB is composed of plural cells, each being a unit for a scene or a cut in, for example, the motion picture. Each cell is composed of plural VOBUs (video object units). The VOBU has the duration of 0.4 to 1.2 second in terms of the moving picture. In this VOBU, there are contained one or more GOPs (groups of pictures) of the MPEG2 format.

The VOBU includes a Navigation pack (N-PCK), as a pack including the management information of VOBU. This Navigation pack is placed at the leading end of each VOBU. The Navigation pack includes VOBU_SRI (VOBU Search Information) and SP_SYNCA. The VOBU_SRI includes a leading address of VOBU reproduced in N seconds (N being an integer) before and after the replay time of VOBU containing the VOBU_SRI. The SP_SYNCA includes the address information of the sub-picture reproduced in synchronism with the video of the VOBU containing the SP_SYNCA. In reproducing e.g. a motion picture, this Navigation pack is first read in and replay is carried out based on the management information specified by the Navigation pack.

The VOBU includes, in addition to this NV_PCK, a video pack (V_PCK), as a pack having the main picture, an audio pack (A_PCK)A, as a pack including the speech data, and sub-picture pack (SP_PCK) S, as a pack including the sub-video data. The V_PCK, A_PCK and SP_PCK are compressed in a preset format, such as MPEG2, and recorded in this form on the recording medium. The VOBU may be exemplified by VOBU1 including a video pack shown for example in FIG. 1 (containing data of one I-picture and Sequence_end_ code) and VOBU2 not containing the video pack.

The VOBU, used in the slide show, may not contain the video pack (Video pack containing the MPEG2 video). With the VOBU not containing the video pack, for example, VOBU2 in FIG. 1, the video still from the previous VOBU is continued. The time duration of the continuation of the still display of the I-picture may be controlled by the navigation command.

The program stream of the DVD audio basically has the same structure as the structure shown in FIG. 1. The DVD audio format implements the mode (Browsable slide show) in which the audio replay is asynchronous to the progress of the slide show. In the Browsable slide show, if the user commands the player to proceed to the display of the next still picture by e.g. a remote controller, such that the still display time of each still picture is varied, audio replay is not interrupted, such that audio data is reproduced continuously. Thus, in the DVD audio, there is such a mode in which video replay is not synchronized to the audio replay.

Meanwhile, data of the format different from that of FIG. 1 is stated in the Japanese Laid-Open Patent Publication 2002-158972, filed previously in the name of the present inventors. This Publication is referred to below as a prior-art example 2. The application format of data recorded in the information processing apparatus disclosed in this prior-art example 2 has two layers, namely the PlayList and Clip, for management of the AV stream. The PlayList in the PlayList layer is referenced solely by the user who may refer to the PlayList to reproduce and edit data, such as video data. On the other hand, the Clip layer is used when the player reproduces the AV stream specified by the PlayList. Here, an AV stream and the subsidiary information of the AV stream, paired together, is one object, which is managed in terms of a Clip as a unit. An AV stream file is termed a Clip AV stream file and its subsidiary information is termed the Clip Information file. The Clip AV stream file and the Clip Information file are discretely recorded on a recording medium. The data management is facilitated by discretely recording and supervising the stream data and its subsidiary information.

However, with the data form shown in FIG. 1, the address information is embedded in the MPEG program stream, so that readout becomes time-consuming. That is, in determining the readout address of the still picture, stream data is read out from the disc, the data is analyzed by a host CPU of the player, and the address of the access point of the still picture is subsequently determined, thus protracting the readout operation. If the slide show may be realized using the format similar to that of the audio video data as stated in the aforementioned prior-art example 2, data management may be facilitated, while a recording and/or reproducing apparatus of an analogous structure may conveniently be employed.

DISCLOSURE OF THE INVENTION

It is an object of the present invention to provide a recording medium, having recorded data for realization of a so-called slide show, in a simplified manner, using still pictures of the format comparable to that of audio video data, and the subsidiary information therefor, an information processing method, an information processing apparatus and a program for recording and/or reproducing the data.

The present invention provides an information processing apparatus comprising attribute information formulating means for formulating the picture attribute information supervising respective still pictures of a set one or more of the still pictures, replay control information formulating means for formulating the replay control information specifying the replay path of the set of the still pictures; and recording means for recording the set of the still pictures, the picture attribute information associated with the set of the still pictures, and the replay control information associated with the set of the still pictures. The still pictures, the replay of which is controlled by the replay control information, are correlated with the still pictures recorded on the recording medium based on the picture attribute information.

According to the present invention, the picture attribute information and the replay control information are recorded on the recording medium, apart from the set of the still pictures. Thus, when the still pictures are read out and reproduced from the recording medium, the picture attribute information and the replay control information may be read out first and the respective still pictures of the set of the still pictures may be generated in a preset order, so that continuous replay of still pictures (so-called slide show) may be realized using a format similar to the conventional format used in recording the moving pictures.

The present invention also provides an information processing method comprising an attribute information formulating step of formulating the picture attribute information supervising respective still pictures of a set of one or more of the still pictures, a replay control information formulating step of formulating the replay control information specifying the replay path of the set of the still pictures, and a recording step of recording the set of the still pictures, the picture attribute information associated with the set of the still pictures, and the replay control information associated with the set of the still pictures. The still pictures, the replay of which is controlled by the replay control information, are correlated with the still pictures recorded on the recording medium based on the picture attribute information.

The present invention also provides an information processing method comprising a reproducing step of reproducing at least a fraction of still pictures of a set of one or more of the still pictures, from a recording medium, having recorded thereon the set of the still pictures, the picture attribute information corresponding thereto, and the replay control information, and a control step of referring to the picture attribute information to control the reproducing step in accordance with the replay control information. The picture attribute information includes the information supervising the respective still pictures of the set of the still pictures. The replay control information includes the information indicating a replay path formulated using the picture attribute information. The replay path specifies the replay of at least a fraction of the still pictures of the set of the still pictures.

The present invention also provides a program for having a computer execute preset operations, in which the program comprises a reproducing step of reproducing at least a fraction of still pictures of a set of one or more of the still pictures, from a recording medium, having recorded thereon the set of the still pictures, the picture attribute information corresponding thereto, and the replay control information, and a control step of referring to the picture attribute information to control the reproducing step in accordance with the replay control information. The picture attribute information includes the information supervising the respective still pictures of the set of the still pictures. The replay control information includes the information indicating a replay path formulated using the picture attribute information. The replay path specifies the replay of at least a fraction of the still pictures of the set of the still pictures.

The present invention also provides an information processing apparatus comprising attribute information formulating means for formulating the picture attribute information supervising each still picture of one or more still pictures forming a set of still pictures, replay control information formulating means for formulating the replay control information indicating a replay path specifying replay of at least a fraction of the still pictures of the set of still pictures, recording means for recording the set of the still pictures, the picture attribute information corresponding thereto and the replay control information, on a recording medium, reproducing means for reading out and reproducing the still pictures from the recording medium, and controlling means for referring to the picture attribute information for controlling the reproducing means in accordance with the replay control information. The replay control information formulating means formulates the replay control information using the picture attribute information.

The present invention also provides an information processing method comprising an attribute information formulating step of formulating the picture attribute information supervising each still picture of one or more still pictures forming a set of still pictures, a replay control information formulating step of formulating the replay control information indicating a replay path specifying replay of at least a fraction of the still pictures of the set of still pictures, a recording step of recording the set of the still pictures, the picture attribute information corresponding thereto and the replay control information, on a recording medium, a reproducing step of reading out and reproducing the still pictures from the recording medium, and a controlling step of referring to the picture attribute information for controlling the reproducing step in accordance with the replay control information. The replay control information formulating step formulates the replay control information using the picture attribute information.

The present invention also provides a program for having a computer execute preset operations, in which the program comprises an attribute information formulating step of formulating the picture attribute information supervising each still picture of one or more still pictures forming a set of still pictures, a replay control information formulating step of formulating the replay control information indicating a replay path specifying replay of at least a fraction of the still pictures of the set of still pictures, a recording step of recording the set of the still pictures, the picture attribute information corresponding thereto and the replay control information, on a recording medium, a reproducing step of reading out and reproducing the still pictures from the recording medium, and a controlling step of referring to the picture attribute information for controlling the reproducing step in accordance with the replay control information. The replay control information formulating step formulates the replay control information using the picture attribute information.

The present invention also provides a recording medium having recorded thereon a set of still pictures, composed of one or more still pictures, picture attribute information for supervising the respective still pictures of the set of still pictures, and the replay control information being formed using the picture attribute information. The replay control information indicates a replay path specifying the replay of at least a fraction of the still pictures of the set of still pictures.

BRIEF DESCRIPTION OF THE DRAWINGS

FIG. 12A shows the Clip Information in the first embodiment of the present invention and FIG. 12B shows an example of data arrangement on a recording medium (disc) of a still picture file pertinent to FIG. 12A.

FIG. 17A shows the Clip Information shown in FIG. 16.

FIG. 17B shows an example of data arrangement on a recording medium (disc) of a still picture file pertinent to FIG. 17A.

BEST MODE FOR CARRYING OUT THE INVENTION

Figure 1:
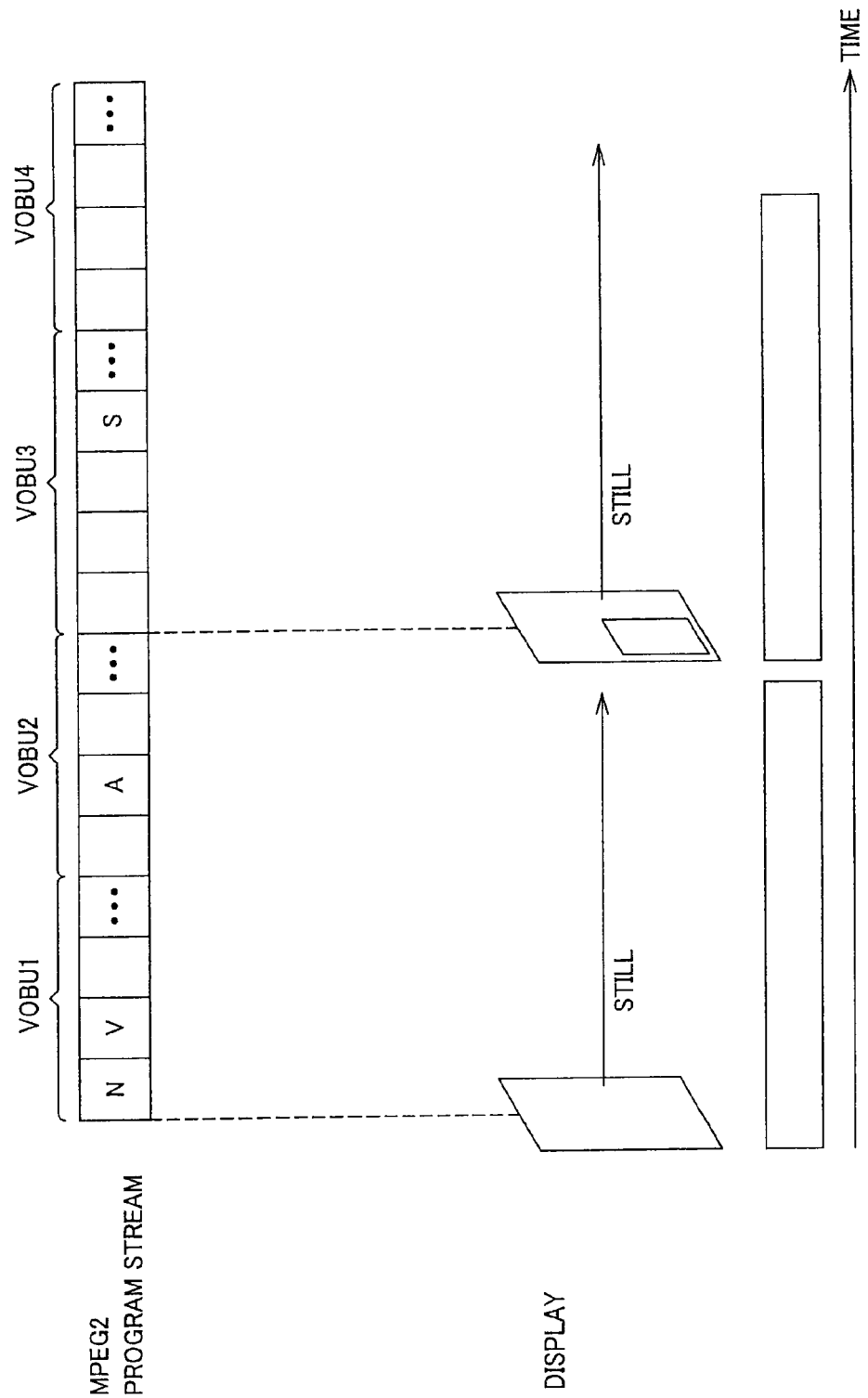
FIG. 1 is a schematic view showing the structure of a program stream of the conventional DVD video.

Referring to the drawings, preferred embodiments of the present invention are explained in detail. In these embodiments, the present invention is applied to an information processing apparatus for recording data for realization of a slide show for continuous replay of the still pictures, under utilization of the format for recording and/or reproducing moving pictures on a DVD, and to an information processing apparatus for reproducing such data.

(1) First Embodiment (1-1) Data Structure

Figure 2:
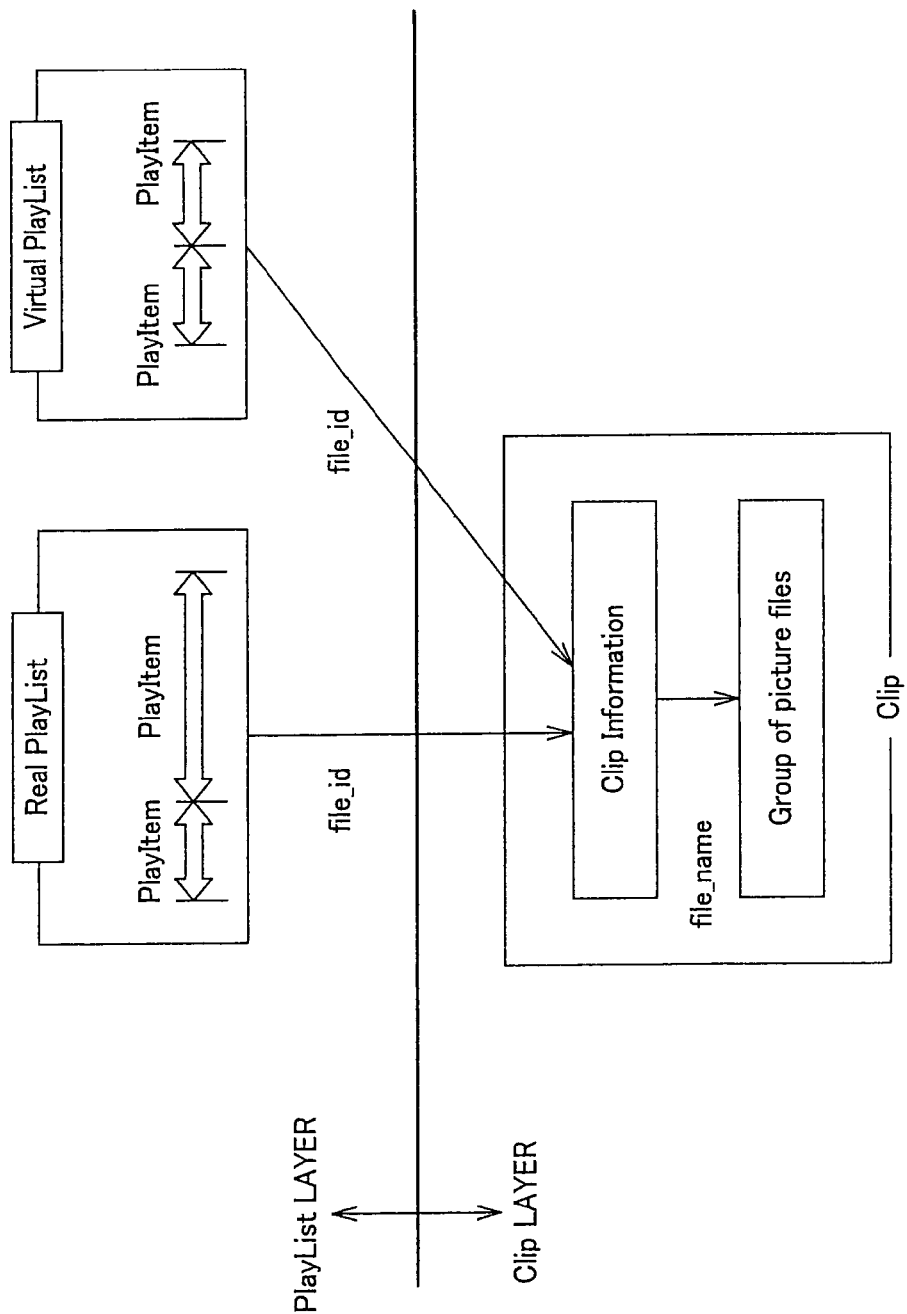
FIG. 2 shows a simplified structure of a still picture application format on a recording medium used in an information processing apparatus according to a first embodiment of the present invention.

Here, the structure of data recorded and/or reproduced by an information processing apparatus in the first embodiment of the present invention is explained. FIG. 2 shows a simplified structure of a still picture application format on a recording medium used in a recording and/or reproducing system according to the present invention. This format has a structure similar to that of the application format stated in the aforementioned conventional example 2, and is provided with two layers, namely a PlayList and Clip, for overseeing an AV stream.

In the present first embodiment, a pair of a still picture group (Group of picture files), as a still picture set, composed of one or more still pictures, and the subsidiary information for the still picture group, is thought of as an object, which object is supervised as a unit termed the Clip. The subsidiary information of the still picture group (picture attribute information) is termed the Clip Information.

A collection of replay domains of the slide show, employing still pictures in the Clip, is termed the PlayList. This PlayList is the replay control information indicating e.g. the replay path (reproducing route) specifying e.g. the replay sequence of still pictures. Consequently, the PlayList is formed by a collection of PlayItems.

There are two types of the PlayList, one of them being Real PlayList and the other being Virtual PlayList. The Real PlayList is deemed to co-own the portion of the still picture group of the Clip it is referencing. That is, the Real PlayList is taking up in the disc a data capacity equivalent to the portion of the still picture group of the Clip it is referencing. If a new picture group is recorded, it is automatically added to the Real PlayList. If a portion of the replay range of the Real PlayList is erased, the data of the portion of the still picture group of the Clip it is referencing is also erased. Conversely, the Virtual PlayList is deemed not to co-own the Clip data. If the Virtual PlayList is modified or erased, no changes occur in the Clip. In the description to follow, the Real PlayList and the Virtual PlayList are collectively termed the PlayList.

Figure 3:
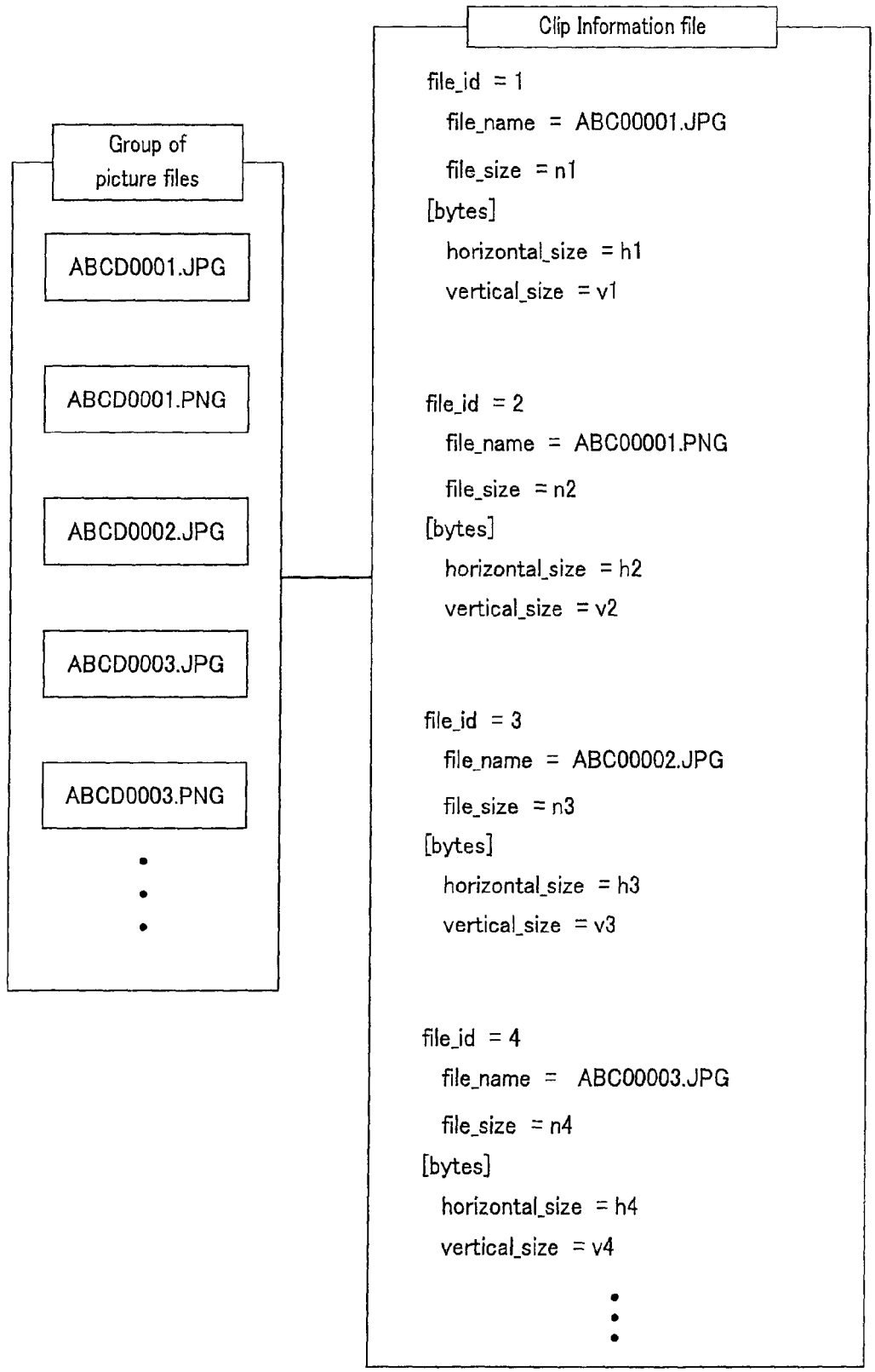
FIG. 3 shows an example of a group of picture files and the clip information therefor.

FIG. 3 shows an example of the group of picture files and the Clip Information thereof. In the present embodiment, one or more still picture files are supervised as a single Group of picture files. A Clip Information file, corresponding to the group of picture files, is provided. The Clip information includes the ID (file_id), as the information for still picture identification when reference is made to the still picture file, a filename (file_name) corresponding to file_id, a byte size (file_size) of the file, the number of pixels in the horizontal direction (horizontal_size) and that in the vertical direction (vertical_size) of each still picture, from one still picture file contained in the group of picture files to another.

Although the data form of the still picture is JPEG, PNG in FIG. 3, the data from may, of course, be any other suitable data form, provided that the data form used is that for still pictures.

In the present embodiment, two sorts of the slide show are explained. The first slide show, also referred to below as a time base slide show or a time base mode, is such a one in which the replay start time of each still picture is predetermined, and the second slide show, also termed a browsable slide show, is such a one in which the replay start time of each still picture is not predetermined, and the replay sequence is predetermined.

With the time base slide show, the replay of the respective slides proceeds automatically, except if the user commands a reproducing apparatus (player) to go on to the next slide, the slides are reproduced automatically, such that predetermined slides are reproduced at a preset timing on the time axis. Consequently, the replay time of the respective slides (duration of the still picture of the slide) is finite. In case audio data is reproduced simultaneously with the still picture, in the time base slide show, the audio reproduction may be synchronized with the replay of the still pictures.

With the browsable slide show, the replay sequence is predetermined, and the replay time of the respective slides is finite or infinite. If a given slide(s) has infinite replay time, the replay does not proceed to the next slide, except if the user commands a reproducing apparatus (player) to go on to the next slide. Consequently, the respective slides are not reproduced at preset timing on the time axis. If, in the browsable slide show, the audio data is reproduced simultaneously with the still picture, audio data is not synchronized with the replay of the still pictures.

(1-2) Slide Show with Predetermined Replay Start Time

The first slide show, having predetermined replay start timing of the respective still pictures, is now explained with reference to FIGS. 4 to 6.

(1-2-1) Slide Show: Only Still Pictures

Figure 4:
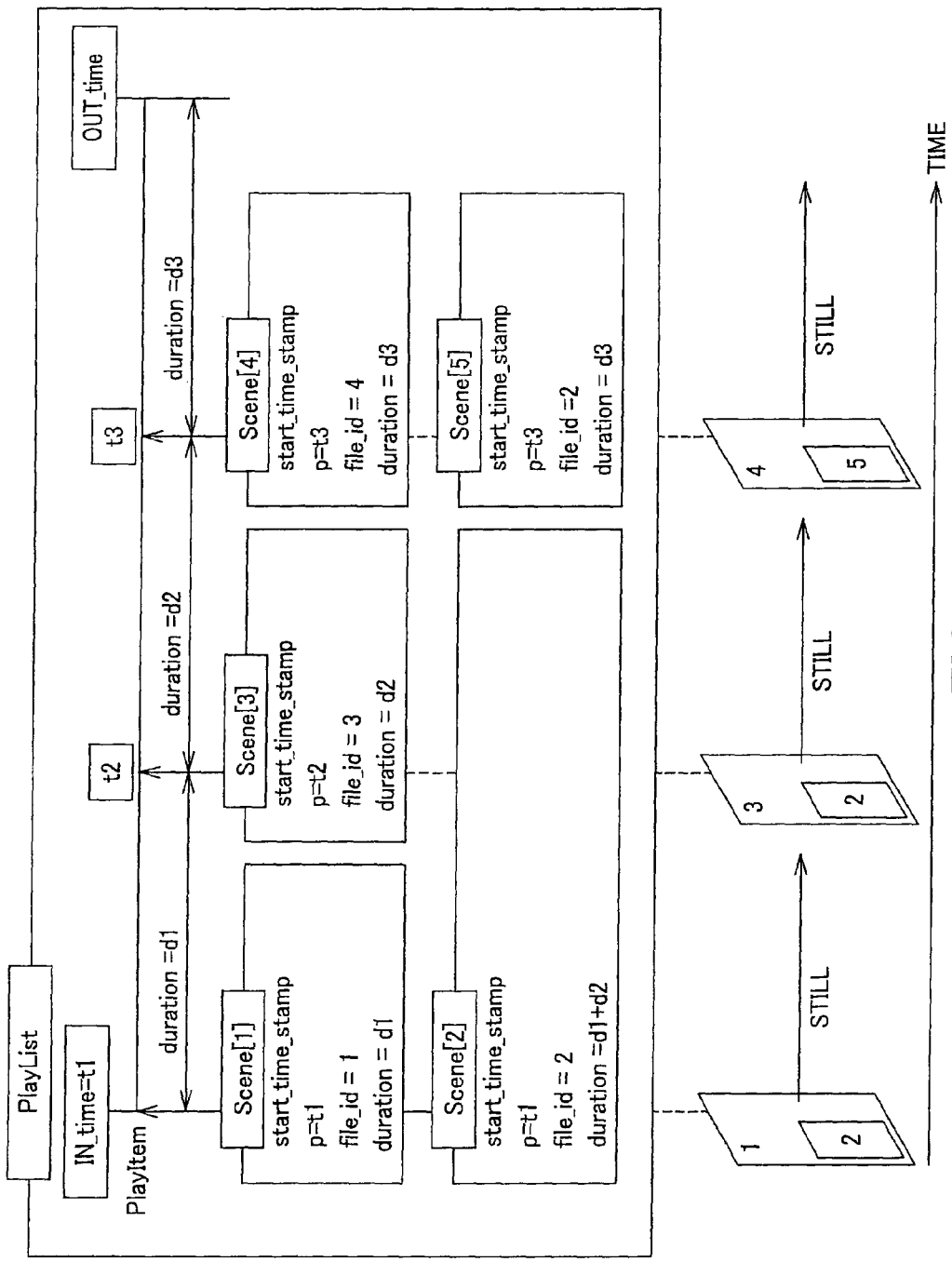
FIG. 4 shows an example of the PlayList of the slide show in the first embodiment of the present invention in which the reproduction start time of each still picture is predetermined, and the relationship between the still picture and the reproducing time.

FIG. 4 illustrates the slide show in which the replay start time of each still picture is predetermined, and shows an example of the PlayList in a slide show in which the replay start time of each still picture is predetermined, and the relationship between the still picture and the replay time, on upper and lower portions of the drawing, respectively. In the slide show in which the replay start time of each still picture is predetermined, each still picture is reproduced at a preset timing on the time axis.

The PlayList is made up of plural PlayItems. Referring to FIG. 4, each PlayItem has data of IN_time and OUT_time representing the replay domains of the slide show. The replay start time and the replay end time are specified by the data of IN_time and OUT_time. Each PlayItem has data for each of the still pictures making up the slide show. This data is referred to below as Scene. This Scene contains ID (file_id), which is the identification information of a still picture when reference is made to the Group of picture files in the Clip. These Scenes also contain the replay start time (start_time_stamp) in the PlayItem. The Scenes also include replay time in each Scene, that is, the display time (duration) as the still picture replay time of each still picture.

The replay time in each scene may be overlapped in the PlayItem. Each Scene may have plural file_id. For example, in the case shown in FIG. 4, Scene[2] overlaps with Scene[1] and Scene[3]. In this case, the picture of Scene[2] is displayed as it is overlapped with the pictures of both Scene[1] and Scene[2]. The number entered in each picture in FIG. 4 depicts file_id. Although the information on the overlap position of the respective pictures, that is, the information on the display position of the picture of the Scene[2] with the display position of the picture of the Scene[1], may be stated in the PlayList, it may also be stated in a file distinct from the PlayList, or in the Group of picture files referenced by the Scene[2].

Figure 5:
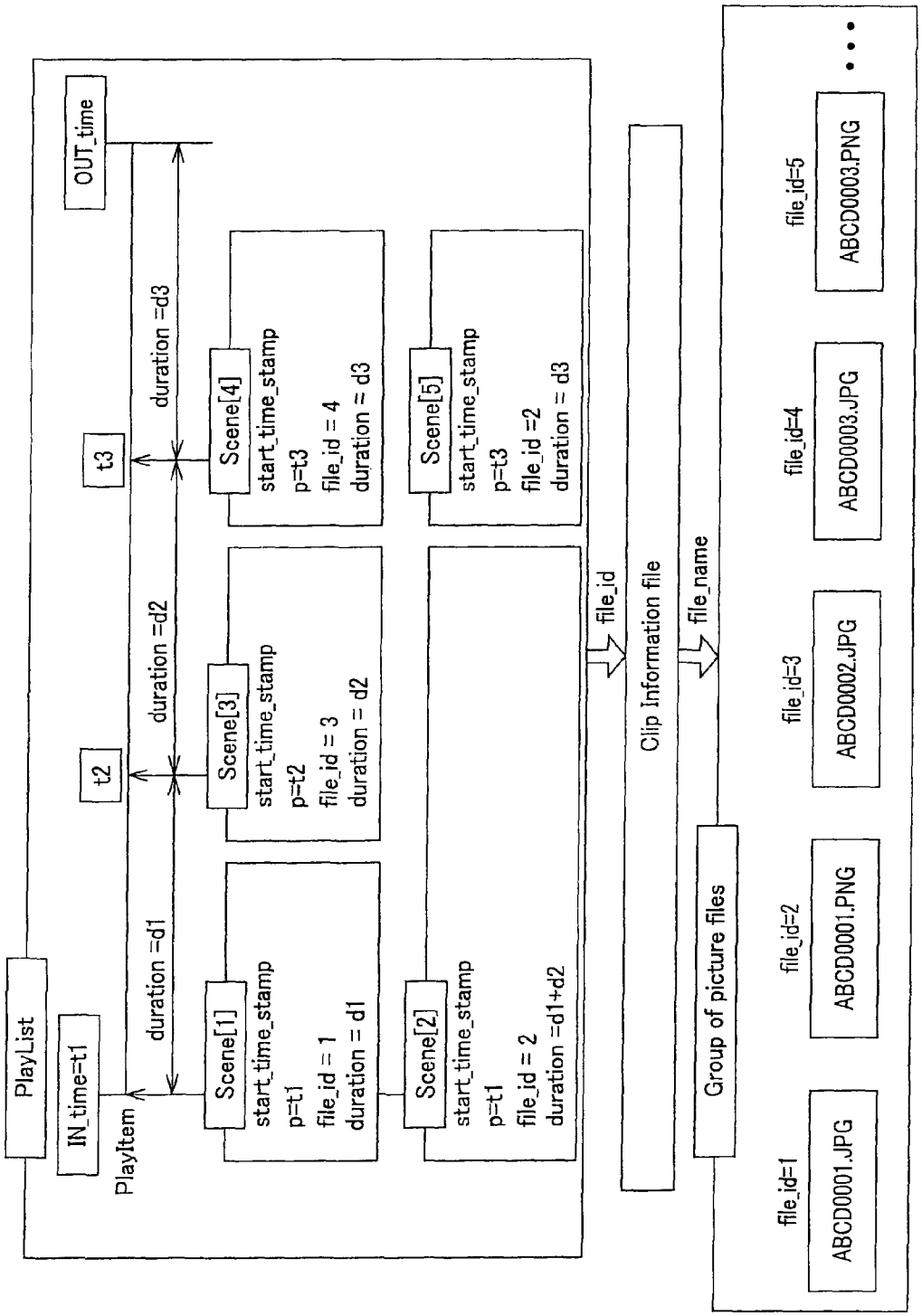
FIG. 5 shows the relationship between the PlayList of FIG. 4 and the Clip.

FIG. 5 shows the relationship between the PlayList and the Clip shown in FIG. 4. The PlayList references a still picture in the Clip, here the file ID. The Clip information shows the relationship between the still picture referenced by the PlayList (file ID) and its entity, herein a filename. That is, the Clip Information is referenced to identify the filename File_name of the ID (file_id) which is the still picture identification information stated in the PlayList. The still picture file of this filename is read out from the Group of picture files.

(1-2-2) Slide Show: Still Picture+Audio Data

The case in which audio data is synchronously reproduced in a slide show, where the replay start time of each still picture is predetermined, is now explained. FIG. 6 shows an illustrative structure in which the audio data is reproduced in timed relationship to the still pictures in the slide show. When the audio data is synchronized in the slide show, in which the replay start time of each still picture is predetermined, Sub-SubPlayItem (SubPath), as the audio replay control information, indicating the replay path for the audio data, indicating the audio replay path, is provided in the PlayList, apart from the PlayItem (MainPath), indicating the replay path of the still pictures.

This SubPlayItem includes the replay start time on the time axis (sync_start_PTS_of PlayItem). This SubPlayItem also includes the replay start time on the Clip referenced by the SubPlayItem (SubPlayItem_IN_time). The SubPlayItem also includes the replay start time on the Clip referenced by the SubPlayItem (SubPlayItem_OUT_time).

When the SubPlayItem indicates the access point to the inside of the Clip with the presentation time stamp (PTS), the Clip Information file is useful in finding out the address information by which the stream decoding is to be commenced in the AV stream file. The AV stream file of the Clip, referenced by the SubPlayItem, is an audio stream (auxiliary audio stream). This auxiliary audio stream is referred to below as a sub-audio stream.

That is, the Clip Information file includes a table stating the start time of the audio stream and the information indicating an address of a source packet (smallest access unit) corresponding to the start time and the end time (EP_map for audio). This table may be referenced to acquire the address corresponding to the specified presentation time PTS to read out and reproduce the audio data represented by this address. Since the SubPlayItem has the replay start time on the time axis of the PlayTime, representing the replay path for the still pictures, it is possible to reproduce the audio data in timed relationship to the still pictures in the slide show.

(1-3) Slide Show in which Only the Replay Sequence of the Still Pictures is Specified The second type of the slide show, specifying only the replay sequence of the still pictures (browsable slide show), is explained with reference to FIGS. 7 to 9.

(1-3-1) Slide Show: Only Still Pictures

Figure 6:
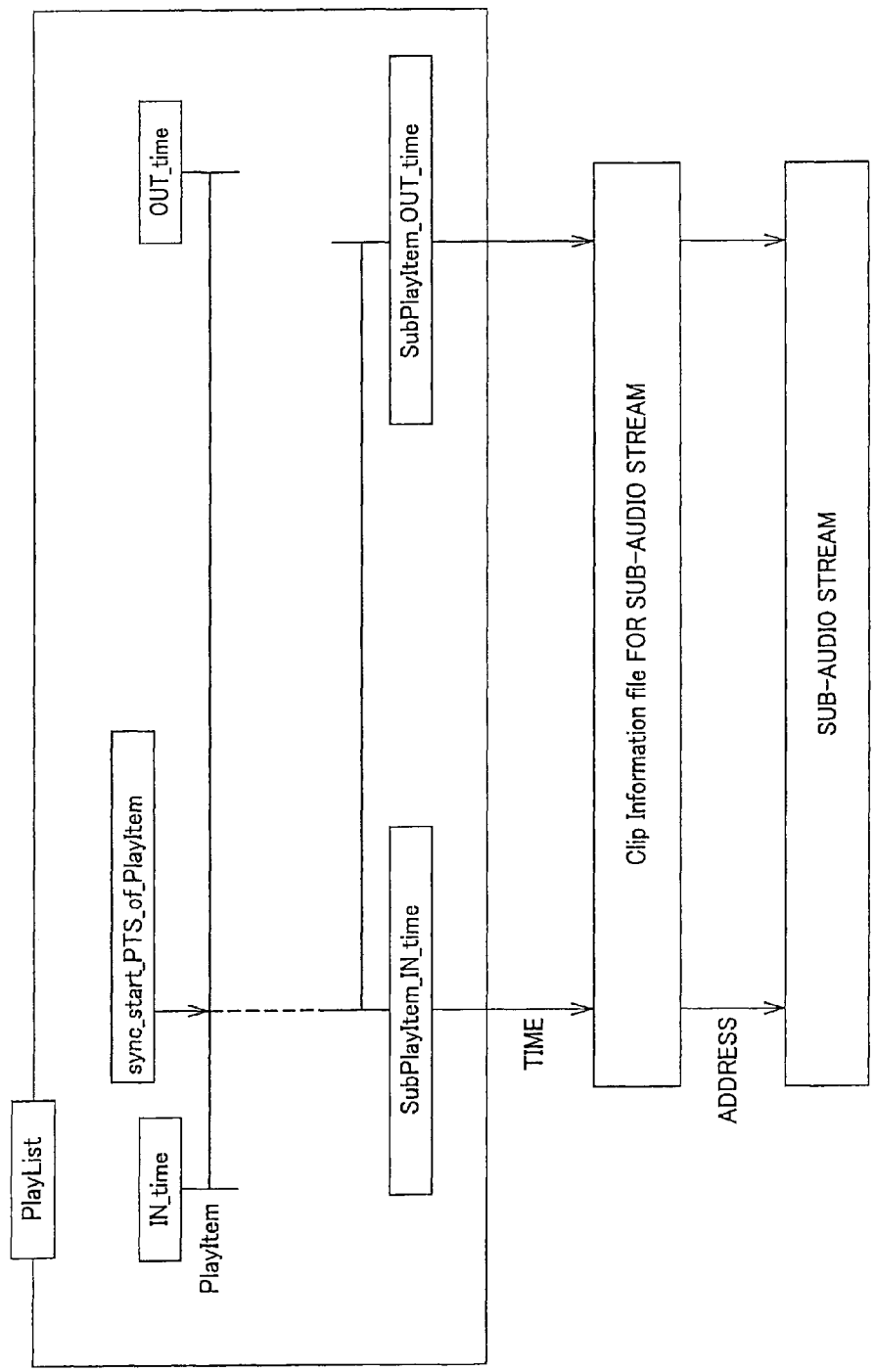
FIG. 6 shows an illustrative structure of the PlayList in the first embodiment of the present invention in case of reproducing the audio data in synchronism with a slide show in which the replay start time of each still picture is predetermined
Figure 7:
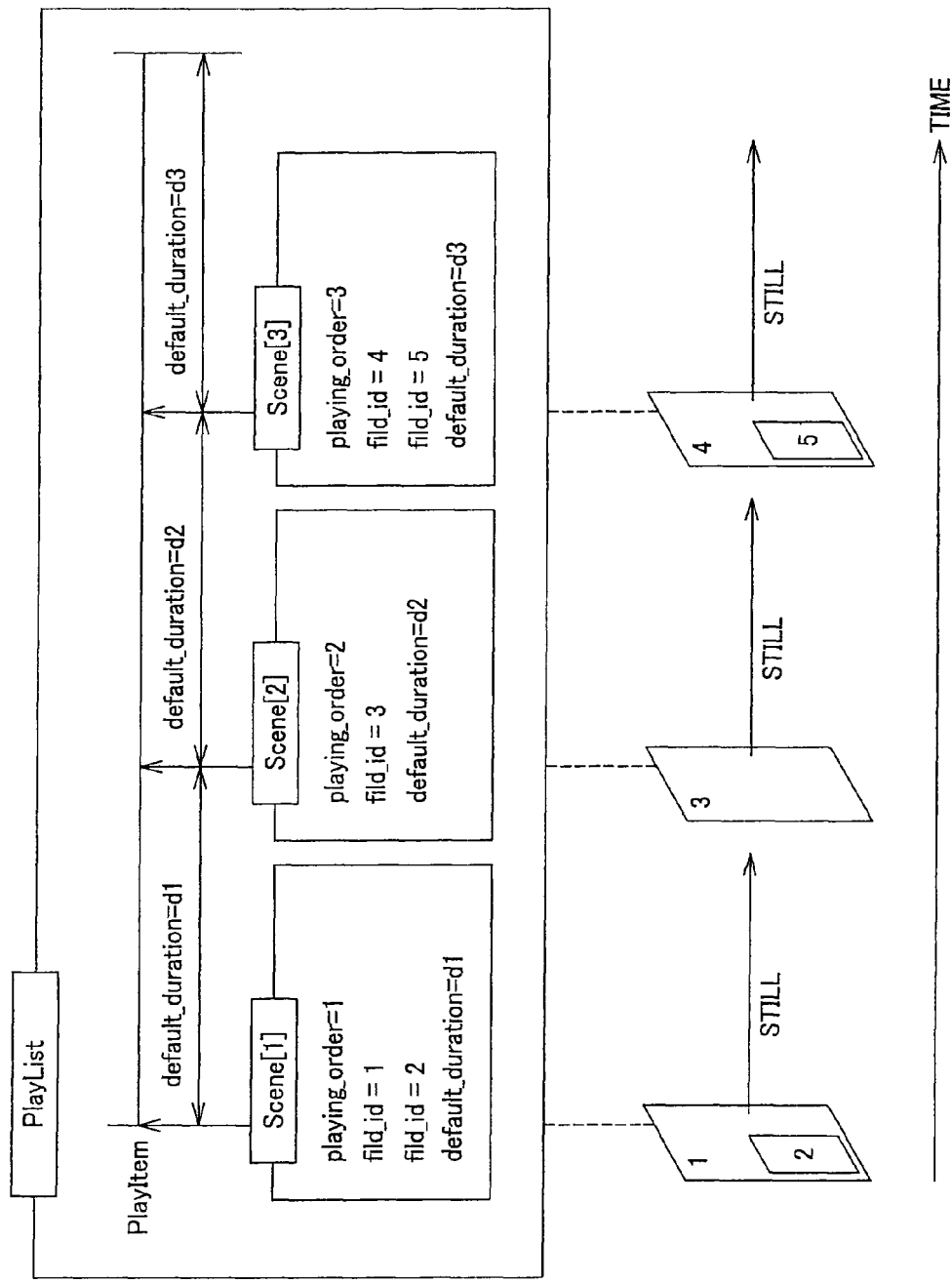
FIG. 7 shows an example of the PlayList in the slide show in the first embodiment of the present invention, in which only the replay sequence of the respective still pictures is predetermined, and the relationship between the still picture and the reproducing time.

FIG. 7 shows an example of the Browsable slide show and the relationship between the still pictures and the replay time. In this case, the Scene of the PlayItem of the Browsable slide show does not specify the replay start time for the still pictures, as shown in the upper portion of FIG. 7, in contradistinction from the case of FIGS. 4 to 6. There is provided the information specifying only the replay sequence of respective still pictures on the PlayItem, in place of the information of the replay start time (start_time_stamp) in the PlayItem of each still picture. Moreover, in contradistinction from the case of FIGS. 4 to 6, the PlayItem does not have IN_time nor OUT_time. The replay time (display time) of the still pictures making up the slide show is not determined. In this case, the user may specify the replay time for each Scene to the player.

In addition, each Scene of the PlayList may have the information indicating the default replay time, corresponding to the replay sequence in the PlayItem of each still picture, in place of the predetermined replay time (replay duration) as in FIG. 4. In this case, the player may reproduce the still pictures for the default replay time only in the absence of designation from the user. Thus, with the structure providing for the default replay time, it is possible for the user to command the player to transfer to the next still picture, over e.g. a remote controller, by way of performing control of the still pictures freely.

That is, each Scene of the PlayItem includes the information specifying the replay sequence of the Scene in the PlayItem (playing_order), an ID (file_ID) as the identification information of the still picture in referencing the Group of picture files in the Clip, and the default replay time (default_duration) of each Scene. Meanwhile, the default replay time may be the same or different from one still picture to another.

In the case of the Browsable slide show, as in the case of the slide show specifying the replay time at the outset, plural still pictures may be displayed in superposition on one scene. For example, if, in the case of FIG. 7, file_id=1 and file_id=2 are stated in the Scene [1], the picture of the file_id=2 is displayed on the picture of the file_id=1. In FIG. 7, the number in the picture depicts the file_id. Although the information on the display position of the picture of the file_id=2 and the picture of the file_id=1 on the picture may be stated in the PlayList, such information may be stated in a file distinct from the PlayList, or may be stated in the picture file referenced by the file_id=2.

Figure 8:
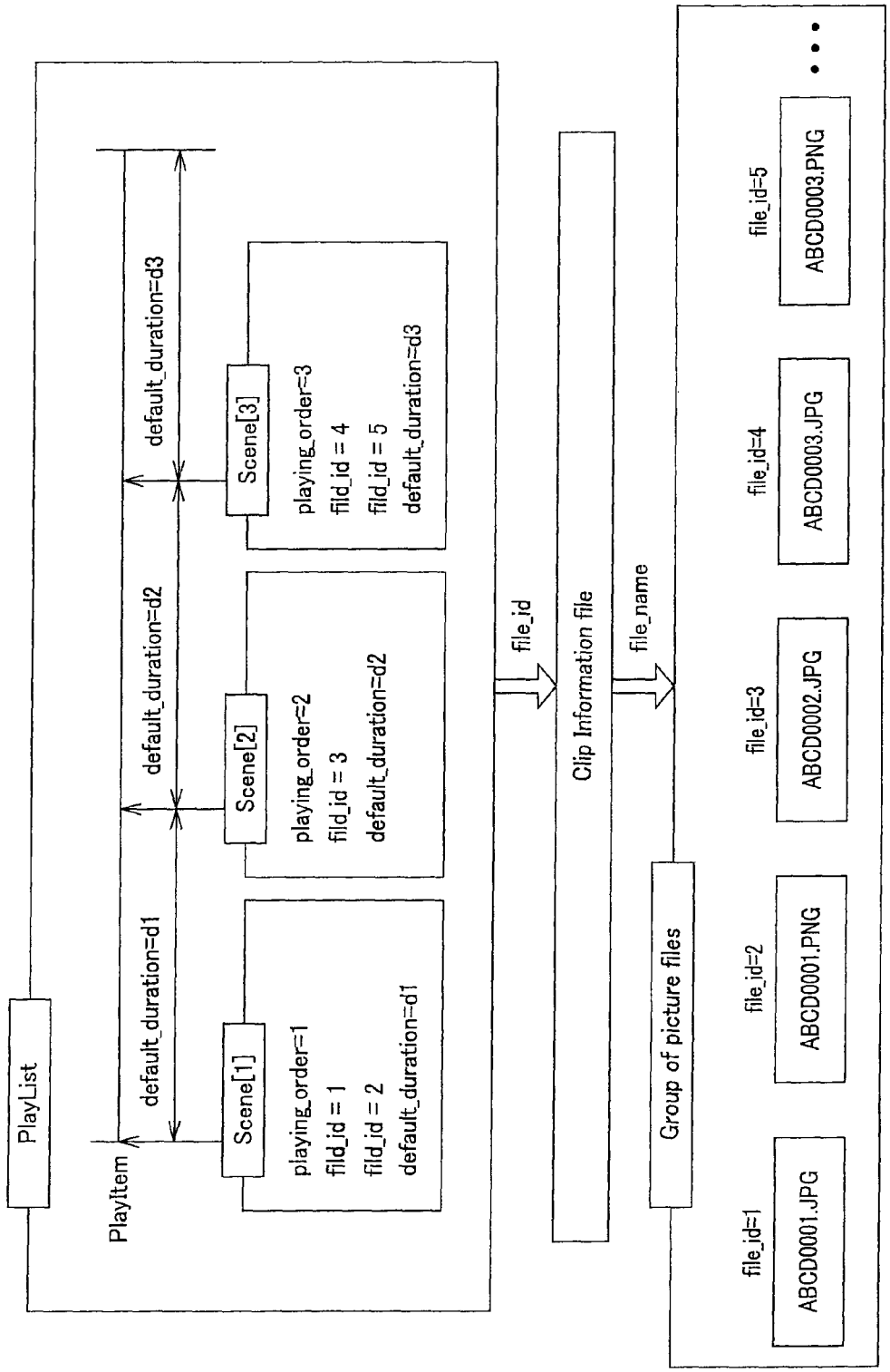
FIG. 8 shows an example of the relationship between the PlayList shown in FIG. 7 and the Clip.

FIG. 8 shows the typical relationship between the Clip and the PlayList shown in FIG. 7. The PlayList references the still picture in the Clip. The Clip information shows the relationship between the still picture referenced by the PlayList and its entity. That is, the Clip Information is referenced from the file ID for identifying the still picture in the Clip indicated by the PlayList and acquires the filename corresponding to this file ID to read out and reproduce the still picture of the filename from the Group of picture files.

(1-3-2) Slide Show: Still Picture+Audio Data

The case of asynchronously reproducing the audio data with respect to the browsable slide show is now explained. FIG. 9 shows the relationship between the PlayList of the Browsable slide show, for asynchronously reproducing audio data, the Clip information file and the audio stream. Although the PlayList is made up by the PlayItem indicating the replay path of the still picture, and the PlayItem indicating the replay path for audio data, the PlayList indicates the replay path for audio data and the SubPlayItem indicates the replay path for the still pictures, in distinction from the case of FIG. 6, in case the audio data is reproduced asynchronously.

In this browsable slide show, if the user commands the player to proceed to the next still picture, by e.g. a remote controller, such that the still replay time of each still picture is changed, the audio data is reproduced in an uninterrupted fashion, because it is asynchronous with respect to the progress of the slide show.

The structure of the SubPlayItem, specifying the replay route for the slide show, is the same as that of the PlayItem specifying the replay route for the slide show already explained with reference to FIG. 7. That is, the SubPlayItem is made up by the replay order of the Scenes in the PlayItem (playing_order), the ID (file_id) required in referencing a file of the Group of picture files in the Clip, and the default replay time (default_duration) of the Scene.

Figure 9:
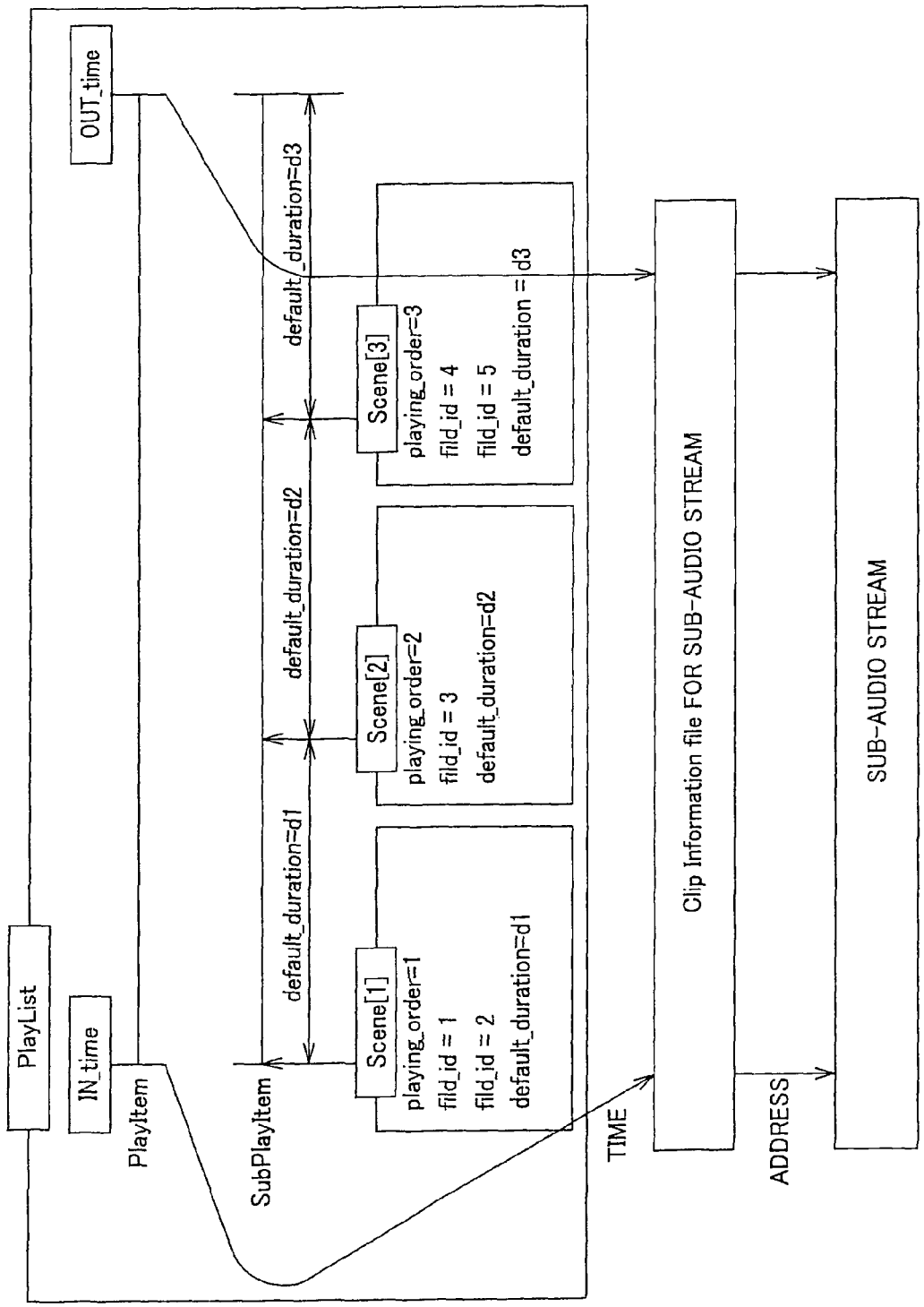
FIG. 9 shows the relationship between the PlayList, Clip Information File and an audio stream in case

In the PlayItem, specifying the audio replay route of the Browsable slide show, shown in FIG. 9, there are stated the replay start time (IN_time) on the Clip referenced by the PlayItem, and the replay end time (OUT_time) on the Clip referenced by the PlayItem.

In case the PlayItem, specifying the audio replay route, indicates an access point to the inside of the sub-audio stream (Auxiliary audio stream) of the Clip, in terms of the time stamp, the Clip Information file is useful in finding out the address information for an address by which to start the decoding of the audio stream in the AV stream file in the Clip.

That is, the Clip Information file, referenced by the PlayItem, has a table (EP_map for audio) stating the relationship of correspondence between the start time of each replay domain and the address. Hence, the reproducing apparatus converts the specified time stamp into an address to read out and reproduce the audio stream of the target replay domain.

Since here the replay start time and the replay end time are determined in the PlayItem, specifying the audio replay route, the slide show may be terminated at e.g. the audio data replay end time. Or, the audio data, reproduced until the end time, may be again reproduced to reproduce the audio data a plural number of times.

(1-4) Structure of the Information Processing Apparatus (Recording Apparatus)

The information processing apparatus, embodying the present invention, for recording data for realization of a slide show in which the replay start time of each still picture is predetermined, or a slide show in which only the replay sequence of the still pictures is predetermined, as described above, is hereinafter explained.

Figure 10:
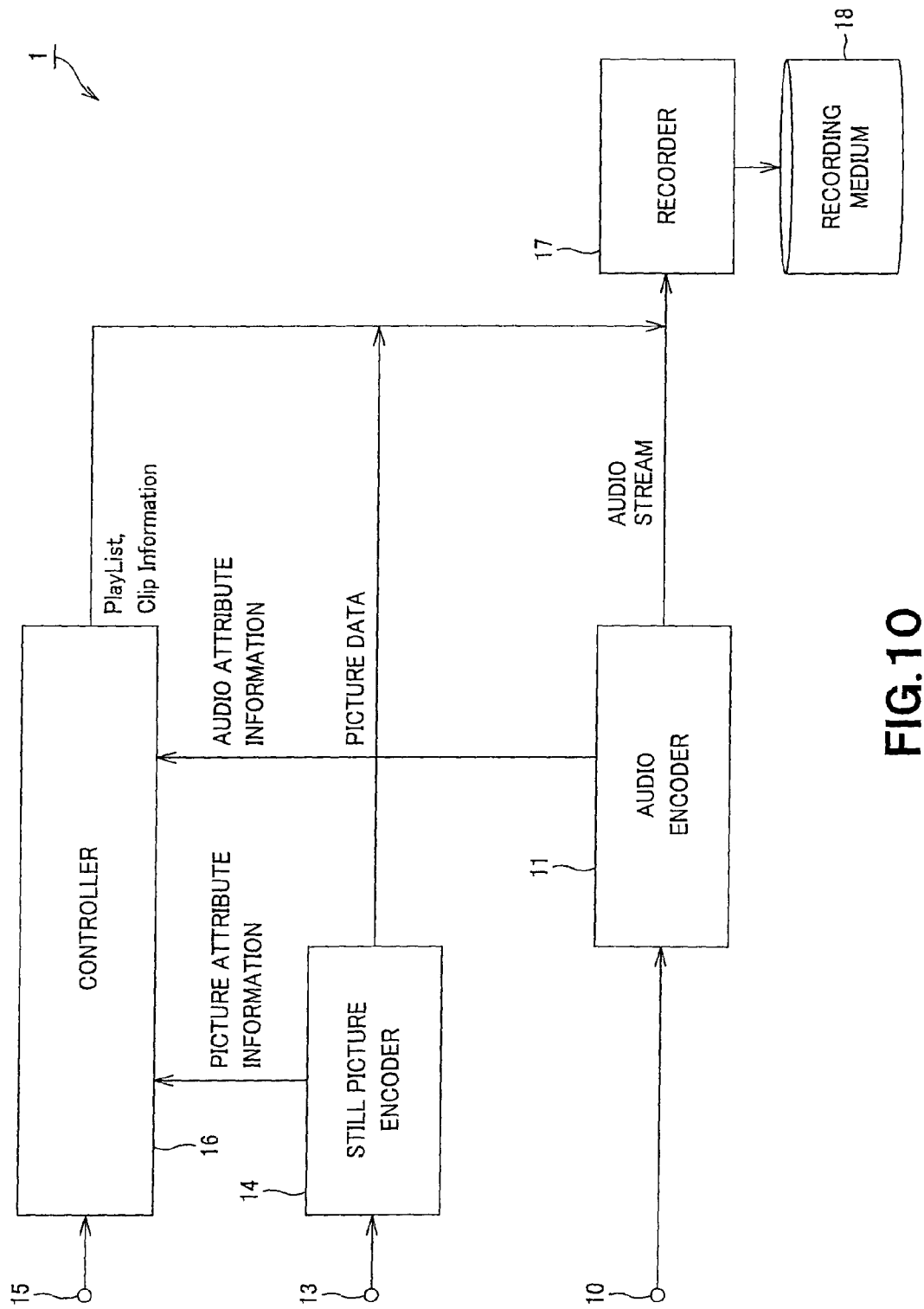
FIG. 10 is a block diagram showing an information processing apparatus in the first embodiment of the present invention.

FIG. 10 depicts a block diagram showing an information processing apparatus 1, embodying the present invention. Referring to FIG. 10, the information processing apparatus 1 is made up by a still picture encoder 14, supplied with a still picture from a terminal 13, and encoding the still picture, an audio encoder 11, supplied with audio data from a terminal 10, and encoding the audio data, a controller 16, supplied with the information pertinent to the replay contents of the slide show via terminal 15 and also with the picture attribute information and the audio attribute information from the still picture encoder 14 and the audio encoder 11, respectively, to generate the aforementioned PlayList and Clip Information, and a recorder 17, supplied with the PlayList and the Clip information from the controller 16 to record the PlayList and the Clip information in a preset format on a recording medium.

In case the replay start time of each still picture is predetermined, the controller 16 receives the information pertinent to the replay stat time and the replay time duration (display time) of each still picture, as the information pertinent to the replay contents of the slide show, as shown in FIG. 4. In case the audio data is reproduced in timed relationship in the slide show, the controller 16 receives, in addition to the replay start time and the replay time duration (display time) of each still picture, the replay start time on the PlayItem, representing the replay path of the still picture, as the information on the audio replay time, and the information specifying the replay domain in the audio stream, as shown and explained with reference to FIG. 6. In the case of the slide show in which the replay start time of the still pictures is not determined and only the replay sequence thereof is determined, as shown in and explained with reference to FIG. 7, the controller 16 receives the replay sequence and the default replay time of the respective still pictures. In case the audio data not synchronized with the slide show is reproduced, the controller 16 receives the information specifying the replay domain in the audio stream, in addition to the replay sequence and the default replay time of the respective still pictures. The controller 16 is also supplied from the still picture encoder 14 with the data size of each still picture and data such as the numbers of vertical and horizontal pixels, as picture attribute information, to formulate the Clip information, shown in FIG. 3, corresponding to the respective still pictures contained in the Group of picture files.

From the so supplied information, the controller 16 formulates the PlayList, indicating the replay path for the aforementioned still pictures and audio data, using the ID (file_id) stated in the Clip information. The controller 16 also formulates the Clip information for audio data (audio attribute information) having a table specifying the relationship of correspondence between the replay time of audio data on the PlayItem and the smallest access unit of the audio stream (access point) (EP_map for audio data).

Figure 11:
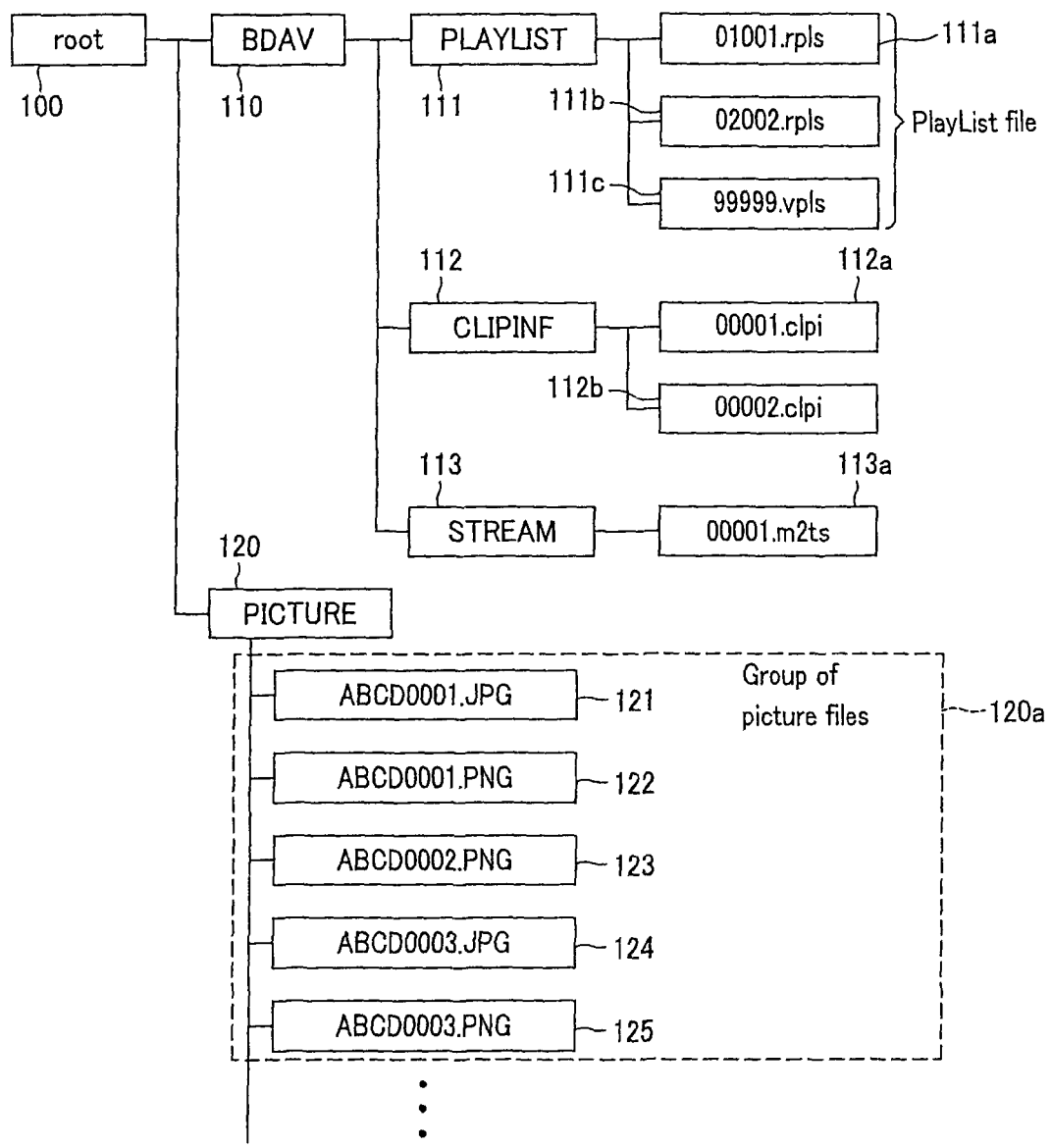
FIG. 11 shows an illustrative structure of a directory and a file of data recorded on a recording medium.

The recorder 17 records the Clip Information and PlayItem on the recording medium 18, while recording data in accordance with these information. FIG. 11 shows an illustrative structure of the directory and a data file recorded. In FIG. 11, a route 100 has directories of BDAV 110 and PICYURE 120, while the BDAV 110 has directories of PLAYLIST 111, CLIPINF 112 and STREAM 113. The PLAYLIST 111 includes plural PlayList files 111a to 111c. The CLIPINF 112 includes a Clip Information file 112a for an audio stream and a Clip Information file 112b for the Group of picture files. The STREAM 113 includes a sub-audio stream (auxiliary audio stream) file 113a as option. Additionally, the PICTURE 120 includes plural Groups of picture files 120a, made up by a group of still picture files 121 to 125, as an example.

FIGS. 12A and 12B show an example of data arrangement on the recording medium (disc) of the Clip Information and the relevant still picture file. In the present embodiment, the reproducing apparatus (player) reads out and reproduces a still picture file, in the order of the picture file names (picture identification information ID (file_id)) presented in the Clip Information as shown in FIGS. 4 and 7. That is, in case still picture data are arrayed on the recording medium (disc) in the order in which the player reads out the still picture file, the time needed in seeking data of the player may be reduced to a minimum. It is therefore desirable that still picture data can be written on the recording medium in the order of reading out the still picture files.

Figure 13:
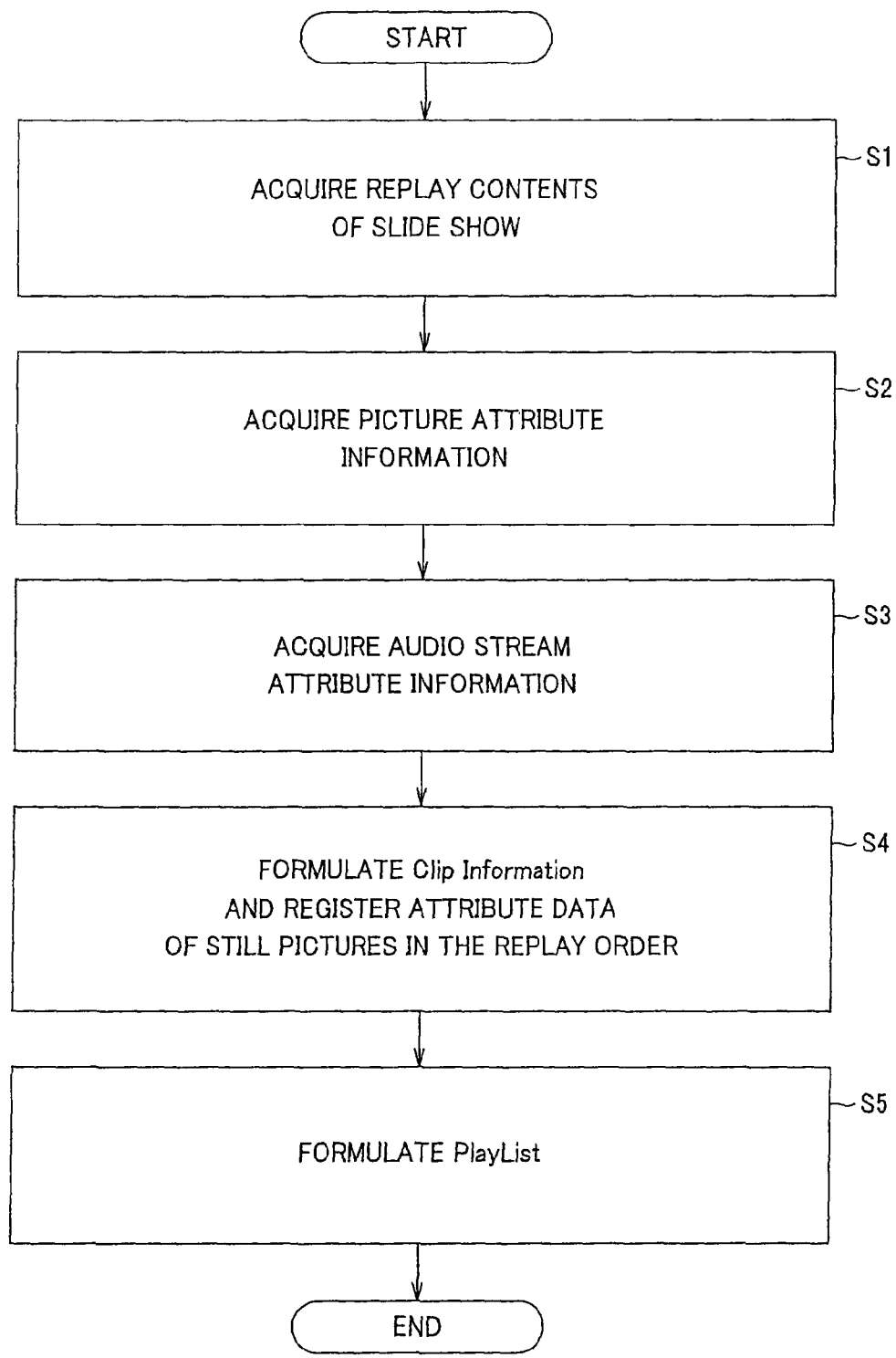
FIG. 13 is a flowchart showing the method for formulating the PlayList in the recording operation of the information processing apparatus according to the first embodiment of the present invention.

The recording operation by the recording processing apparatus of the present embodiment is hereinafter explained. FIG. 13 is a flowchart showing the method for formulating the PlayList, out of the recording operations of the present embodiment of the information processing apparatus. First, the still picture encoder 14 encodes the still picture supplied via terminal 13 to generate picture data which is then supplied to the recorder 17. The still picture encoder also sends the picture attribute information to the controller 16. The audio encoder 11 encodes the audio data supplied via terminal 10 to generate an audio stream which is sent to the recorder 17. The still picture encoder 14 also sends the stream attribute information to the controller 16.

Referring to FIG. 13, the controller 16 acquires replay contents of the slide show (step S1). That is, in case the slide show and the audio data are in the state of AV synchronization, as described above, the controller receives the replay start time and the replay time duration of each still picture as well as the information on the replay time duration of audio data reproduced in timed relationship to the still pictures. If conversely the slide show and the audio data are not in the state of AV synchronization, the controller 16 receives, via terminal 15, the information on the replay order and the default replay time duration of the respective still pictures as well as the information on the replay time direction of the audio data.

The controller 16 then receives the picture attribute information from the still picture encoder 14 (step S2), while receiving the audio stream attribute information for audio data, such as EP_map, from the audio encoder 11 (step S3). The controller 16 then formulates the Clip Information, as the subsidiary information pertinent to the aforementioned picture attribute information (step S4). That is, the attribute data of the still pictures are registered in the sequence of the pictures reproduced in the slide show. In addition, the controller refers to the file_id of the picture file of the Clip Information to formulate the PlayList specifying the replay domain (replay path) of the slide show, based on the external information supplied from outside, as well as to formulate the PlayList specifying the replay path of the audio data (step S5). The controller 16 also commands the recorder 17 to record the PlayList and the Clip Information in the recorder 17.

The recorder 17 records the PlayList and the Clip Information, formulated by the controller 16, on the recording medium, while recording the picture data and the audio data, generated by the still picture encoder 14 and the audio encoder, respectively, on the recording medium. The recorder 17 records the picture data so that the picture data are arrayed in the order of the picture files presented in the PlayItem of the Clip Information.

The information processing apparatus, as a recording apparatus, constructed as described above, supervises the Group of picture files, produced on collecting one or more still picture files into one file, while supervising the information, such as the identification information (file_id), supervising the respective still pictures contained in the file, as the Clip Information, and uses the PlayItem specifying the reproduction of the respective still pictures in the slide show. Hence, it is possible to record the data, which realizes a slide show as interchangeability with the recording apparatus for moving pictures, stated in for example the prior-art example 2, is assured. That is, a file of a still picture group (Group of picture files) is provided in place of an AV stream file in the moving pictures. The Clip Information file for referencing the file within the Group of picture files is provided and its replay is commanded by the PlayList to enable the same to be used in common with the Clip (Information file) or the PlayList in the format of the moving picture data.

(1-5) Structure of the Information Apparatus (Reproducing Apparatus)

Figure 14:
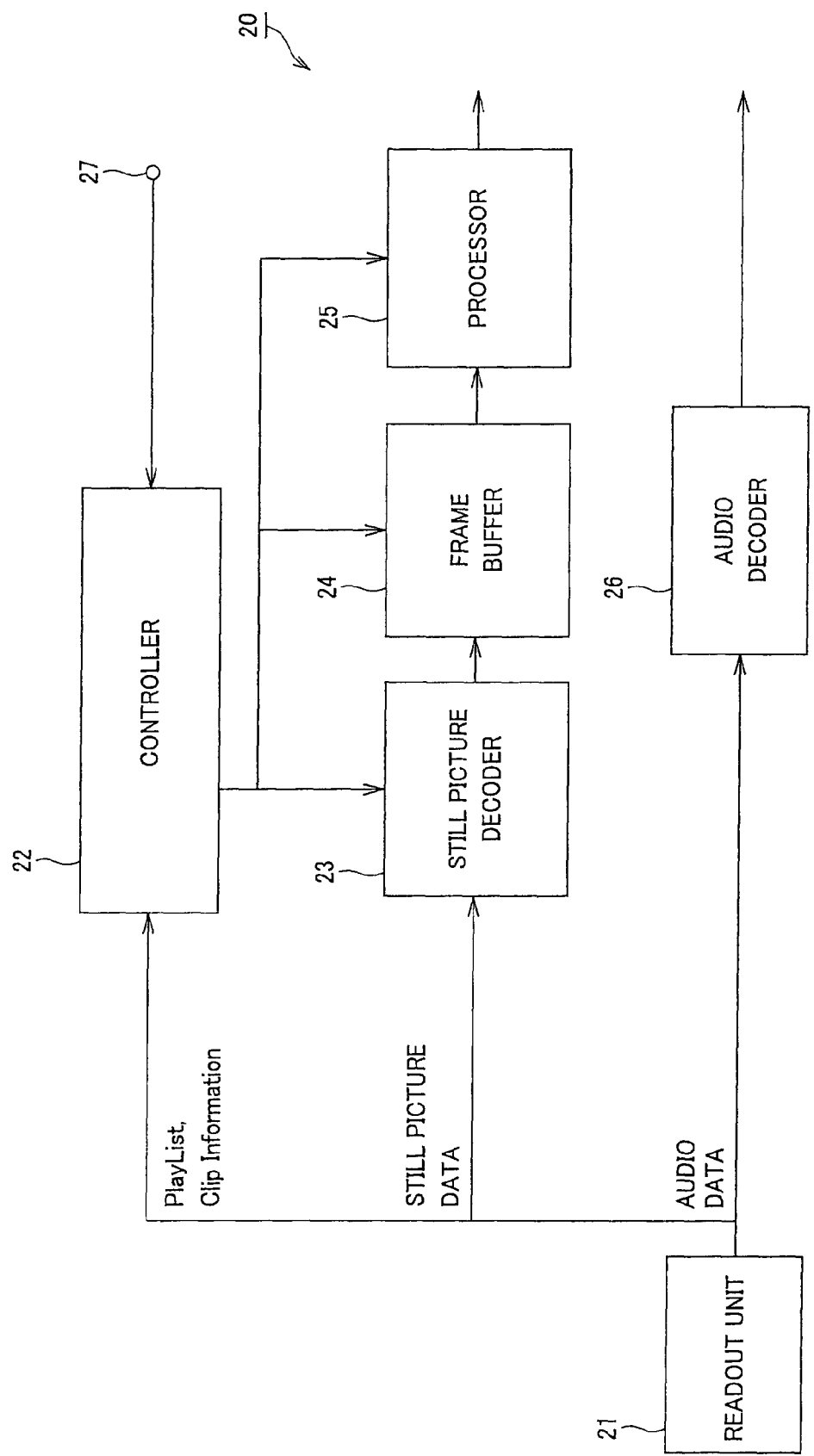
FIG. 14 is a block diagram showing an information processing apparatus for reproducing data recorded by the information processing apparatus shown in FIG. 10.

FIG. 14 depicts a block diagram showing an information processing apparatus for reproducing data recorded on the aforementioned recording apparatus. Referring to FIG. 14, the information processing apparatus 20 is made up by a readout unit 21 for reading out data from a recording medium, a controller 22 supplied with the PlayList and the Clip Information read out by the readout unit 21, a still picture decoder 23 and an audio decoder 26, supplied with the still picture data and with the audio data, as read out by the readout unit 21, a frame buffer 24 for transiently memorizing the decoded still picture, and a processor 25 for controlling the replay of the still picture.

The controller 22 refers to the PlayList to acquire an ID (file_id) or still picture data to be reproduced, and causes a still picture decoder 23 to read and decode still picture data specified by the ID of the still picture. If a slide show, in which the replay start time of the still pictures is not predetermined, is reproduced, the controller 22 is supplied with a command from a user via a user interface 27 so that the ID of the still picture data may be acquired and read out by a timing of the command from the user. Lacking the command from the user, the controller 22 performs the operation of acquiring the ID of the still picture data and the readout operation when the reproducing time (time duration) stated in the PlayList or the default replay time (default_duration) has elapsed.

The controller 22 refers to the PlayList to acquire the replay time of audio data to be reproduced. The controller also refers to the Clip Information of the audio stream to acquire the address of the audio stream corresponding to the replay time to command the readout unit 21 to read out the relevant audio data.

Figure 15:
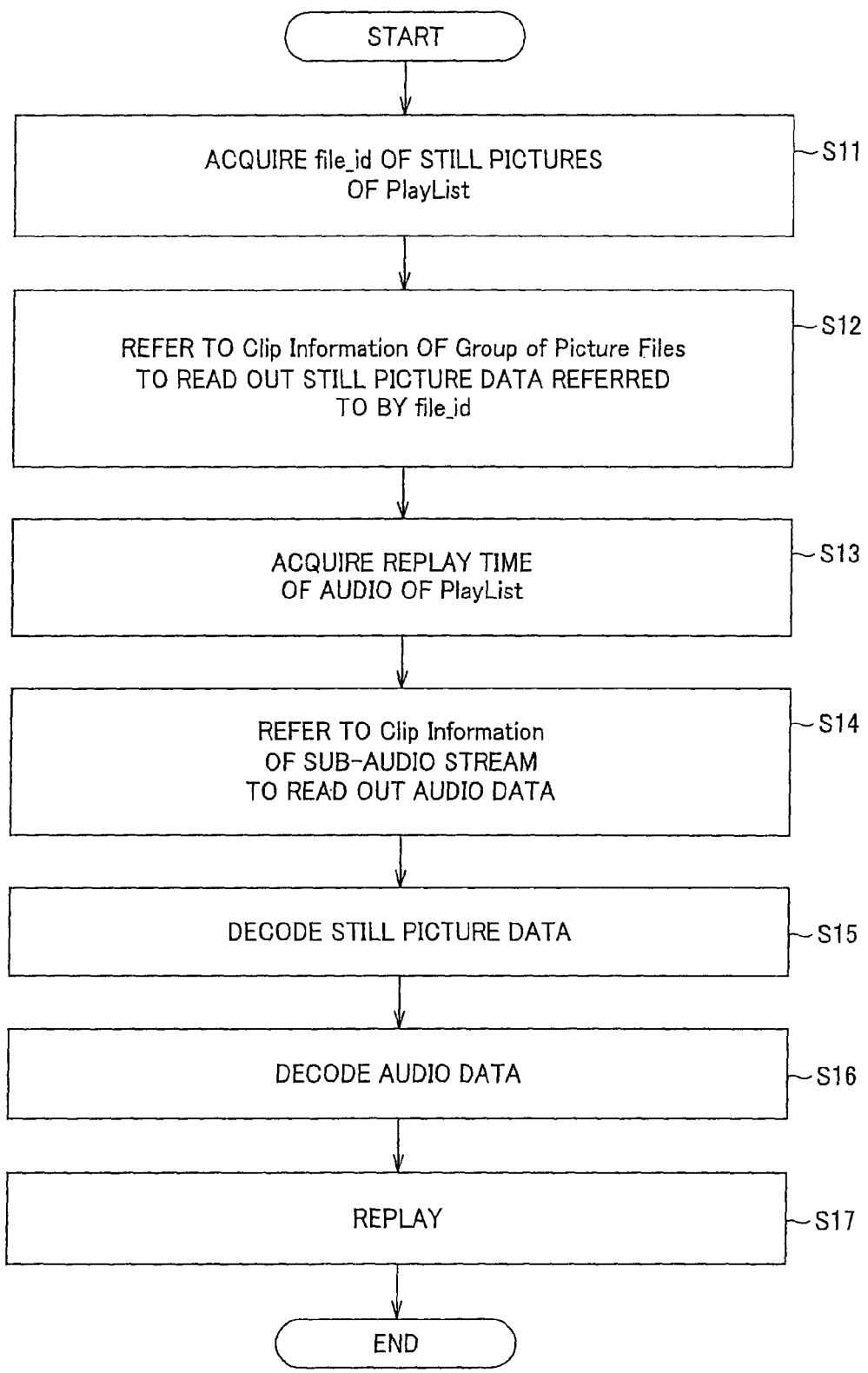
FIG. 15 is a flowchart showing the reproducing operation in the information processing apparatus according to the first embodiment of the present invention.

The replay operation of the present information processing apparatus is now explained in detail. FIG. 15 depicts a flowchart illustrating the replay operation in the present embodiment of the information processing apparatus. In FIG. 15, the readout unit 21 reads out the PlayList and the Clip Information to send the so read out information to the controller 22. The controller 22 acquires the file_id identifying the still picture of the PlayItem specifying the replay path of the still picture of the PlayList. The controller 22 refers to the Clip Information of the Group of picture files to cause the readout unit 21 to read out the still picture file from the Group of picture files (step S12).

The controller 22 also acquires the audio replay time, in accordance with the PlayItem, indicating the audio replay path, in accordance with the PlayItem of the audio replay path of the PlayList (step S13). The controller 22 also refers to the Clip Information of the Group of picture files to specify the still picture file indicated by the aforementioned file_id of the still picture to read out the still picture file from the readout unit 21 (step S12).

The controller 22 acquires the audio replay time, in accordance with the PlayItem representing the replay path of the PlayList (step S13). The controller also refers to the audio stream as the sub-stream (Auxiliary audio stream) to acquire the information on the address with which to start the decoding of the stream data in the audio stream file. The controller then manages control to read out the audio data from the audio stream file, by the readout unit 21, based on the so acquired information.

The still picture decoder 23 decodes the still picture data read out in the step S12 (step S15) to enter the so decoded data to the frame buffer 24. The audio decoder 26 decodes the audio data, read out in the step S14 (step S16), to output the decoded audio data. The controller 22 issues a preset command to the processor 25 and to the frame buffer 24. The frame buffer 24 reproduces the picture, stored therein, at a preset timing, in accordance with the command (step S17).

In the step S11, the controller 22 acquires the file_id of the still picture at the next timing t1 or t2. The timing t1 is such timing when the replay time duration of the still picture elapsed has become longer than the replay time duration stated in the relevant scene of the PlayItem specifying the replay path of the PlayList. The timing t2 is such timing when a command for changing over the still picture from the user interface 27 is received. When the replay of the last still picture of the PlayItem has come to a close, the controller 22 terminates the replay of the PlayList.

In case the replay start timing of each still picture, shown in FIGS. 4 and 6, is predetermined, the controller 22 is able to read out the file_id at the aforementioned timing t1, that is, at a timing when the duration stated in the Scene of the PlayItem has elapsed, to command the readout unit 21 to read out the corresponding still picture. When the user specifies the replay start time of each still picture shown in FIGS. 7 to 9, the controller 22 is able to read out the next file_id at the aforementioned timing t2, that is, at the timing of the command from the user as to the switching of the still pictures, to command the readout of the corresponding still picture. In case the still picture switching command is not supplied, the time point when the preset default replay time (default_duration) has elapsed may be set as the readout timing of the next file_id.

In the information processing apparatus as the reproducing apparatus, constructed as described above, there are provided two layers, made up by PlayList and the Clip, for overseeing the still pictures and the audio data, as the format of data for the realization of the slide show which is the continuous reproduction of still pictures. Since the set of still pictures in the Clip, the audio stream in the Clip and the Clip Information file as the subsidiary information therefor are supervised by discrete files, it is possible to render the format common to the format of the data applied to recording and/or reproduction of moving pictures described in the aforementioned prior-art example 2. That is, since the Group of picture files, made up by one or more still pictures, and the Clip Information file for supervising the Group of picture files, are provided in the Clip, the replay domain of the slide show is specified by the PlayItem of the PlayList, to realize the slide show, as the continuous replay of plural still pictures, may be realized as compatibility is maintained with respect to the information processing apparatus handling the moving pictures.

Moreover, the seek time involved in readout may be shortened by recording still pictures in the order of the replay path stated in the PlatItem of the PlayList.

Modification of (1-6)

In the above embodiment, one or more still pictures, contained in the Group of picture files, are given distinct picture file names, and the Group of picture files are supervised as sets of discrete picture files. Alternatively, these still picture files may be supervised as a sole picture file. A modification in the first embodiment, in which one or more still pictures, contained in the Group of picture files, are supervised as a sole picture file, is hereinafter explained.

In the present modification, the picture files of the Group of picture files are divided into groups of picture files, containing one or more still pictures. The files of these groups of the still picture files are referred to below as files of the still picture groups. The ID numbers are sequentially allocated beginning from the leading end of the replay sequence of the still picture group.

In the present modification, in which one or more still pictures, contained in the Group of picture files, are supervised as a sole picture file, it is possible to group together the still pictures, presented simultaneously, as one group for management. In the specified case of the slide show, described above with reference to FIG. 8, two still pictures, reproduced simultaneously, namely file_id=1 and file_id=2, are arranged in one group, while the still picture of file_id=3 is arranged in one group and two still pictures, reproduced simultaneously, namely file_id=4 and file_id=5, are arranged in one group.

Figure 16:
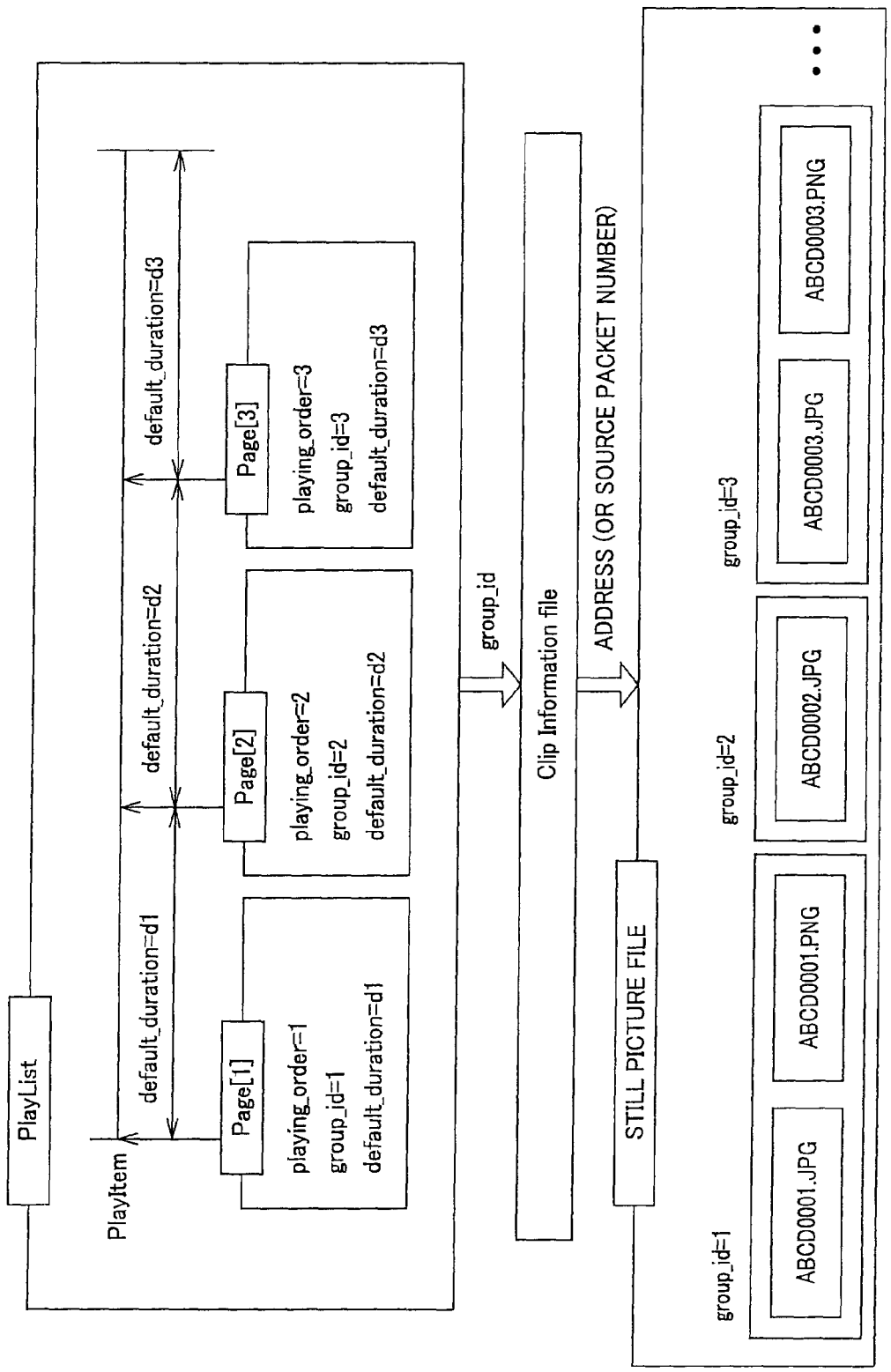
FIG. 16 shows an example of the relationship between the PlayList and the Clip in a modification of the first embodiment of the present invention.

In this case, the structure differs from that of the PlayList shown in FIG. 7. FIG. 16 shows the relationship between the PlayList and the Clip of the present modification. Referring to FIG. 16, the PlayList is made up of the PlayItem, indicating the replay path of the still pictures, as in FIG. 7. However, the PlayItem has a Page in place of the Scene shown in FIG. 7. It is noted that the Scene shown in FIG. 7 includes the information specifying the replay order of the respective Scenes in the PlayItem, the identification information ID (file_id) of still pictures in referencing the Group of picture files in the Clip, and the default replay time. The Page in the present modification differs from the Page in the previous embodiment in stating the ID (file_id), which is the identification information of each still picture group, in place of the ID (file_id), which is the identification information of the still picture of the Scene. The page otherwise has the functions equivalent to those of the Scene. That is, the Page includes the information specifying the replay order of the respective Pages in the PlayItem, the identification information ID (file_id) of the still picture group in referencing the Group of picture files in the Clip, and the default replay time (default_duration) of the respective Groups.

In the present modification, the PlayList again refers to the still pictures in the Clip. The Clip Information specifies the relationship between the still pictures referenced by the PlayList and the entities thereof. That is, the PlayList refers to the still picture group identification information ID (group_id) for identifying the still picture in the Clip. The Clip Information specifies the address information on the recording medium of the still pictures grouped in meeting with the still picture group identification information ID (group_id). The reproducing apparatus acquires this address information to read out and reproduce the still pictures.

FIGS. 17A and 17B show typical data arrangement on the recording medium (disc) of the Clip Information and the relevant still picture files in the present embodiment shown in FIG. 16. The Clip Information includes the address information (ads1, ads2, ads3) of the grouped still pictures corresponding to each still picture group identification information ID (group_id), as described above. The still picture group data are recorded on the recording medium, in the replay sequence of the PlayItem, that is, in the order of the still picture group identification information ID (group_id=1, 2, 3).

The reproducing apparatus (player) reads out and reproduces the still picture data in the sequence of the still picture group identification information ID (group_id) appearing in the Clip Information. With use of this still picture file structure, it is possible to diminish the volume of the file system data for file management, as compared to the case in which the Group of picture files is a set of discrete picture files.

(2) Second Embodiment

The second embodiment of the present invention is hereinafter explained. In the above-described embodiments, the still pictures of the Group of picture files or picture data in each still picture group are directly recorded on the recording medium. In the present second embodiment, the picture data are recorded in the form of a transport stream (TS). In multiplexing the still pictures in one transport stream, the still pictures are multiplexed by the recorder 17 as described with reference to FIG. 10.

(2-1) Slide Show: Only Still Pictures

Figure 18A:
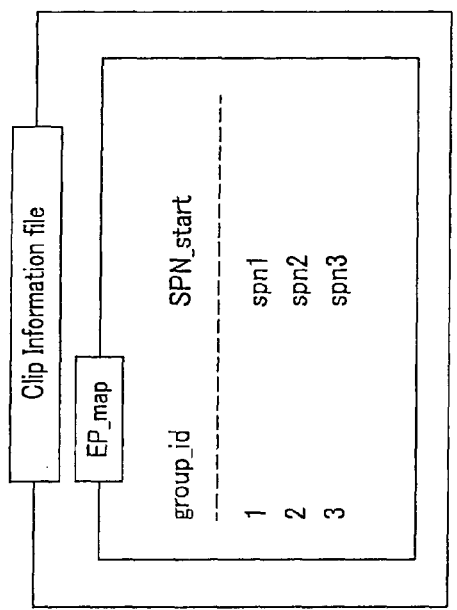
FIG. 18A shows the Clip Information shown in a second embodiment of the present invention.
Figure 18B:
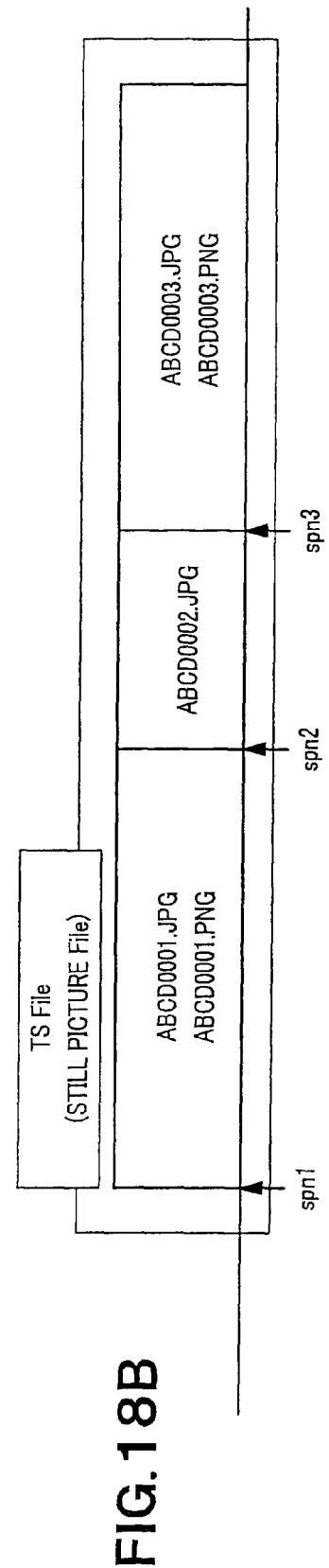
FIG. 18B shows data arrangement on a recording medium (disc) of a still picture file pertinent to FIG. 18A.

FIGS. 18A and 18B show data arrangement on the recording medium (disc) of the Clip Information and the relevant still picture files of the present embodiment, respectively. Here again, a slide show is explained, in which one or more still pictures, reproduced simultaneously, are managed as a still picture group, the replay order is specified, and the replay time is default replay time, in which the replay time of each still picture (time duration of the still picture in the slide show) is finite.

In the present embodiment, in which the picture data of the respective still picture groups are multiplexed in a transport stream, the Clip Information includes the EP_map, as a table specifying the identification information (group_id) of the grouped still picture, and a corresponding start address in the transport stream where the grouped still pictures are multiplexed, that is, a leading source packet number (SPN_start). Meanwhile, the source packet number is a number given to each source packet in the transport stream file so that the numbers are incremented by one, with the leading source packet number in the transport stream file being zero.

As in the first embodiment, described above, the recording apparatus records picture data in the still picture group, in accordance with the replay sequence (readout order), as the picture data are multiplexed in the stream. The reproducing apparatus (player) reads out and reproduces the still picture data in the order of the still picture group identification information ID (group_id) presented in this Clip Information. With this structure of the still picture file, the structure of the transport stream may conveniently be similar to that of the AV stream file, explained in the aforementioned prior art example 2, so that recording and/or reproducing apparatus of an analogous character may conveniently be used.

With the modification shown in FIG. 17 and with the embodiment shown in FIG. 18, in which the data are arrayed in a data reproducing order, the favorable effect similar to that of the case of FIG. 12 may be obtained. That is, by arraying the still picture data on the recording medium (disc) in the order in which the player reads out the still picture files, and by writing the still picture data in the order of the still picture files to be read out, the time involved in seeking the data in the player may be minimized.

(2-2) Slide Show: Still Pictures and Audio Data

Figure 19:
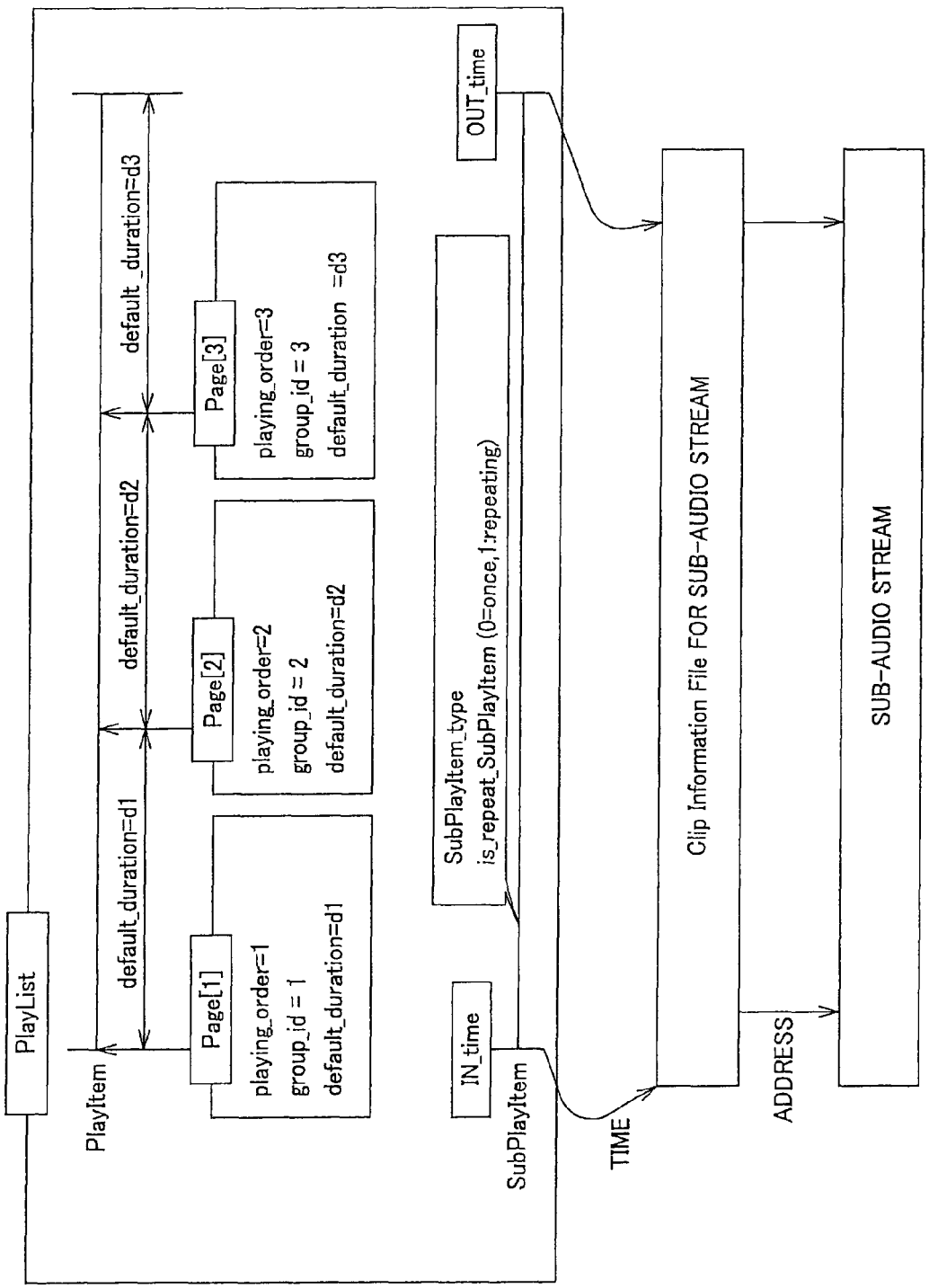
FIG. 19 shows the relationship between the PlayList in case of asynchronous reproduction of audio data in the Browsable slide show, the Clip Information file and the audio stream in the second embodiment of the present invention.

The case of the slide show in which audio data are reproduced asynchronously to the slide show is now explained. FIG. 19 shows the Playlist in case the audio data in the present embodiment are reproduced asynchronously. The PlayList is made up by the PlayItem, indicating the replay path for still pictures, and the PlayItem, indicating the replay path for the audio data. This slide show differs from that shown in FIG. 9 in that the replay path for the still pictures is PlayItem and that for the audio data is the SubPlayItem. Thus, in the present embodiment, the SubPlayItem is provided with the replay start time In-time and the replay end time Out-time, and reference is made to the time stamps of replay start and replay end in the audio stream. The PlayItem includes the Page which is the data of the respective still pictures making up the slide show.

The reproducing apparatus refers to the Clip Information to acquire the address information on the recording medium of the audio stream data corresponding to the replay start time IN-time and the replay end time OUT-time. Using the address information, the reproducing apparatus reads out and reproduces the address information. The scheme of the audio replay is similar to that of the first embodiment shown in FIG. 9.

The subsidiary information, referred to below as the subsidiary information for replay, may be appended, in addition to the information exemplified by the replay path, to the SubPlayItem and the SubItem, as the replay control information. The SubPlayItem in the present embodiment has appended thereto the first information (SubPlayItem_type), as the subsidiary information for replay, indicating that the replay of the SubPlayItem is asynchronous to the replay of the PlayItem. The SubPlayItem in the present embodiment also has appended thereto a flag (second information) (is_repeat_SubPlayItem flag), as the subsidiary information for replay, indicating whether the replay domain of the audio stream, indicated by the replay start time IN-time and the replay end time OUT-time, is to be reproduced repeatedly or only once. From this first information SubPlayItem_type, the reproducing apparatus determines that the SubPlayItem is to be reproduced asynchronously to the PlayItem. For example, if the is_repeat_SubPlayitem is 0 or 1, the replay domain is reproduced only once or reproduced repeatedly, respectively.

In the foregoing, it is assumed that the two sorts of the subsidiary information for replay are of static data format and subsidiary to the SubPlayitem. Alternatively, the two sorts of the subsidiary information for replay may be subordinated to the SubPlayitem in a command format of the playback control (so-called PBC) command format. For example, a command Repeat_SubPlayitem may be used in place of the flag is_repeat_SubPlayitem for subordinating the two sorts of the subsidiary information to the SubPlayitem.

(3) Third Embodiment

A third embodiment of the present invention is hereinafter explained. In the present third embodiment, the replay control information, specifying a single replay path, as stated in the Scene or Page in the first embodiment of the slide show of FIG. 4, described above, in which the replay time of the still pictures is predetermined, or in the slide show of FIG. 7 or FIG. 16, in which only the replay sequence of the still pictures is specified, is a sole PlayItem, and there are provided a number of PlayItems corresponding to the number of the Scenes or Pages. By indicating the replay path (one replay domain) by each PlayItem, the structure is similar to that of the PlayItem in the information processing apparatus, stated in the prior-art example 2, in which there is provided, as the PlayList, the replay domain of an AV stream (PlayItem represented by a pair of IN-points and OUT-points on the time axis), arranged into a group, thereby further improving the compatibility.

(3-1) Slide Show: Only Still Pictures

Figure 20:
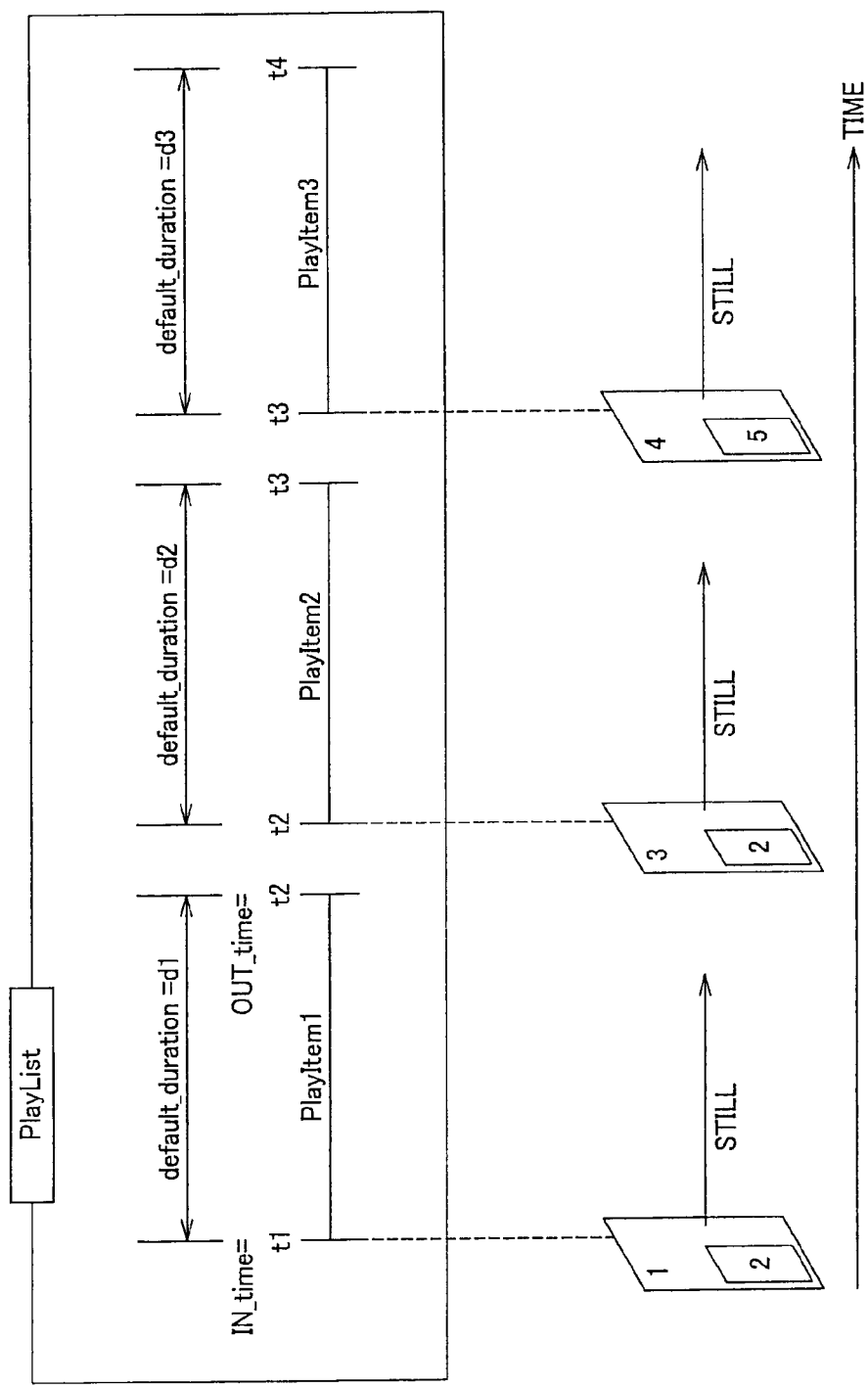
FIG. 20 is a schematic view showing an example of the PlayList in a slide show in which only the replay sequence of the respective still pictures is predetermined, and the relationship between the still picture and the replay time, in a third embodiment of the present invention.

FIG. 20 shows a slide show in which the replay sequence is specified and in which the replay time of the respective slides (duration of the slide stills) is finite, and specifically shows the relationship between the PlayList, the still pictures and the replay time duration, in which the PlayItem is used in place of the Scene shown in FIG. 7 or in place of the Page shown in FIG. 19. In the present embodiment, each PlayItem specifies the respective still pictures or the still pictures of the still picture group, reproduced simultaneously, using the replay start time IN_time and the replay end time OUT_time as shown in FIG. 20. More specifically, each Scene or Page in the PlayItem shown in FIG. 7 or 19 specify the default replay time duration (display time duration) default_duration indicating the duration of each Scene or page, whereas, in the present embodiment, the PlayItem 1 is equivalent to the page [1] of FIG. 19, as shown in FIG. 20, and the IN_time and the OUT_time are set in t1 and t2, respectively. Thus, the replay time duration, indicated by t1 to t2, is equivalent to the default replay time duration d1 (default_duration). The IN_time and the OUT_time are set in t1 and t2, respectively. Thus, the replay time duration, indicated by t1 to t2, is equivalent to the default replay time duration d1 (default_duration). On the other hand, the IN_time and the OUT_time of the PlayItem 2 are set in t2 and t3, respectively. Thus, the replay time duration, indicated by t2 to t3, is equivalent to the default replay time duration d2 (default_duration). Moreover, the IN_time and the OUT_time of the PlayItem 3 are set in t3 and t4, respectively. Thus, the replay time duration, indicated by t3 to t4, is equivalent to the default replay time duration d3 (default_duration).

The IN_time and the OUT_time of each PlayItem denote the replay range of an AV stream, that is, still picture data from the PTS of IN_time until the PTS of OUT_time in the AV stream is reproduced. In the slide show of the type shown in FIG. 20, when the still picture data from the PTS of IN_time until the PTS of OUT_time of a given PlayItem is reproduced, the player automatically proceeds to the reproduction of the next PlayItem.

In the PlayItem shown in FIG. 20, the default repay time of still pictures is finite. However, if a producer of the PlayList is desirous to set the default replay time to an infinite length, the default replay time may be set to an infinite length by adding to the information of the PlayItem the information instructing the continued display of the replay picture at the replay end time OUT_time. As in the case of the information processing apparatus, described in the above prior-art example 2, the information as the subsidiary information for replay may be newly added to the PlayItem. A flag is_Playtime_Still, as the subsidiary information for replay indicating whether or not the picture of the OUT_time is to be continuously reproduced, may be subordinated to the PlayItem, as shown for example in FIG. 21. If this flag is_Playtime_Still is set to 1 (that is, if default_duration is infinite), the reproducing apparatus continues to display the picture when the picture of the PTS at the replay end time OUT_time of the PlayItem has been reproduced. In this case, the player does not proceed to the replay of the next slide except if the user commands the player to proceed to the next slide of the slide show. If the user commands the player to proceed to the next slide, the player begins to reproduce the next PlayItem.

Figure 21:
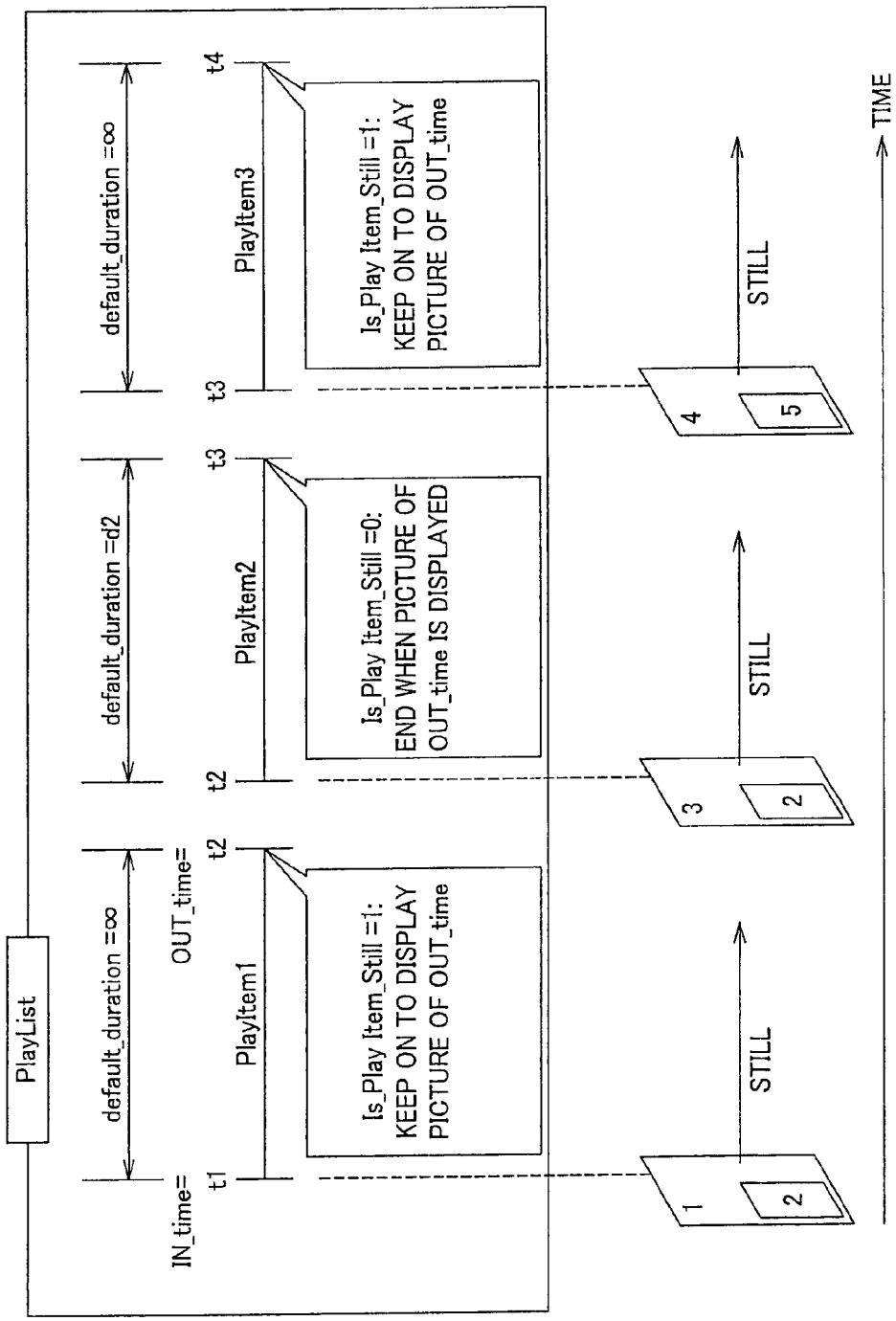
FIG. 21 is a schematic view showing another example of the PlayList in a slide show in which only the replay sequence of the respective still pictures is predetermined, and the relationship between the still picture and the replay time, in the third embodiment of the present invention.

By subordinating the flag is_Playtime_Still to the PlayItem, the PlayItem with the finite default replay time and the PlayItem with the infinite default replay time may co-exist in the sole PlayItem. FIG. 21 shows an example in which the replay time of the PlayItem 1 and the PlayItem 3 is infinite and the replay time of the PlayItem 2 is finite. The replay time for all PlayItems may also be set to infinite.

In the foregoing, the subsidiary information for replay, indicating the continued display of the replay picture at the OUT_time, is the data subordinated to the PlayItem as data in the form of a static flag. Alternatively, the subsidiary information for replay may also be subordinated to the PlayItem in the form of a command of playback control (so-called PBC). Specifically, the subsidiary information for replay may also be subordinated to the PlayItem, using e.g. a command Still_PlayItem.

Figure 22:
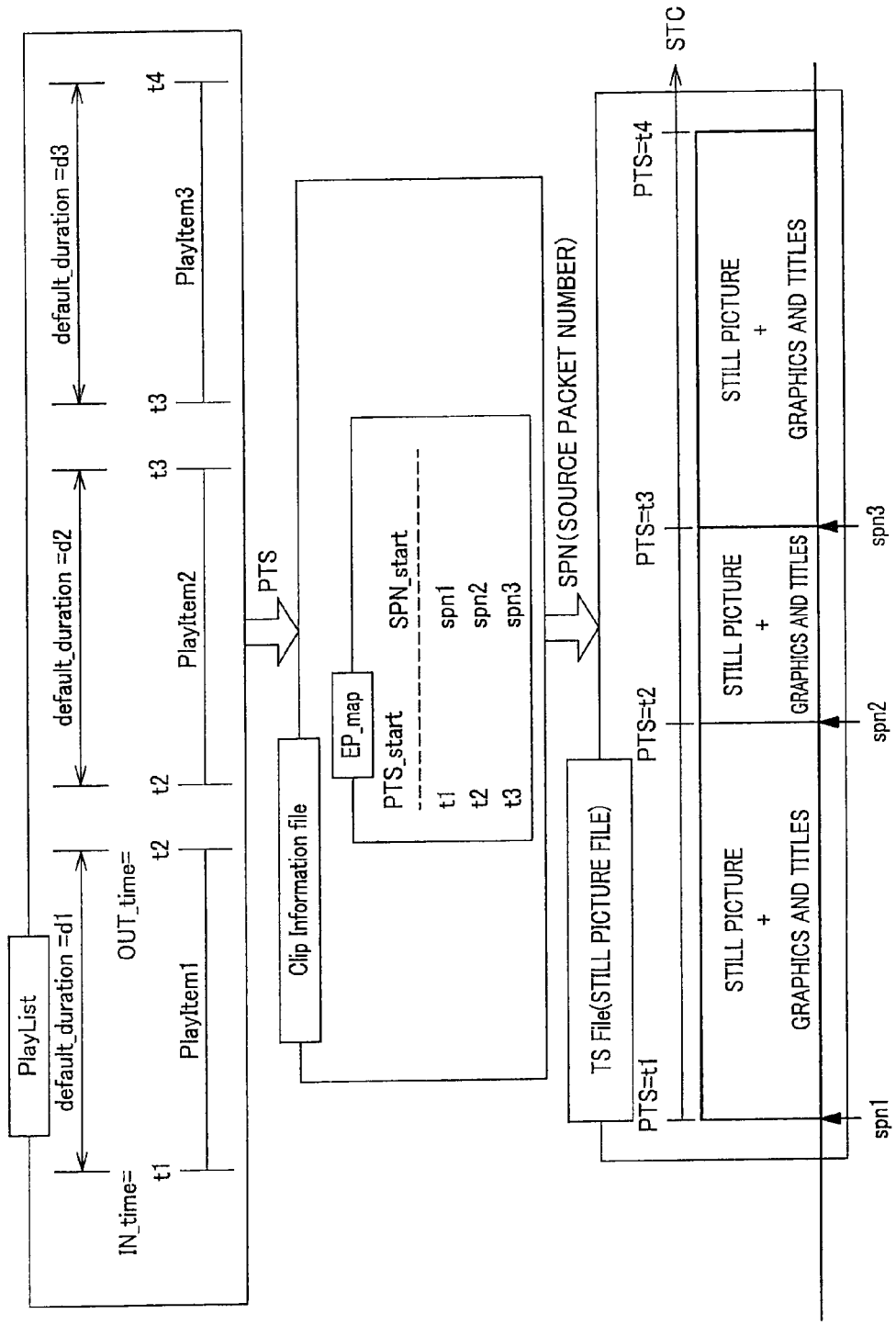
FIG. 22 shows the relationship between the PlayList shown in FIG. 20, the Clip Information thereof, and data arrangement on the recording medium (disc) of a relevant still picture file.
Figure 23:
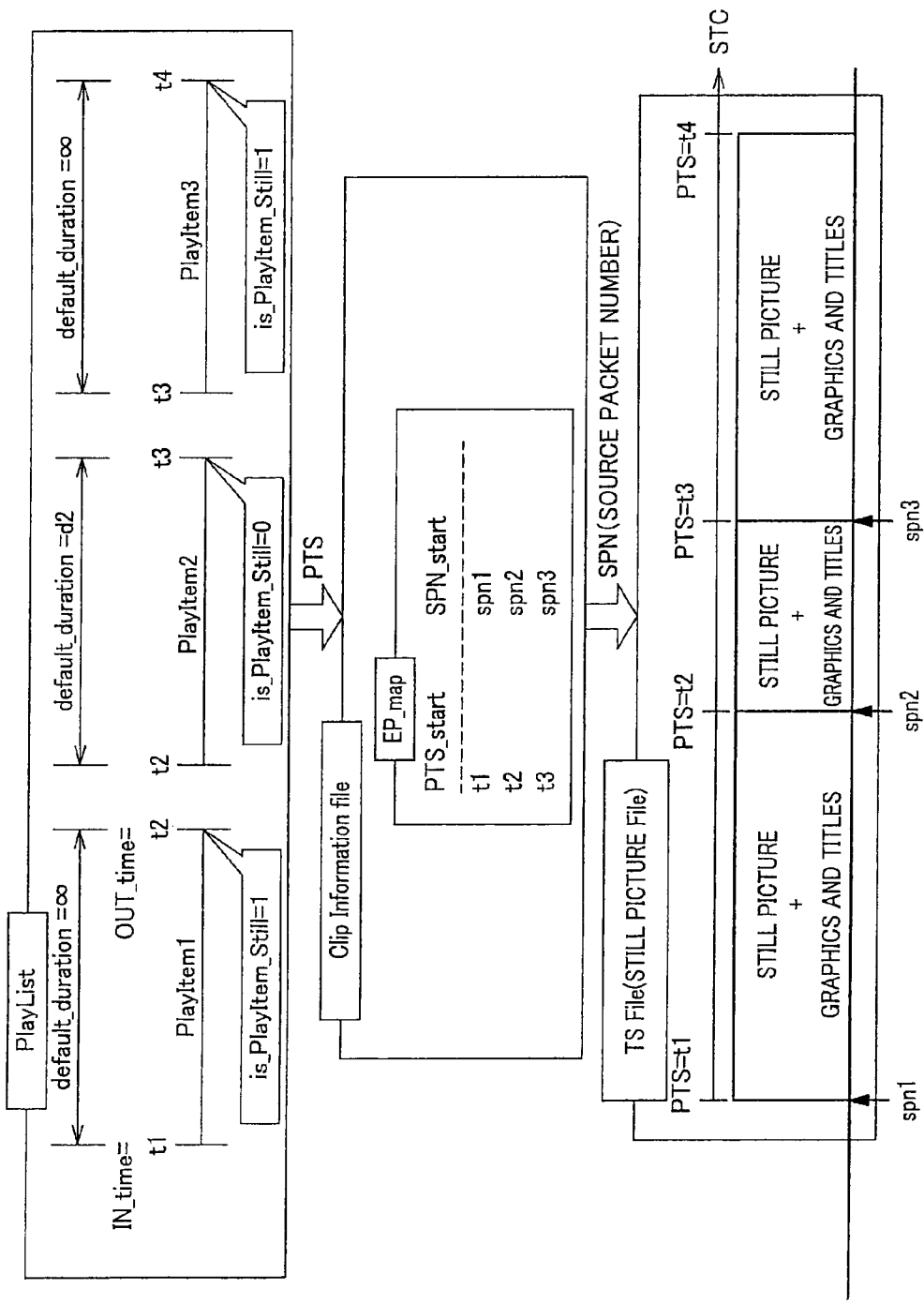
FIG. 23 shows the relationship between the PlayList shown in FIG. 21, the Clip Information thereof, and data arrangement on the recording medium (disc) of a relevant still picture file.

The still picture file, made up by one or more still pictures, referenced by one or more still pictures of FIGS. 20 and 21, is recorded on the recording medium in the form of a transport stream shown in FIG. 18. The data address of the transport stream, indicated by the replay start time IN_time and by the replay end time OUT_time of the PlayItem, may be acquired by referring to the EP_map of the Clip Information. FIGS. 22 and 23 schematically show the PlayList, the Clip Information file thereof and the data recorded on the recording medium.

FIG. 22 shows a case where the replay time duration of the PlayItem shown in FIG. 20 is finite. In the still picture file of the transport stream form, the transport stream, composed of ABCD0001.JPG and ABCD0001.PNG, multiplexed together, is for the presentation time stamp PTS of from t1 to t2, the transport stream, composed of ABCD0002.JPG, multiplexed together, is for the presentation time stamp PTS of from t2 to t3 and the transport stream, composed of ABCD0003.JPG and ABCD0003.PNG, multiplexed together, is for the presentation time stamp PTS of from t3 to t4. In the range of the PTS from t1 to t4, the still pictures and the graphics or titles, overlaid thereon, are multiplexed on the transport stream.

The EP_map of the Clip Information file, recorded on the recording medium in association with the transport stream of the still picture file, is a table showing the relationship between the values of the presentation time stamp PTS and the source packet numbers in the transport stream the values of the PTS indicate. That is, the EP_map in the present embodiment holds the values of the source packet numbers indicated by the values of the IN_time of the PlayItem1, PlayItem2 and the PlayItem3, that is, t1, t2 and t3. It is noted that the EP_map, shown in FIG. 18 of the above-described second embodiment, is a table showing the relationship of correspondence between the plural still picture group identification information ID (Group_id) and the source packet numbers SPN_start where the information in question commences, while the EP_map, shown in FIG. 22 for the present embodiment, has a structure similar to that of the EP_map shown in the above-described prior-art example 2, that is, the structure of a table showing the relationship of correspondence between the time stamp PTS_start of still pictures and the source packet numbers SPN_start where the time stamp in question commences.

The reproducing apparatus (player) reads out and reproduces the still picture data being referenced by the PayItem, that is, the data specified by the source packet number SPN_start. With such structure of the still picture file, in which the transport stream is the same in structure as the AV stream file explained in the above-described prior-art example 2, the recording and/or reproducing apparatus of an analogous structure may conveniently be used.

With the PlayList, shown in FIG. 22, the default replay time of still pictures is set to a finite value, with the default replay time duration being the time domain specified by the replay start time IN_time and by the replay end time OUT_time of the PlayItem. On the other hand, the PlayList, shown in FIG. 23, contains the PlayItem, in which the default replay time of a still picture is set to an infinite length. The default replay time being infinite is represented by the is_PlayList_Still appended to the PlayItem.

The user may command the reproducing apparatus to proceed to the replay of the next still picture without waiting for the lapse of the default replay time, or partway in the course of the default replay time in case the default replay time is set to an infinite value. For example, if the reproducing apparatus is reproducing the PlayItem1, and the user commands the reproducing apparatus to reproduce the next still picture, the reproducing apparatus starts reproducing the PlayItem2. The replay start time in this case IN_time=t2. The reproducing apparatus reads out and reproduces data from a source packet denoted by the source packet number spn2 corresponding to t2 of the EP_map.

For indicating the default replay time of the still picture of the PlayItem, the information specifying the pausing of the replay of the picture of OUT_time and the information indicating the duration of the still picture may be used.

For example, the above flag is_PlayItem_Still is used as the information indicating the pausing of the replay of the picture of OUT_time, and the information specifying the duration of the still picture Still_duration is added to the is_PlayItem_Still flag. Specifically, when the flag is_PlayItem_Still is 1, it indicates that the replay of the OUT_time picture is paused such that the duration of the still picture may be that specified by the Still_duration. If the duration of the still picture Still_duration is set to a preset value, the duration of the still picture may indicate the infinite duration. For example, if the duration of the still picture of the 8-bit value is 0xFF, it indicates that the duration of the still picture is infinite and, if otherwise, the value of the Still_duration specifies the finite duration of the still picture. The unit of the value of the time duration of the still picture may, for example, be second (sec).

If the random accessing to an optional PlayItem is taken into account, it is more convenient that the portion of the transport stream referenced by the respective PlayItems is not multiplexed in the source packet level in the transport stream file, because the readout volume of data necessary for replay of the PlayItem may then be minimized. To this end, the synchronization signal (system time clock (SystemTimeClock)) STC, which forms the basis of the transport stream, is independent from one portion of the transport stream referred to by each PlayItem to another. In this manner, the transport stream may be multiplexed as the transport stream portion referenced by each PlayItem by the respective PlayItem is made independent in the transport stream file.

Figure 24:
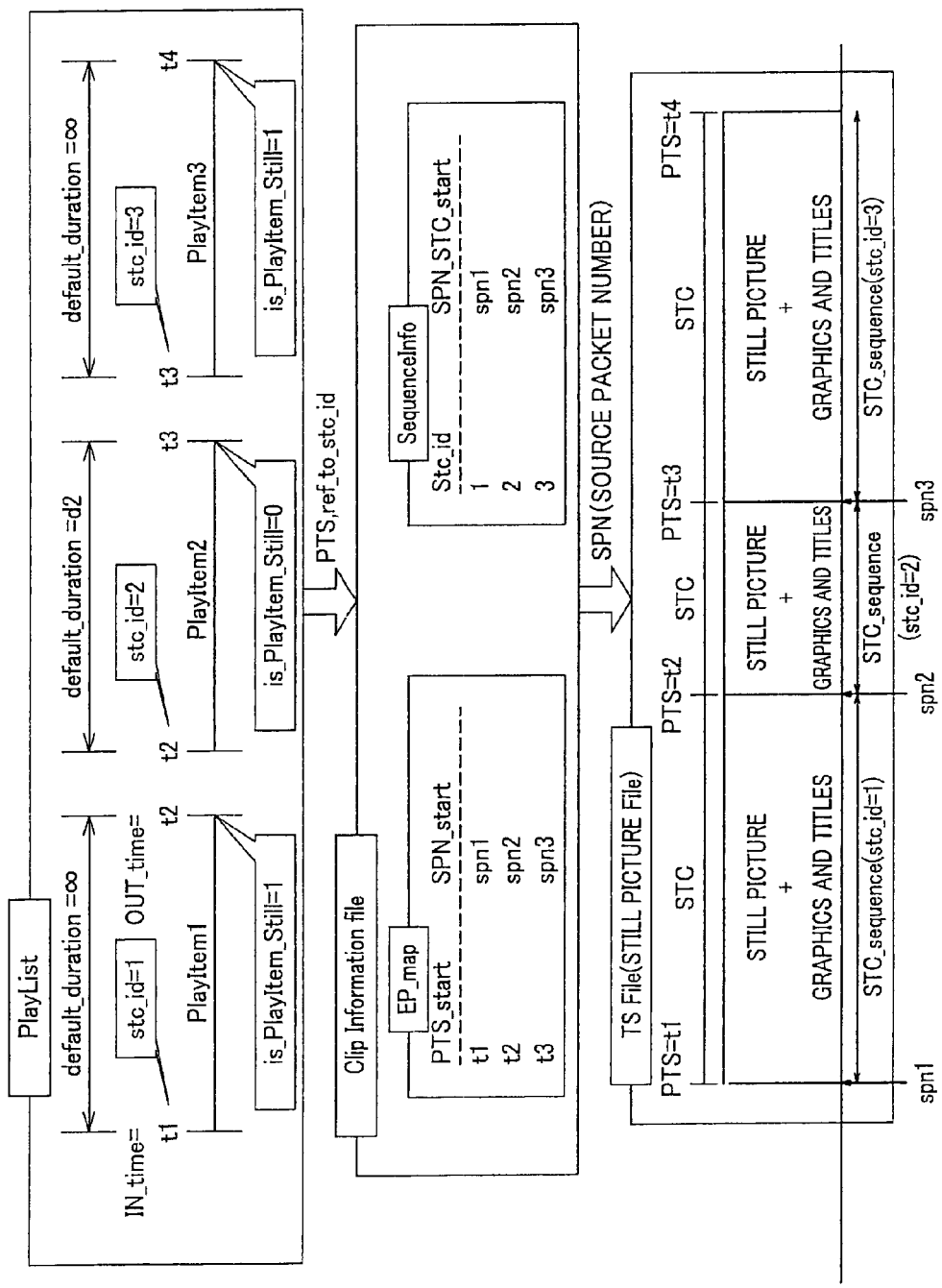
FIG. 24 shows another example of the third embodiment of the present invention and specifically shows the relationship between the PlayList, the clip information thereof and data arrangement on the recording medium (disc) of a relevant still picture file.

The Clip Information file shown in FIG. 24 has the SequenceInfo similar to that in the above-described prior-art example 2. The SequenceInfo is the subsidiary information of the Clip Information file, and is a table showing the relationship of correspondence between the source packet number (SPN_STC_start) for the continuous system time clocks STC to start in the transport stream file and the index number of the system time clock (stc_id) of the system time clock STC. The source packet string having continuous system time clocks STC is termed the STC-sequence.

In this case, the PlayItem has, in addition to the replay start time IN_time and the replay end time OUT_time, the reference value (refto_stc_id) to the STC referred to by these time stamps, as shown in FIG. 24. The reproducing apparatus (player) uses the EP_map and the Sequence_Info to read out and reproduce the still picture data being referenced by the PlayItem.

(3-2) Slide Show: Still Picture+Audio Data

The case in which each replay domain reproduces the audio data along with the slide show indicated by the PlayList.

(3-2-1) Still Pictures and Audio Data being Synchronously Reproduced

First, the case in which the audio data are reproduced in synchronism with the PlayList of the still pictures as shown in FIG. 22 is explained. In the above-described first embodiment, shown in FIG. 6, the replay start time and the replay time duration of the respective still pictures in the slide show are determined. The SubPlayItem is used for the audio replay control information indicating the replay path of the audio data reproduced in synchronism with the replay of the still pictures. Although the SubPlayItem may be used as the replay part for the audio data, the audio data reproduced in synchronism with the still picture may also be multiplexed in synchronism with the still picture in case the still pictures are multiplexed to the transport stream, because only one stream then needs to be read out and the replay processing is facilitated.

Figure 25:
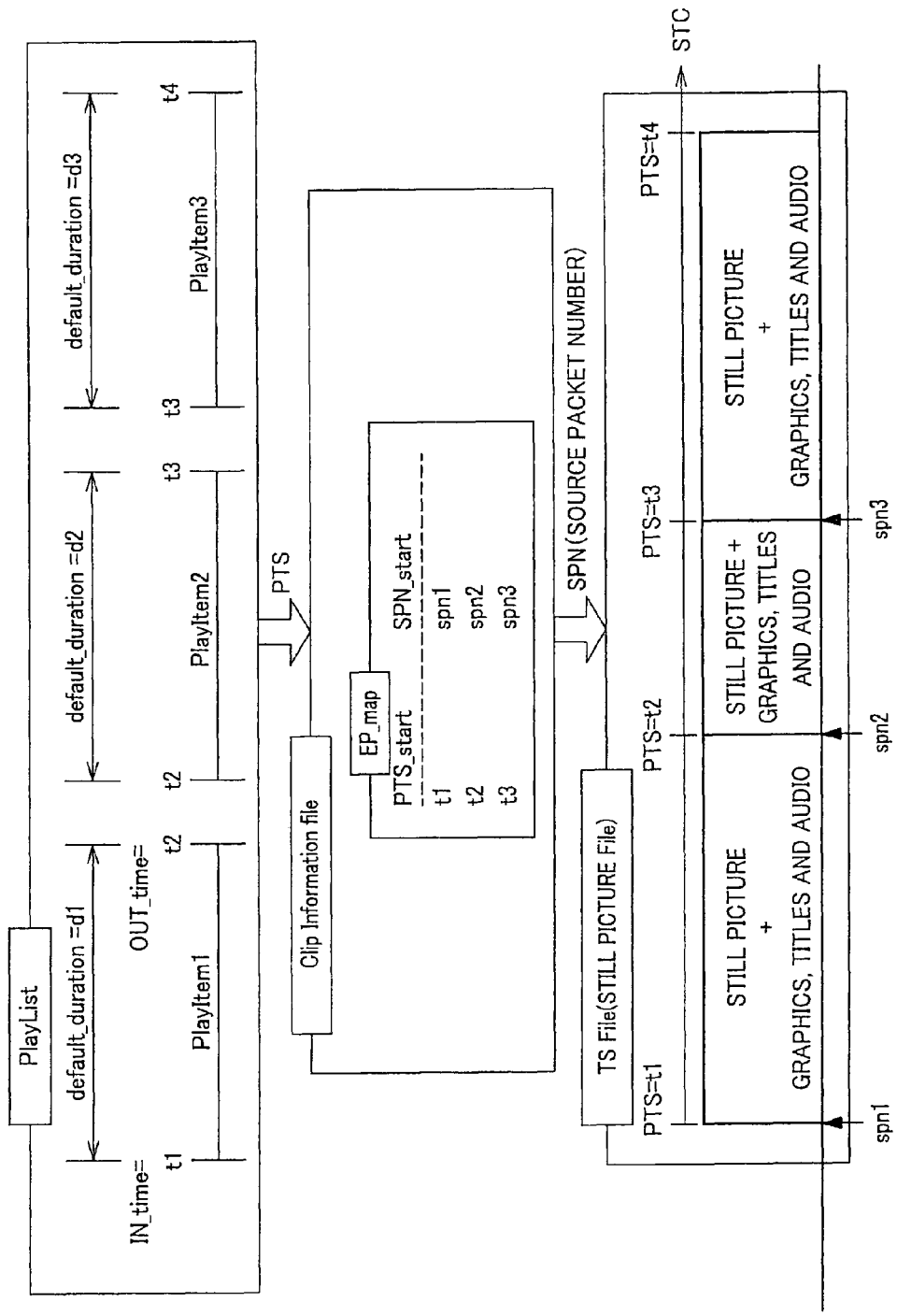
FIG. 25 shows the relationship between the PlayList of a slide show in which audio data is reproduced in a synchronized relationship to the replay of the still pictures, in the third embodiment of the present invention, the Clip Information thereof and data arrangement on the recording medium (disc) of a relevant still picture file.

FIG. 25 shows the PlayList of the slide show in which the audio data reproduced in synchronism with the still picture are multiplexed in the transport stream and the audio data is reproduced in synchronism with the replay of the still pictures. In the case of FIG. 22, one or more still pictures are multiplexed in the transport stream. In the present embodiment, the audio stream, reproduced in synchronism with the slide show, is multiplexed along with the still pictures in the transport stream. Using the EP_map of the Clip Information, the reproducing apparatus (player) reads out the still picture data and the audio data, being referenced by the PlayItem, to reproduce and output the still pictures and the audio data in time relation to each other, based on the presentation time stamp PTS.

The two methods by which the EP_map of FIGS. 22 to 25 point to the source packet in the transport stream file (still picture file) are hereinafter explained.

Figure 26:
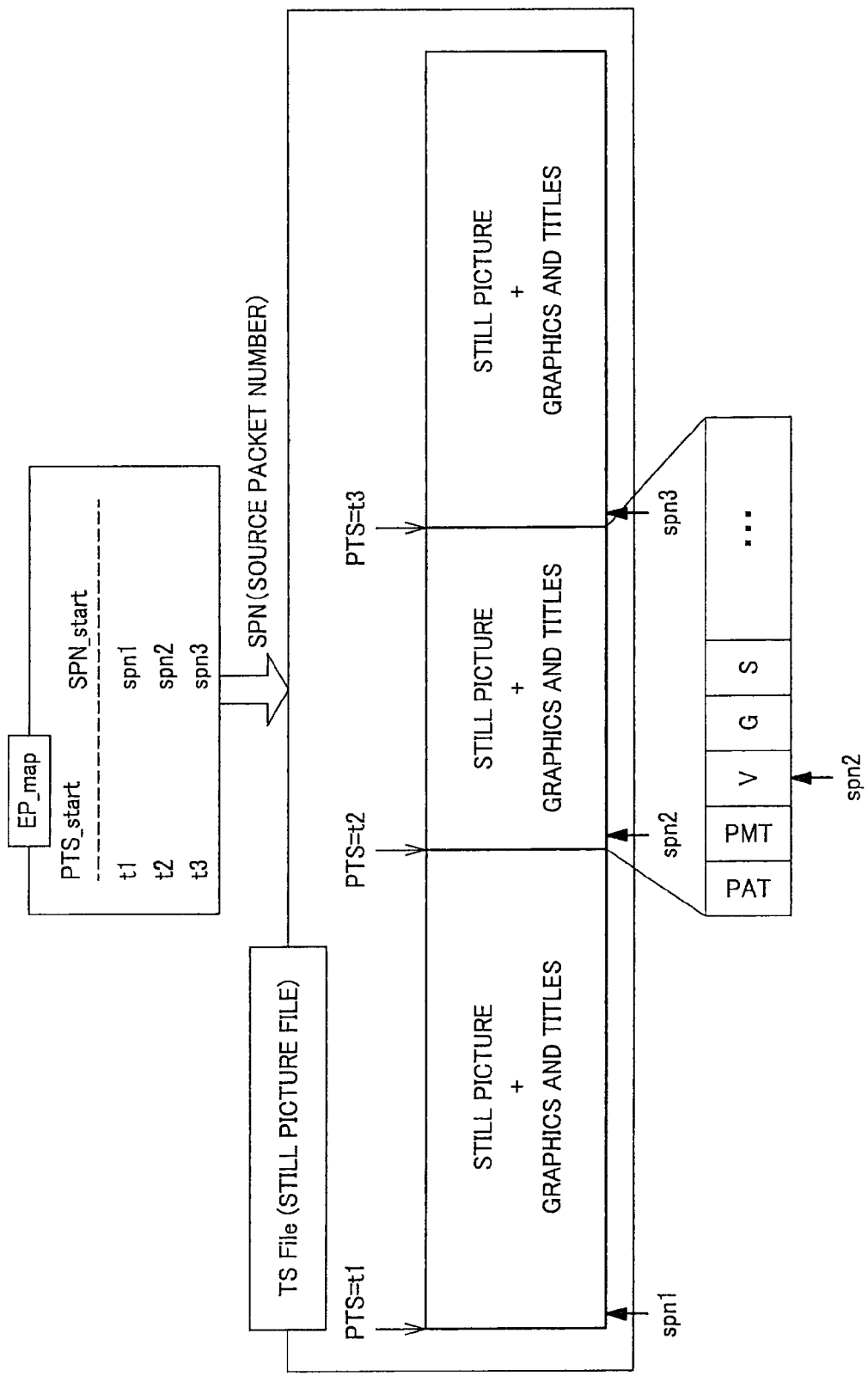
FIG. 26 is a schematic view for illustrating an example of a source packet indexed in a transport stream file (still picture file).

In the EP_map, shown in FIG. 26, the first video packet 'V' containing the data of the still picture corresponding to the replay start time PTS (=t2) of the still picture is pointed to by the source packet number spn2. In this case, the sub-picture information, such as graphics 'G' or the title 'S', overlaid (reproduced in synchronism) on the still picture, is multiplexed in rear of the video packet specified by the EP_map.

Figure 27:
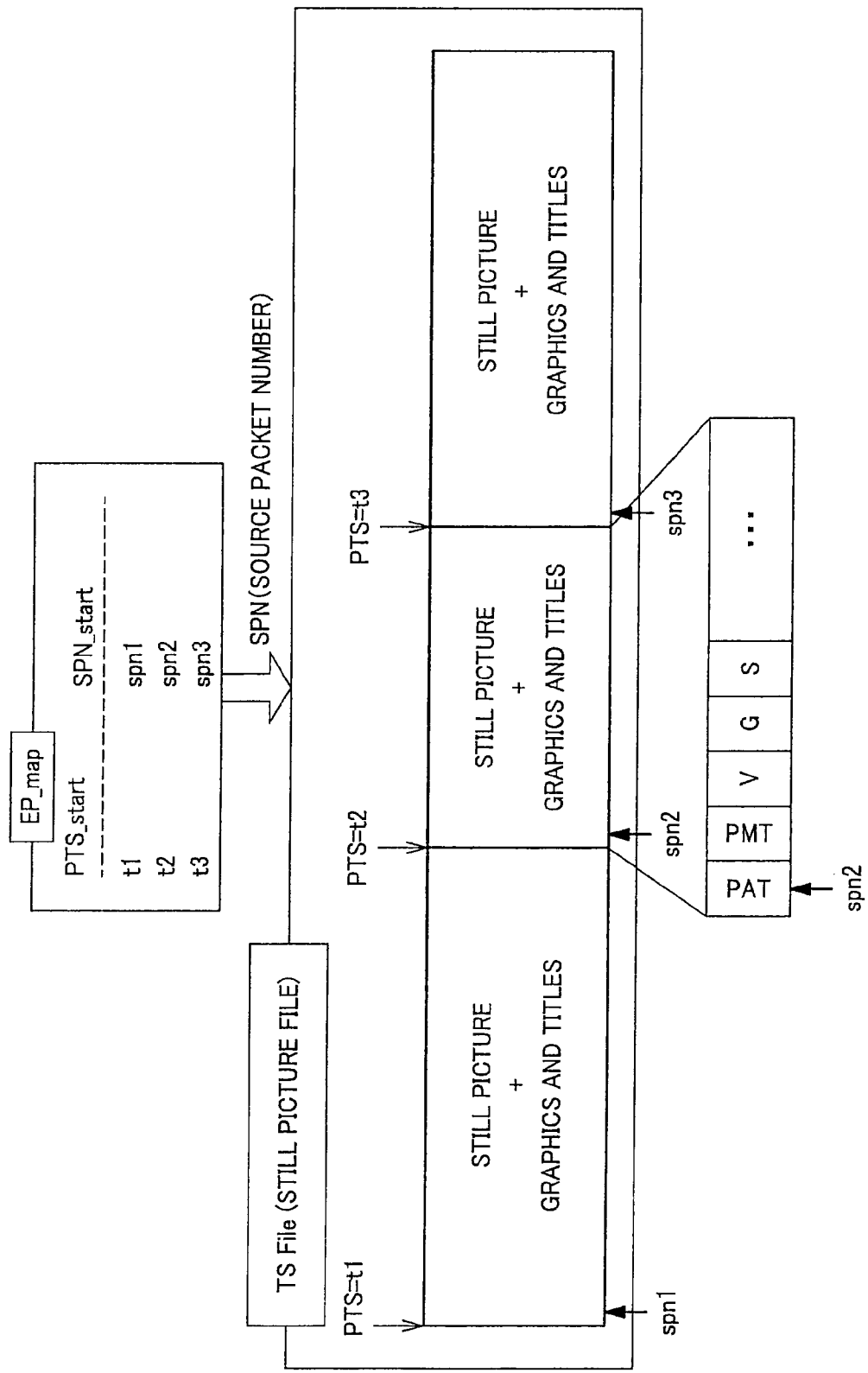
FIG. 27 is a schematic view for illustrating another example of a source packet indicated in a transport stream file (still picture file).

The PAT (Program Association Table) and the PMT (Program Map Table), as the system information of the MPEG2 transport stream, are multiplexed in the TS file, ahead of the first video packet 'V' containing the still picture data corresponding to the PTS (=t2) of the replay start time for the still picture, as shown in FIG. 27. The packet containing the PAT, for example, may be indicated by the source packet number spn2 of the EP_map.

Figure 28:
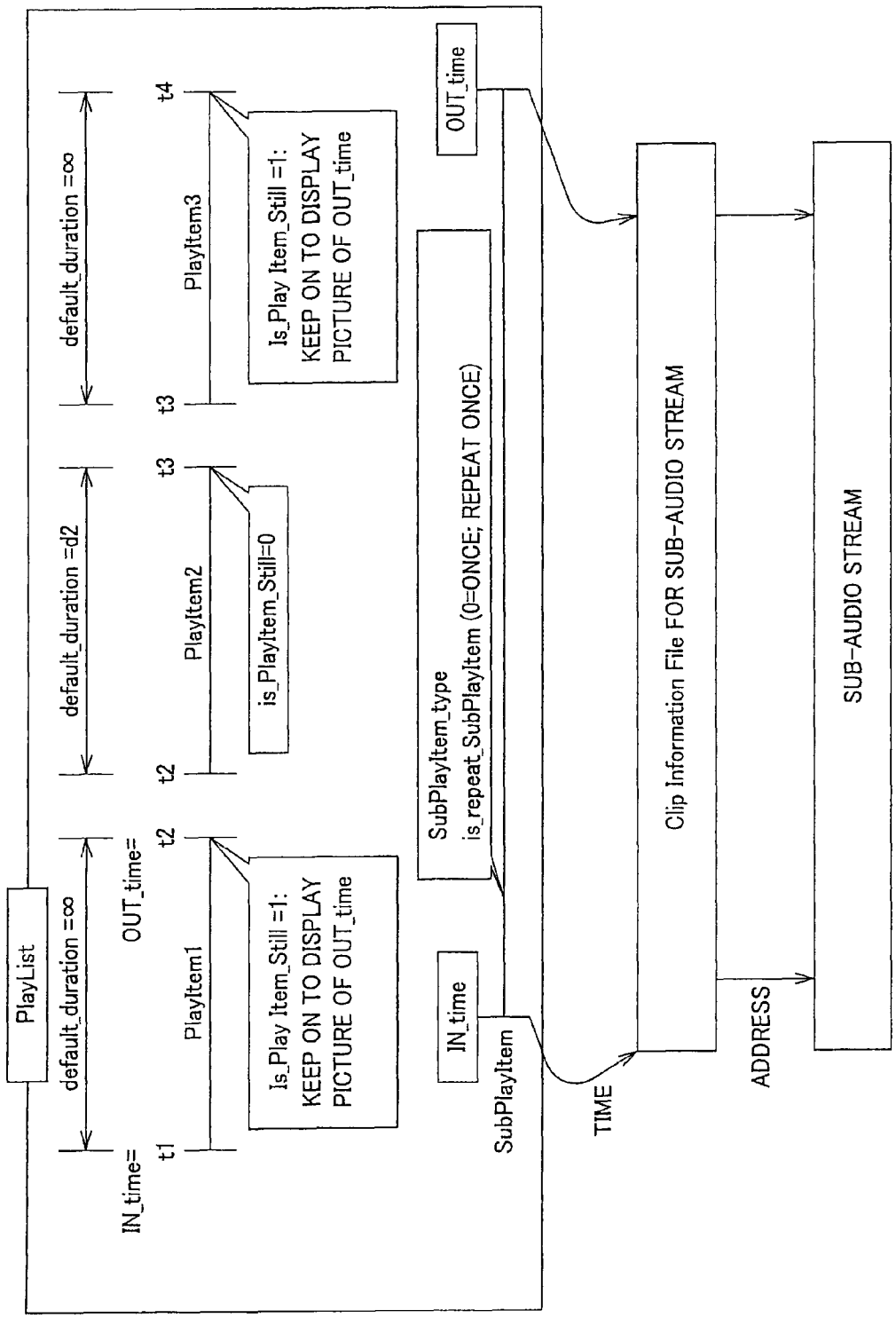
FIG. 28 shows the relationship between the PlayList of a slide show in which audio data is reproduced in an unsynchronized relationship to the replay of still pictures, in the third embodiment of the present invention.

(3-2-2) The Still Pictures being Reproduced Asynchronously to the Replay of Audio Data The case in which audio data is asynchronously reproduced to the PlayList of the still pictures is explained. FIG. 28 shows the PlayList of the Browsable slide show in which the audio data are reproduced asynchronously. The PlayList is made up by plural PlayItems, specifying the replay path of the still pictures, and the SubPlayItem, specifying the replay path of the audio data. Similarly to the second embodiment, shown in FIG. 19, the replay start time IN_time and the replay end time OUT_time of the SubPlayItem are indicated by the replay start time stamp and by the replay end time stamp in the audio stream, respectively.

The reproducing apparatus refers to the Clip Information to acquire the data address information on the recording medium of the audio stream corresponding to the IN_time and the OUT_time of the SubPlayitem. Using the address information, the reproducing apparatus reads out and reproduces the audio data. The scheme of the audio replay is similar to that of the first embodiment shown in FIG. 9. As in the embodiment, shown in FIG. 19, the producer of the PlayList may add the subsidiary information for replay to the PlayItem. Specifically, the flag indicating whether the replay domain specified by the replay start time IN_time and the replay end time OUT_time of the audio stream is to be reproduced repeatedly or only once (is_repeat_SubPlayitem flag), and the information specifying that the SubPlayItem is to be reproduced asynchronously to the replay of the PlayItem (SubPlayItem_type), are appended as the subsidiary information for replay. The subsidiary information for replay may also be appended to the SubPlayItem in the form of a command for playback control, as previously explained.

In this case, the reproducing apparatus is able to reproduce the SubPlayItem by the following three methods. The first method reads out the respective files alternately time-divisionally when reading out the data of the two files, namely the still picture file referenced by the PlayItem and the audio stream file referenced by the SubPlayItem. The reproducing apparatus in this case reproduces the still pictures and the audio data as the data of the two files are read out alternately from the recording medium.

The second method first reads out the entire data of the audio stream file, referenced by the SubPlayItem for storage of the so read-out data in a buffer memory in the reproducing apparatus. The still picture data, referenced by the PlayItem, is then read out from the recording medium. The reproducing apparatus reads out still picture data from the recording medium, while reading out the audio data from the buffer memory, to reproduce the still picture and the audio data.

The third method first reads out the entire data of the still picture file referenced by the PlayItem to store the so read-out data in the buffer memory in the reproducing apparatus. The audio stream, referenced by the SubPlayItem, then is read out from the recording medium. The reproducing apparatus reads out an audio stream from the recording medium and, as it reads out the still picture from the buffer memory, reproduces the still pictures and the audio data.

The above second and third methods are effective in case of the large byte size of the audio stream file referenced by the SubPlayItem and in case of the small byte size of the still picture file referenced by the SubPlayItem, respectively.

As a practical example, if the data size is of the order of several megabytes (Mbytes), the file data may be read out in their entirety to the buffer memory prior to replay. If, as an application of the Browsable slide show, the audio replay is BGM (background music) and the replay of the SubPlayItem is carried out repeatedly, the above second method is effective, because the data size of an audio stream of a bit rate of 256 kbps, continuing for about 65 seconds, is approximately 2 megabytes (Mbytes).

Figure 29:
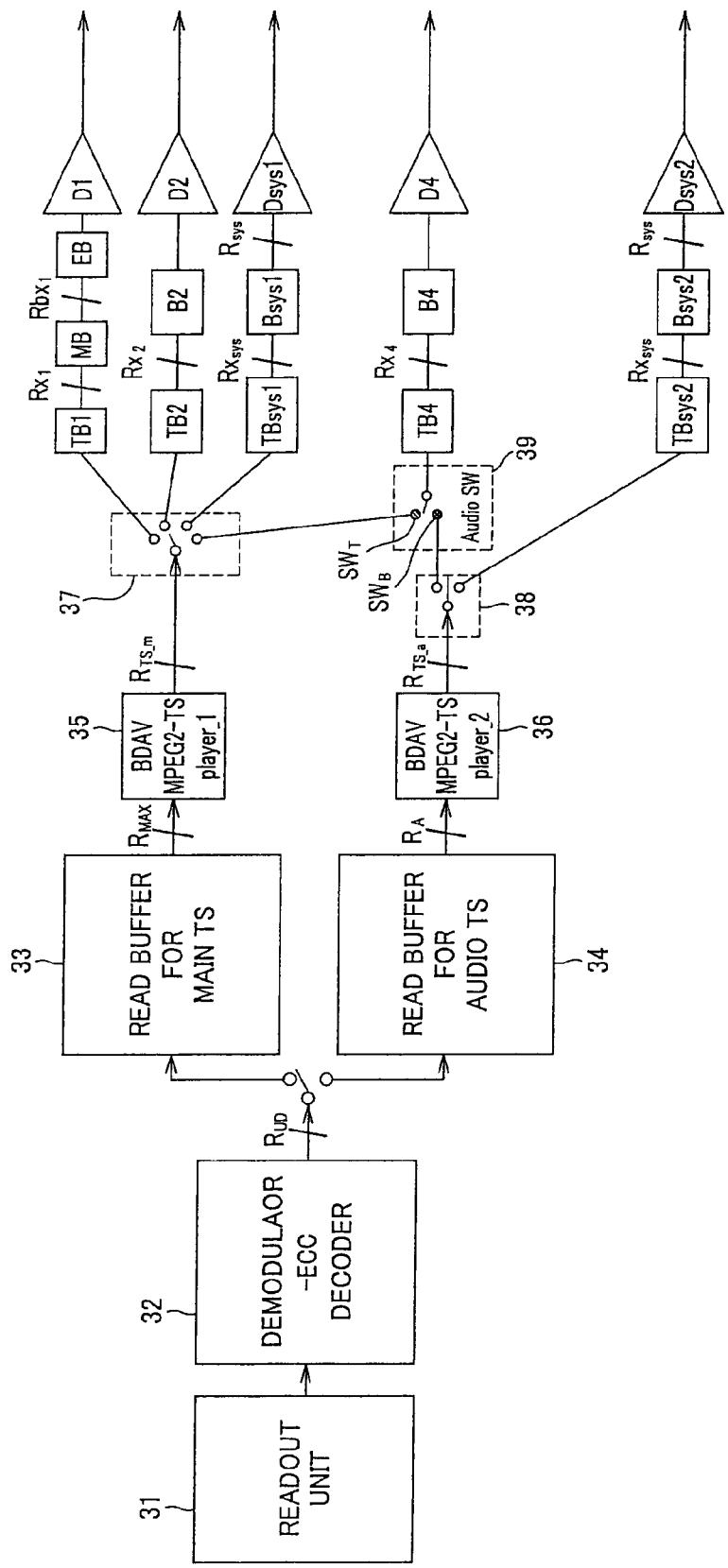
FIG. 29 is a block diagram showing a reproducing apparatus in case two files, namely a still picture file referenced by the PlayItem and an audio stream referenced by the SubPlayItem, are read out time-divisionally in alternation with each other from the recording medium.

A player model in case of readout by the above first method is now explained. FIG. 29 depicts a block diagram showing a reproducing apparatus employing the above first method for readout and reproduction. With this method, when reading out data of two files, namely a main transport stream (still picture file) referenced by the PlayItem (referred to below as main TS) and an audio transport stream referenced by the SubPlayItem (referred to below as audio TS), from the drive (recording medium), the respective files are read out alternately. The structure of the transport stream of the present embodiment will be explained in detail subsequently.

The reproducing apparatus reads out the two files (main TS and the audio TS) alternately from the recording medium to reproduce the still pictures and the audio data. The file data read out by a readout unit 31 are demodulated by a demodulator-ECC decoder 32. The demodulated multiplexed stream is subjected to error correction. The source packet data of the main TS file are buffered by a read buffer for main TS 33, while the source packet data of the audio TS file are buffered by a read buffer for audio TS 34.

The stream data read out from the read buffer for main TS 33 are supplied to a player for the main TS 35 (BDAV MPEG2 TS Player Model_1), which will be explained subsequently. The player for the main TS 35 outputs stream data, read out at a rate of transmission $R_{MAX}$ from the read buffer for main TS 33, to a PID (packet ID) filter 37 for the main TS, at a preset timing (transmission rate $R_{TS\_m}$). The stream data, read out from the read buffer for audio TS 34, is supplied to a player for audio data 36 (BDAV MPEG2 TS Player Model_2) which will be explained later on. The player for audio data 36 outputs the stream data, read out from the read buffer for audio TS 34, at a transfer rate $R_A$, to a downstream side PID filter for audio data 39 of the downstream side stage at a preset timing (transmission rate $R_{TS\_a}$).

A PID filter for main data 37 distributes and outputs an input main TS to the downstream side decoders of respective elementary streams, depending on the PID (packet ID). That is, the system information, such as still pictures (video), sub-picture information, such as graphics and subtitles, PSI (Program Specific Information) for the main TS or the SI (Service Information), is distributed to transport buffers TB1, TB2 and $TB_{sys1}$. Meanwhile, the SI is also packetized to a transport packet, and may be exemplified by SIT (Selection Information Table). A transport packet for still pictures is sent from a transport buffer TB1 at a preset rate $Rx_1$ to a multiplexing buffer MB and thence transmitted at a preset rate $Rbx_1$ as an elementary stream EB so as to be output after decoding by a decoder D1. The transport packet of the sub-picture information is transmitted from a transport buffer TB2 at a preset rate $Rx_2$ to a buffer B2 so as to be output after decoding by a decoder D2. A transport packet of the system information is transmitted from a transport buffer $TB_{sys1}$ at a preset rate $Rx_{sys}$ to a buffer $B_{sys1}$ so as to be output after decoding by a decoder $D_{sys1}$.

In similar manner, a PID filter for audio data 38 distributes and outputs an input audio transport stream to the downstream side decoders of respective elementary streams, depending on the PID (packet ID). That is, the transport packet for audio is transmitted from a transport buffer TB4 at a preset rate to a main buffer B4 and output after decoding by a decoder D4. The transport packet of the system information of the audio TS is transmitted from a transport buffer $TB_{sys2}$ at a preset rate $RX_{sys2}$ to the buffer $B_{sys2}$ and thence transmitted at a preset rate $R_{sys}$ to a decoder $D_{sys2}$ where it is decoded and output.

An audio switch (Audio SW) 39 is provided between the PID filter for audio data 38 on one hand and the transport buffers TB4 and $TB_{sys}$. This audio switch 39 is switching-controlled between a case where the case of reproducing a slide show of a time base mode shown for example in FIG. 25 and a case of reproducing a slide show of a Browsable mode shown for example in FIGS. 23 and 24. That is, the audio switch 39 includes a time base mode switch $SW_T$, connected to a PID filter for main data 37, supplied with data from the read buffer for main TS 33, and a browsable mode switch $SW_B$, connected to the PID filter for audio data 38, supplied with data from the read buffer for audio TS 34. The audio switch switches between these switches to send the audio stream to the transport buffer TB4. For example, in the case of the Browsable slide show, the audio switch 39 is set to the side of the browsable mode switch $SW_B$, in which case the audio stream is supplied from the read buffer for audio TS 34 through the filter for audio data 38 to the audio decoder D4. In the case of the time base slide show, shown for example in FIG. 25, in which the audio stream is multiplexed on the main TS, the audio switch 39 is set to the side of the time base mode switch $SW_T$, in which case the audio stream is supplied from the read buffer for main TS 33 through the filter for main data 37 to the transport buffer TB4 or $TB_{sys2}$.

The decoder of the elementary stream is now explained. The method for notation for TBn, MB, EB, TBsys, Bsys, Rxn, Rbxn, Rxsys, Dn and Dsys is the same as that defined in the T-STD (system target decoder) ISO/IEC13818-1 (MPEG2 system standard) and is as follows:

TBn (n=1 to 5): transport buffer of an elementary stream
MB: multiplex buffer for a video stream
EB: elementary stream buffer for a video stream TBsys: input buffer for the system information for a program being decoded Bsys: main buffer in a system target decoder for the system information of the program being decoded $Rx_n$: transmission rate in which data is removed from TBn $Rbx_n$: transmission rate in which a PES packet payload is removed from MBn (valid only for the video stream)

$Rx_{sys}$: transmission rate in which data is removed from TBsys

Dn: decoder in an elementary stream n

Dsys; decoder pertinent to the system information of a program being decoded

Figure 30A:
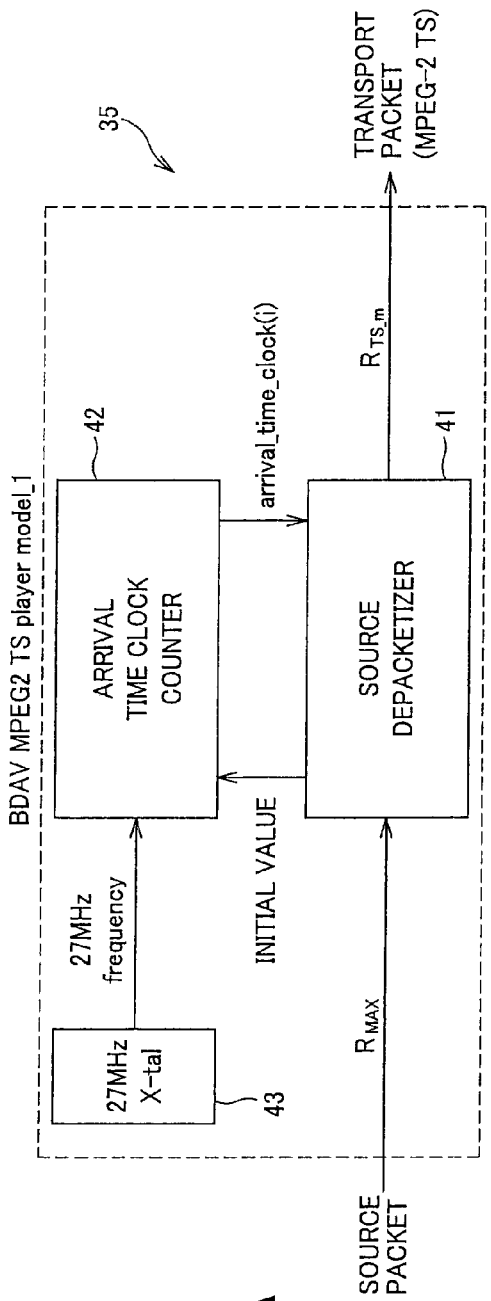
FIG. 30A is a block diagram showing BDAV MPEG2 TS Player Model_1 and FIG. 30B is a block diagram showing BDAV MPEG2 TS Player Model_2.
Figure 30B:
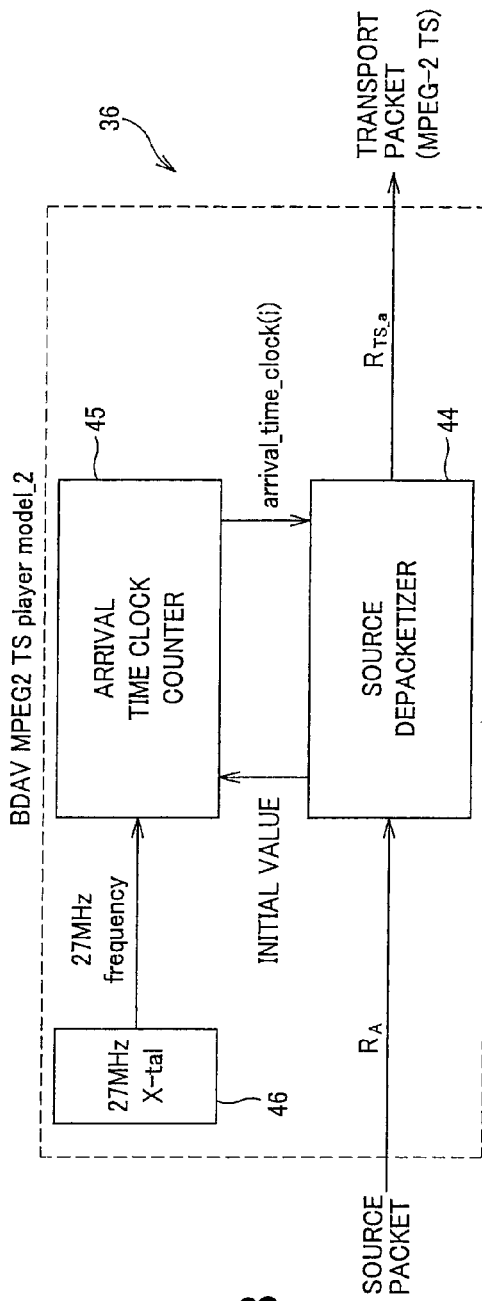

The player for the main TS 35 (BDAV MPEG2 TS Player_1) and the player for audio data 36 (BDAV MPEG2 TS Player_2), shown in FIG. 29, are now explained. FIGS. 30A and 30B depict block diagrams showing the player for the main TS 35 and the player for audio data 36.

Referring to FIG. 30A, source packet data, read out from the read buffer for main TS 33 of the previous stage, in the player for the main TS 35, is supplied to a source depacketizer 41, at a bit rate Rmax, which Rmax is the bit rate of the source packet stream of the main TS file.

An arrival time clock counter 42 is a binary counter for counting the pulses of a frequency of 27 MHz, output from a pulse oscillator 43 (27 MHz X-tal). The arrival time clock counter outputs a count value Arrival_time_clock(i) at a time (i).

The main TS and the audio TS are each composed of a data string having, as a unit, a source packet including a transport packet and an arrival time stamp therefor. A source packet includes a transport packet and its arrival_time_stamp (ATS). The arrival_time_stamp is a time stamp indicating the time of arrival of the corresponding transport packet at the decoder. The time axis, formed on the basis of the arrival_time_stamp of each source packet, making up each stream, is termed the arrival timebase, its clock being termed the ATC (arrival time clock).

When the arrival_time_stamp of the current source packet, as read out from such main TS, is equal to the LSB side 30 bits of the count value arrival_time_clock(i) of the arrival time clock counter 42, the transport packet of the source packet is output from the source depacketizer 41. $R_{TS\_m}$ is the bit rate of the main TS.

In the player for audio data 36, the source packet data, read out from the read buffer for audio TS 34 of the previous stage, is sent to the source depacketizer 44 at a bit rate $R_A$, as shown in FIG. 30B. The bit rate $R_A$ is a bit rate of the source packet stream of the audio TS file.

An arrival time clock counter 45 and a pulse oscillator 46 operates similarly to the player for the main TS 35. The source depacketizer 44 operates similarly to the player for the main TS 35. That is, when the arrival_time_stamp of the current source packet is equal to the value of the LSB side 30 bits of the count value arrival_time_clock(i) of the arrival time clock counter 45, the transport packet of the source packet is output from the source depacketizer 44. $R_{TS\_A}$ is the bit rate of the audio TS.

Figure 31:
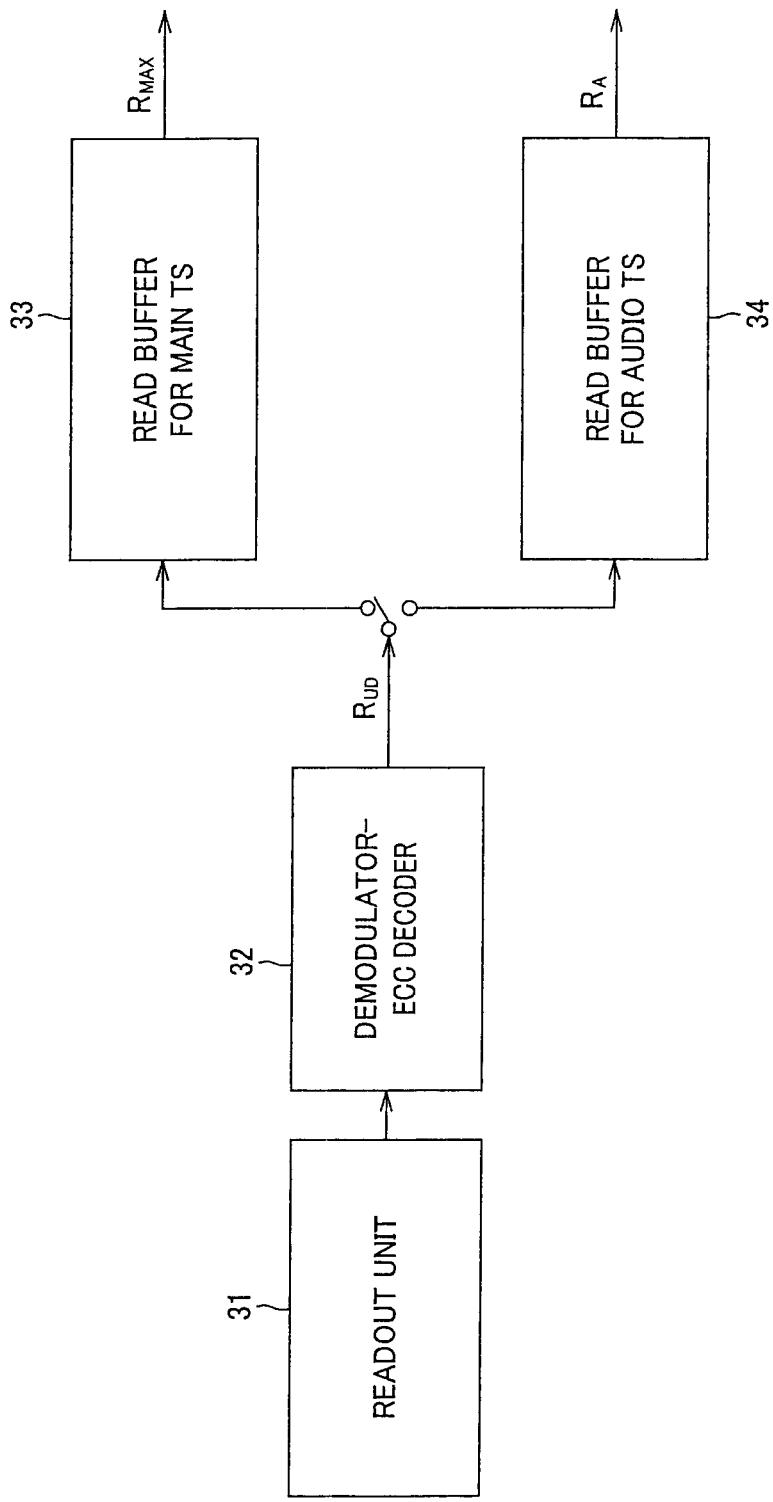
FIG. 31 is a block diagram showing a buffer model of a Browsable slide show.

FIG. 31 shows the concept of a buffer model of the slide show of the browsable mode. In the browsable mode, when the main TS file, as a file of still pictures referenced by the PlayItem, and the audio TS file, referenced by the SubPlayItem, are alternately read out from the drive at a rate of $R_{UD}$, the bit rate $R_{MAX}$ of the source packet stream of the main TS and the bit $R_A$ of the source packet stream of the audio TS need to be warranted. To this end, when the main TS and the audio TS are recorded after encoding by the still picture encoder 14 and the audio encoder 11 of FIG. 10, respectively, limitations must be imposed on the upper limit value of the respective bit rates.

Figures 32A, 32B:
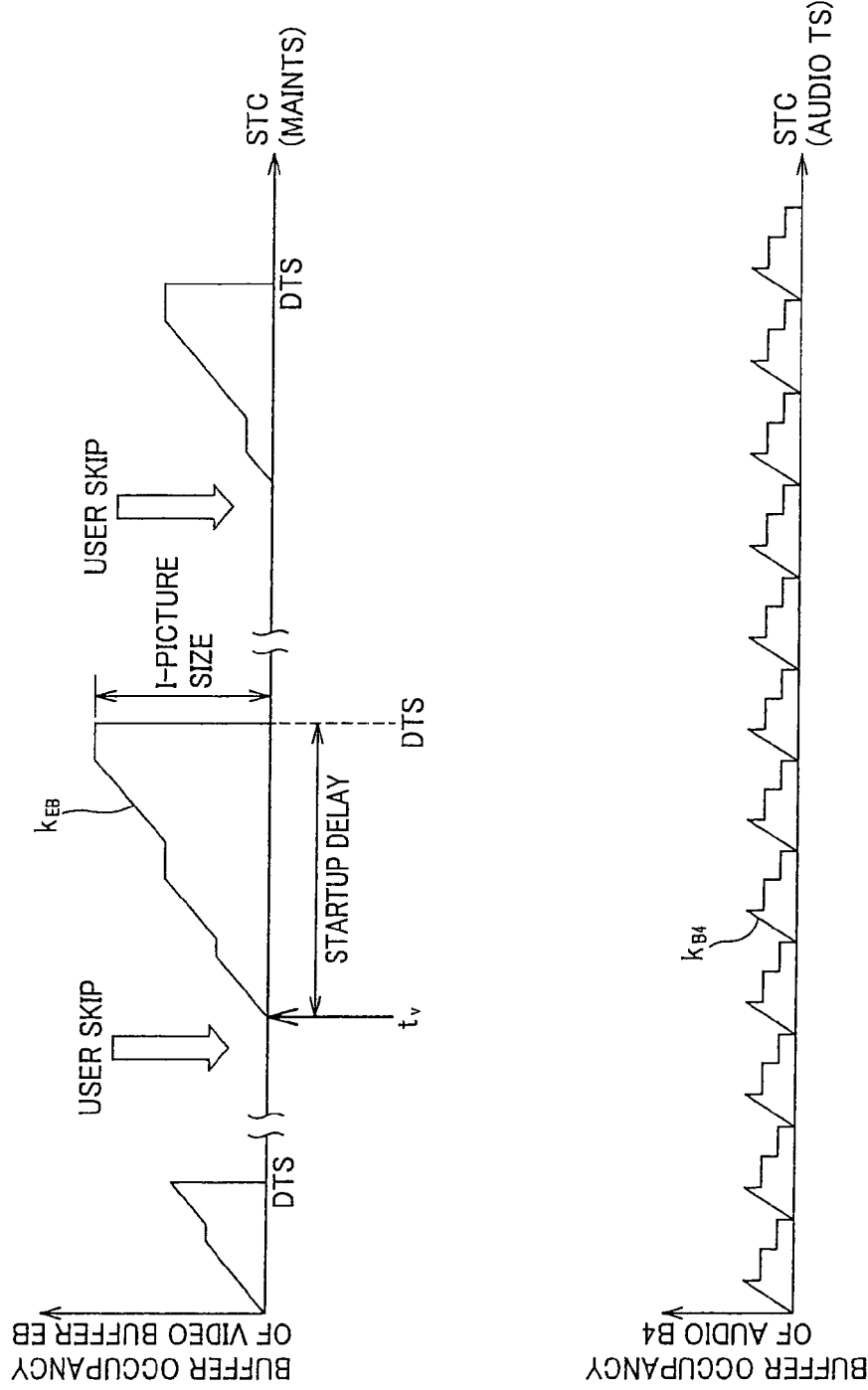
FIG. 32A shows the amount of bits taking up an EB buffer (video code buffer) during the slide show of the browsable mode and FIG. 32B shows the amount of bits taking up a B4 buffer (audio code buffer).

FIGS. 32A and 32B are graphs showing typical bit takeup volumes of the elementary stream buffer EB (video code buffer) and those of the audio code buffer B4 during the slide show of the browsable mode shown in FIG. 29. In FIGS. 32A and 32B, the ordinate stands for the buffer takeup ratio of the video code buffer and that of the audio code buffer, while the abscissa stands for the system time clocks STC of the main TS and the audio TS.

In FIG. 32A, the start up delay depicts the time as from the input time $t_v$ of the first video packet until an I-picture is buffered in the elementary stream buffer EB, that is, decoding time stamp (DTS). The aforementioned first video packet starts to be entered when the user skips to the next slide in the browsable mode. In FIGS. 32A and 32B, a tilt $k_{EB}$ stands for the input rate to the video buffer EB, while a tilt $k_{B4}$ stands for an input rate of the audio buffer B4. Meanwhile, the time in which the tilt $k_{EB}$ is zero and the video code takeup ratio is constant means the time when the auxiliary picture information, such as graphics or titles, is being read out.

If reading out the source packet stream of the main TS at a bit rate $R_{MAX}$ is warranted, the still picture may be decoded in the video decoder D1 of the downstream side stage, shown in FIG. 29, so that the decoded still picture will be in time for the preset decoding timing. Moreover, if it is warranted that the source packet stream of the audio TS be read out at the bit rate $R_A$, the audio data can be decoded in time for the preset decoding timing in the audio decoder D4 of the downstream side stage, shown in FIG. 29.

Figure 33:
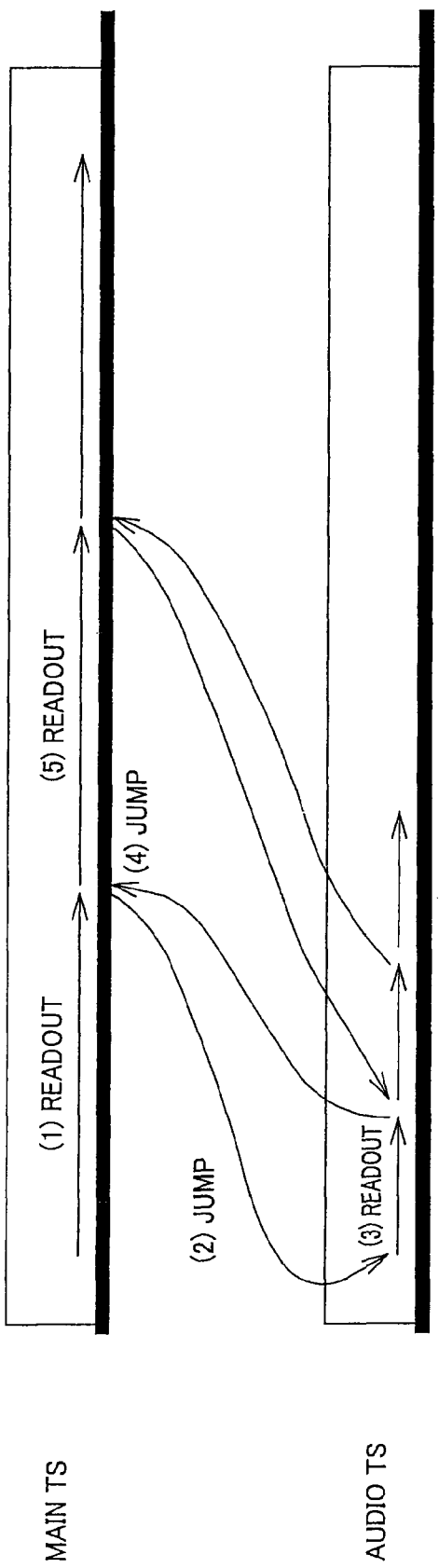
FIG. 33 is a schematic view for illustrating the method for concurrent readout of a main TS and an audio TS in a browsable slide show.

FIG. 33 schematically shows a model of the method for concurrently reading out the main TS and the audio TS in the slide show of the browsable mode.

It is assumed that the main TS and the audio TS are continuously arranged on the disc. In this case, the main TS and the audio TS are read out alternately as follows:
(1) A preset volume X of the data is read out from the main TS;
(2) Skipping is made to a preset data position of the audio TS;
(3) A preset volume Y of the data is read out from the audio TS;
(4) Skipping is made to a preset data position of the main TS and a preset volume X of the data is read out from the main TS.

The data volume X, read out from the main TS in one read action, is the necessary size of the read buffer for main TS 33. The data volume Y, read out from the audio TS in one read action, is the necessary size of the read buffer for audio TS 34. The equations, shown below, depict the equations for calculating the size necessary for the read buffer for main TS 33 and for the read buffer for audio TS 34:

$$x = R_{MAX} \times \left(2 \times Tj + \frac{y}{R_{UD}}\right)$$
$$y = R_A \times \left(2 \times Tj + \frac{y}{R_{UD}}\right)$$

where x is the size needed for the read buffer for main TS 33=data volume read out by one read action from the main TS;

y is the size needed for the read buffer for audio TS 34=data volume read out by one read action from the audio TS;

$T_j$: jump time;

$R_{UD}$ is the readout bit rate from the drive;

$R_{MAX}$ is the bit rate of the source packet stream of the audio TS; and $R_A$ is the bit rate of the source packet stream of the audio TS.

For example, if the readout bit rate from the drive $R_{UD}$ is 54 Mbps, the jump time $T_j$ is 0.8 second, the bit rate of the source packet stream of the audio TS $R_{MAX}$=20 Mbps and the bit rate of the source packet stream of the audio TS $R_A$ is 640 kbps, the size x needed for the read buffer for main TS 33 is 4.06 Mbytes and the size y needed for the read buffer for audio TS 34 is 0.176 Mbps.

(3-3) Other Examples of Still Picture Data

Figure 34:
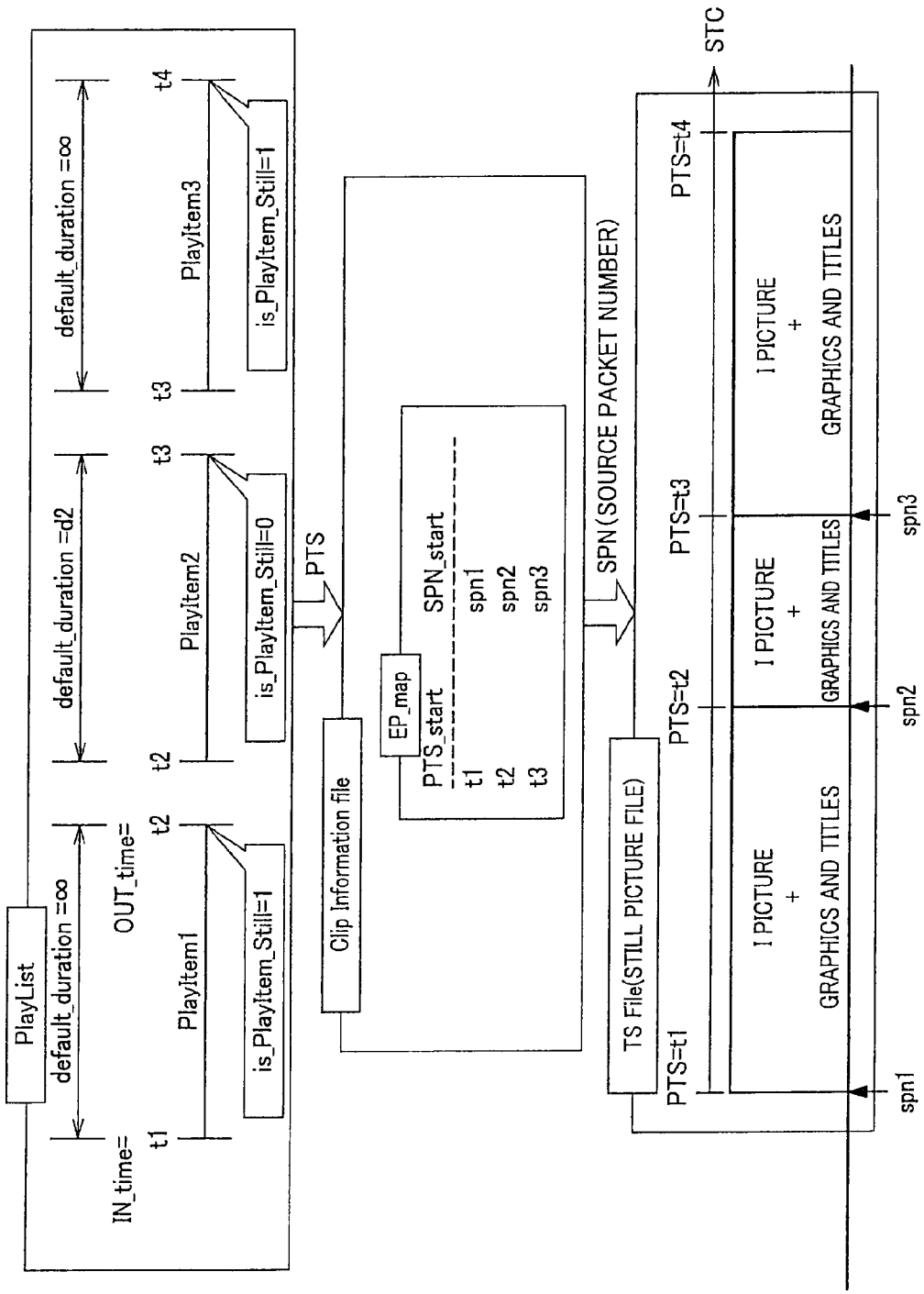
FIG. 34 shows the relationship between the PlayList, Clip Information file and data arrangement of the relevant still picture file on the recording medium (disc) in case an I-picture is used as still picture data.

In the explanation with reference to FIG. 23, the data format of the still pictures is JPEG, PNG. However, the data format may also be other still picture data formats, such as MPEG2 I-picture, GIF or JPEG2000. FIG. 34 shows a case in which an MPEG2 I-picture (intra-frame encoded picture) is multiplexed on a transport stream. Specifically, FIG. 34 shows the PlayList when using an I-picture (intra-frame encoded picture) as still picture data, the Clip Information and a data structure recorded on the recording medium. The data structure differs from that shown in FIG. 23 only in the picture being the I-picture (intra-frame encoded picture), with the relationship between the PlayList and the EP_map on one hand and the transport stream being unchanged. In this case, the SubPlayItem, showing the replay path for audio data against the PlayList, may be appended as in the case shown in FIG. 28.

In similar manner, the data format for the still picture in the explanation of FIG. 22 is the JPEG, PNG. However, the data format for the still picture, such as MPEG1 I-picture, GIF or JPEG2000, may also be used. Moreover, in this case, audio data may be multiplexed on the transport stream file (still picture file), in the same way as the case shown in FIG. 25.

Figure 35:
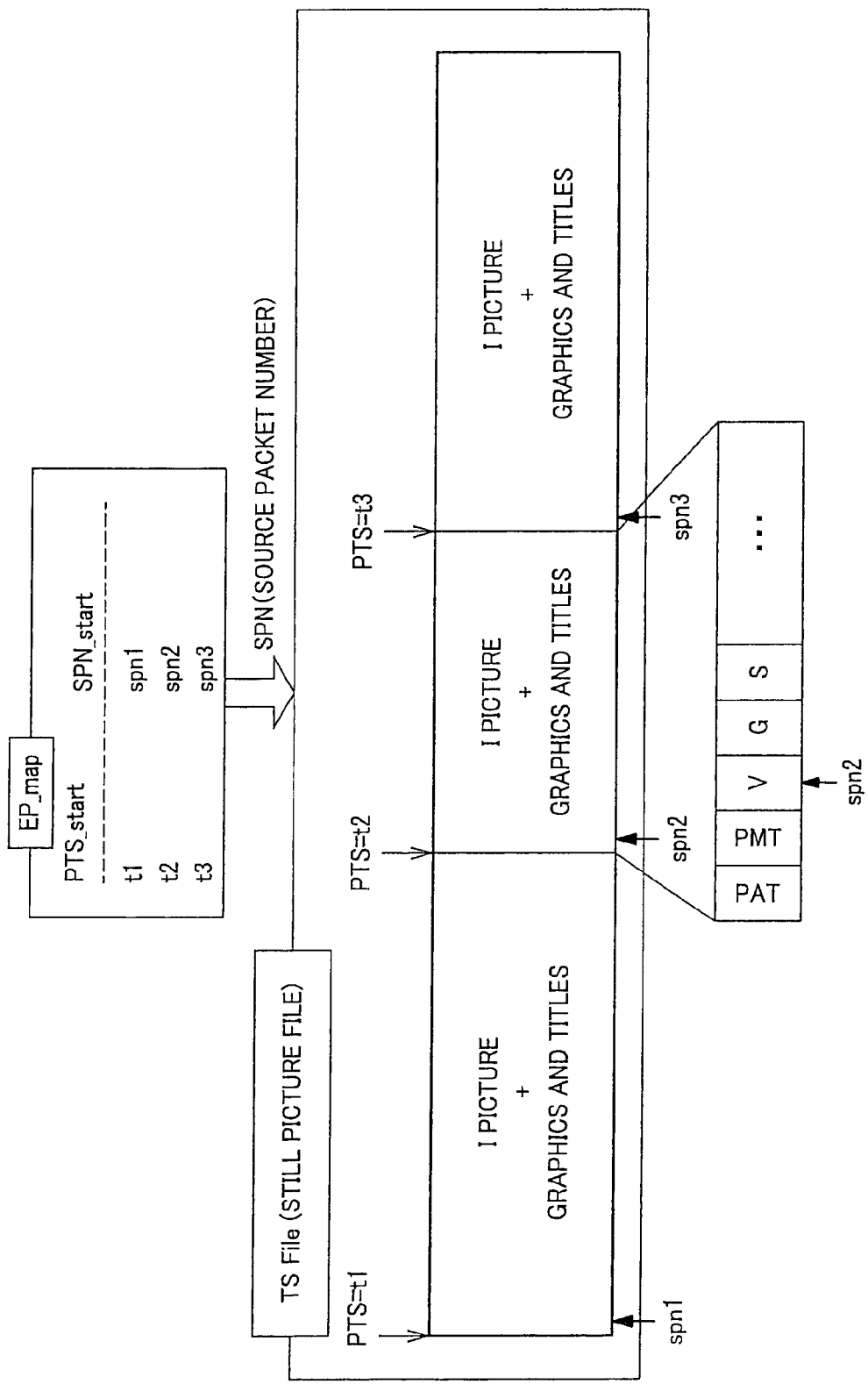
FIG. 35 is a schematic view for illustrating an example of a source packet indicated in a transport stream file (still picture (I-picture) file).

The two methods by which the EP_map of FIG. 34 points to the source packet in the transport stream file (still picture file) are hereinafter explained. In the transport stream file, shown in FIG. 35, each I-picture begins with a sequence header and, as in the explanation of the aforementioned prior-art example 2, the packet including the first packet of the sequence header is pointed to by the EP_map.

In this case, graphics 'G' or the title 'S', overlaid (reproduced in synchronism) on the still picture, is multiplexed in rear of the video packet specified by the EP_map.

Figure 36:
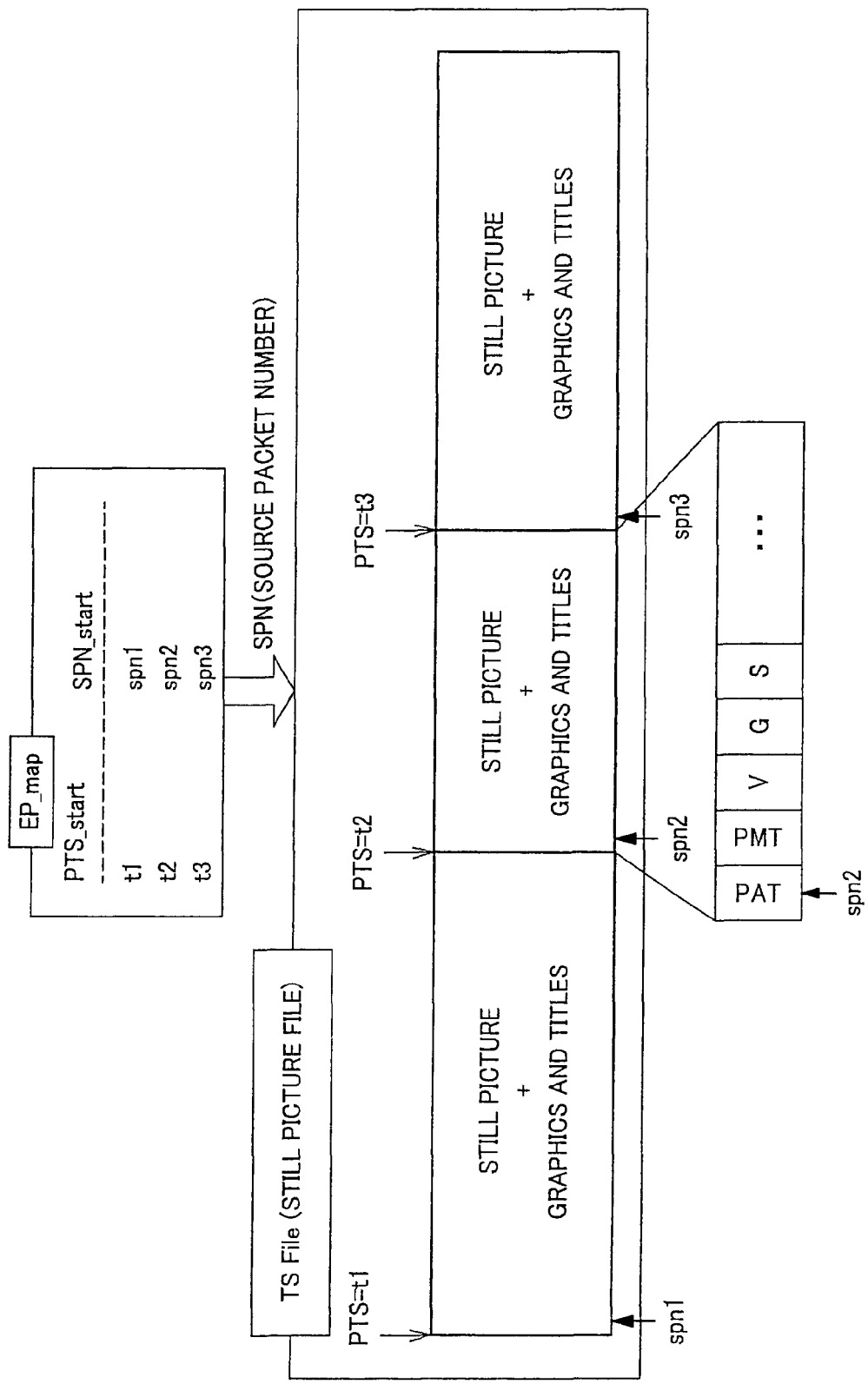
FIG. 36 is a schematic view for illustrating another example of a source packet indicated in a transport stream file (still picture (I-picture) file).

In the transport stream file, shown in FIG. 36, the PAT and the PMT, as the system information of the MPEG2 transport stream, are multiplexed ahead of a packet containing the first byte of the sequence header, and the packet, containing the packet, is pointed to by the EP_map.

If, in the transport stream file (still picture file), the I-picture and the graphics or the titles overlaid thereon are multiplexed on the transport stream, the data structure, shown as an I-picture, may be of any of the following two structures. The first structure is such a one in which a sequence end code directly follows a sole I-picture. The second structure is such a one in which the still picture is encoded as a video sequence, in which plural pictures equivalent to the replay time of the PlayItem are encoded. That is, the second structure is such a one composed of an I-picture, a plural number of P-pictures (inter-frame forward predictive-coded pictures) and a plural number of B-pictures (inter-frame bi-directional predictive-coded pictures). The P- and B-pictures, predicted from the I-picture, encode a still picture as video, and hence do not have prediction data, such that these P- and B-pictures are encoded using a so-called skipped macro-block of the MPEG2. In the above-described first and second structures, the I-picture is preceded by a sequence header.

The PlayItem for the slide show of the present embodiment and the PlayItem for the reproduction of a moving picture, as explained in the above-described prior-art example 2, may co-exist in a sole PlayList. The user may then be able to enjoy the replay of moving pictures and the replay of a still picture in the reproduction of a sole PlayList.

(3-4) Structure of the Information Processing Apparatus (Recording Apparatus)

In the above-described third embodiment of the present invention, shown in FIGS. 20 to 36, the recording apparatus (information processing apparatus) may be constructed as in the first embodiment. That is, referring to FIG. 10, the information processing apparatus 1 includes a still picture encoder 14, supplied with a still picture via terminal 13 for encoding the picture, an audio encoder 11, supplied with audio data via terminal 10 for encoding the data, a controller 16, supplied with the picture attribute information and the audio attribute information from the still picture encoder 14 and the audio encoder 11, respectively, to generate the aforementioned PlayList and the Clip Information, and a recorder 17, supplied with the PlayList and the Clip Information from the controller 16, for recording on a recording medium, such as Blu-ray Disc, and for recording the still picture and the audio data in a preset format on the recording medium.

In case the replay start time of each still picture is predetermined, the controller 16 receives the replay start time and the replay time duration (display time duration) of each still picture, as the information pertinent to the replay contents of the slide show. If the audio data is reproduced in synchronism with the slide show, as shown in FIG. 25, the controller receives the replay start time and the replay time duration (display time duration) of the audio data reproduced in synchronism with each still picture. If, as shown in FIG. 21, described previously, the slide show is such a one in which the replay start time of each still picture is not determined, and only the replay sequence thereof is determined, the controller receives the replay sequence and the default replay time of each still picture. In case the slide show is such a one in which audio data not synchronized to the slide show is reproduced, the controller receives the information indicating the replay domain in the audio stream, in addition to the replay sequence and the default replay time of the respective still pictures, as shown in FIG. 28. The controller 16 is also supplied with the replay time of the respective pictures (PTS_start) of the respective pictures, and the corresponding source packet number (SPN_start), as the picture attribute information, to formulate the Clip Information corresponding to the EP_map shown in FIG. 22.

From the so supplied information, the controller 16 references the replay time (PTS_start) of the respective pictures stated in this Clip Information to formulate the PlayList indicating the replay path for the still pictures and the audio data. In the case of the browsable slide show, the controller formulates the Clip Information for audio data (audio attribute information) including a table (EP_map for audio data) specifying the relationship between the replay time of the audio data and the address of the minimum access unit of the audio stream (access point).

The recorder 17 records the Clip Information and the PlayItem on the recording medium 18, while recording the data in accordance with such information.

Figure 37:
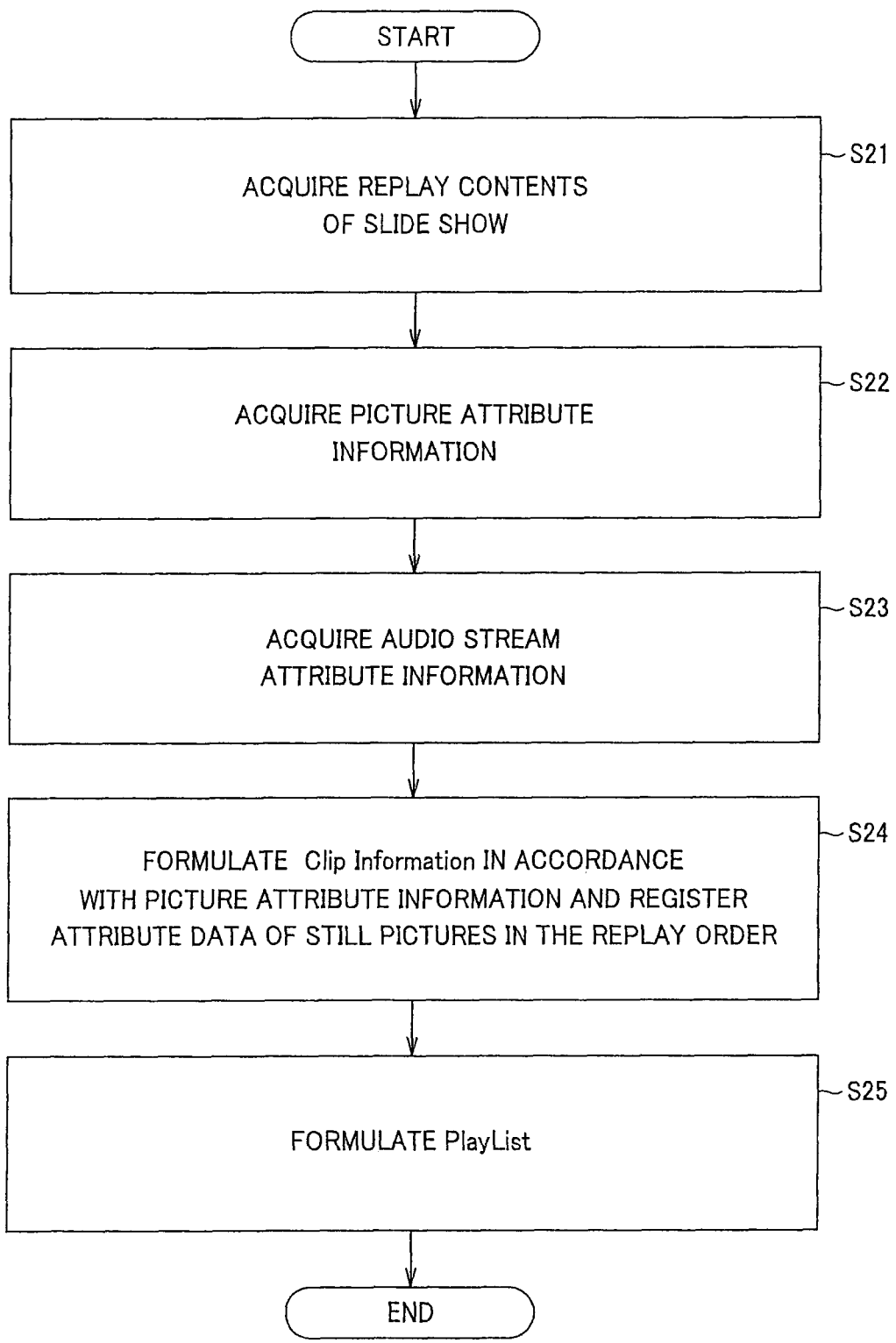
FIG. 37 is a flowchart showing the method for formulating the PlayList, out of the recording operations of the information processing apparatus according to the third embodiment of the present invention.

The recording operation of the information processing apparatus of the present embodiment is now explained. FIG. 37 depicts a flowchart showing the method for formulating the PlayList, out of the recording operations by the information processing apparatus of the present embodiment. First, the still picture encoder 14 encodes the still picture, supplied via terminal 13, to generate picture data, which is then sent to the recorder 17. The picture attribute information is sent to the controller 16. The audio encoder 11 encodes the audio data, supplied via terminal 10, to generate an audio stream, which is then supplied to the recorder 17. The audio encoder also sends the picture attribute information to the controller 16.

Referring to FIG. 37, the controller 16 acquires the replay contents of the slide show (step S21). That is, when the slide show and the audio data are AV-synchronized with each other, as described above, the controller receives the replay start time and the relay time duration of each still picture and the information pertinent to the replay time of the audio data reproduced in timed relation thereto. In case the slide show and the audio data are not AV-synchronized with each other, the controller receives the replay sequence and the default replay time of the respective still pictures, as well as the audio replay time information, via terminal 15.

The controller 16 then receives the picture attribute information, such as EP_map, from the still picture encoder 14 (step S22), while receiving the audio attribute information, such as EP_map for audio, from the audio encoder 11 (step S23). The controller 16 formulates the Clip Information, as the attribute information pertinent to the transport stream file (still picture file), in accordance with the picture attribute information (step S24). That is, the controller registers the replay time (PTS_start) of a picture, reproduced in the slide show and the corresponding source packet number (SPN_start) in the EP_map. The controller further refers to the replay time (PTS_start) of the picture of the EP_map of the Clip Information to formulate the PlayList indicating the replay domain (replay path) of the slide show, based on the information supplied from outside, while formulating the PlayList indicating the replay path for audio data (step S25). Additionally, the controller 16 commands the recorder 17 to record the playList and the Clip Information.

The recorder 17 records the PlayList and the Clip Information, formulated in the controller 16, on the recording medium 18, while also recording the picture data and the audio data, generated in the still picture encoder 14 and in the audio encoder, on the recording medium. At this time, the recorder 17 records the transport stream file (still picture file) continuously on the recording medium 18.

In the information processing apparatus, as the recording apparatus, constructed as described above, one or more still pictures, are supervised as a transport stream file (still picture file) composed of the one or more still pictures, collected together into a file, while the information of the EP_map, supervising the respective still pictures contained in the file, is supervised as the Clip Information. The PlayItem, specifying the replay of the respective still pictures in the slide show, is used. Thus, it is possible to record data, which realizes the slide show, as the compatibility with the recording apparatus for moving pictures, stated in the aforementioned prior-art example 2, is maintained. That is, the transport stream file of still pictures is provided in place of the AV stream file in the moving pictures. By providing the Clip Information file for referencing the still picture in the transport stream file, and by specifying the replay thereof by the PlayList, the Clip (Information file) and the PlayList may be used in common with those in the moving picture data format.

(3-5) Structure of the Information Processing Apparatus (Reproducing Apparatus)

The information processing apparatus, as the recording apparatus of the present embodiment, may be constructed similarly to the first embodiment. That is, referring to FIG. 14, an information processing apparatus 20 is made up by a readout unit 21 for reading out data from a recording medium, a controller 22, supplied with the PlayList and the ClipInformation, read out from the readout unit 21, a still picture decoder 23 and an audio decoder 26, supplied with the still picture data and the audio data, read out by the readout unit 21, respectively, a frame buffer 24 for transiently holding the decoded still pictures, and a processor 25 for controlling the replay of the still pictures.

The controller 22 refers to the PlayList to acquire the IN_time of still picture data to be reproduced, and causes the still picture decoder 23 to read out and decode the still picture data specified by the IN_time of the acquired still picture data. It is noted that, in reproducing the slide show in which the replay time for the still pictures is set to infinite, the controller 22 is supplied with the user's command over user interface 27, such that the IN_time of the still picture data reproduced next may be acquired by the timing of the user's command to effect the readout operation. Lacking the user's command, the IN_time of the still picture data reproduced next is acquired to effect the readout operation.

In the case of the browsable slide show, the controller 22 refers to the Play List to acquire the replay time of the audio data reproduced. The controller 22 refers to the Clip Information of an audio stream to acquire the address of the audio stream corresponding to the replay time, and commands the readout unit 21 to read out the relevant audio data.

Figure 38:
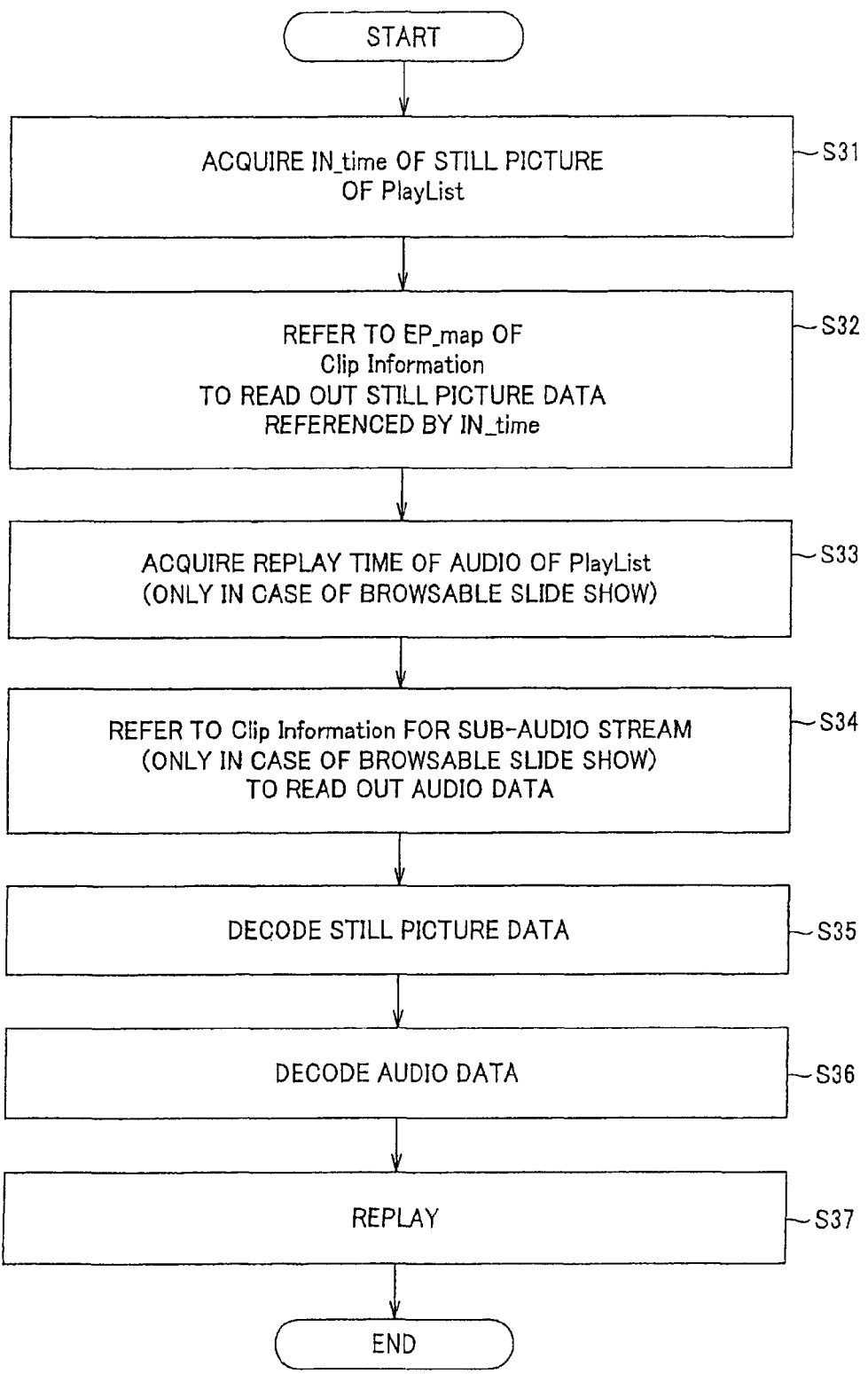
FIG. 38 is a flowchart showing the reproducing operation in the information processing apparatus according to the third embodiment of the present invention.

The operation of the present information processing apparatus is now explained in detail. FIG. 38 is a flowchart illustrating the replay operation in the present embodiment of the information processing apparatus. Referring to FIG. 14, the readout unit 21 reads out the Play List and the Clip Information to send the so read out information to the controller. The controller 22 acquires the IN_time discriminating the still picture of the Play Item specifying the replay path of the still picture of the Play list (step S31). The controller 22 refers to the EP_map of the Clip Information to specify the still picture file indicated by the IN_time of the still picture to read out the still picture file by the readout unit 21 from the transport stream file (step S32).

In the case of the Browsable slide show, the controller 22 acquires the audio replay time in accordance with the Play Item specifying the audio replay path of the PlayList (step S33). The controller 22 refers to the Clip Information of the sub-audio stream (Auxiliary audio stream) to acquire the address information with which the decoding of the stream is to be initiated in the audio stream file. The controller then manages control so that audio data will be read out by the readout unit 21 (step S34) from the audio stream file based on the so acquired address information.

The still picture decoder 23 decodes in a step S35 the still picture data, read out in a step S32, and sends the decoded picture to the frame buffer 24. The audio decoder 26 in a step S36 decodes the audio data read out in the step S14 to output the so decoded audio data. The controller 22 sends a preset command to the processor 25. The frame buffer 24 reproduces the picture, stored therein, at a preset timing, in accordance with the command (step S37).

In the step S31, the controller 22 acquires the IN_time of the still picture of the PlayItem reproduced next, that is, the timing x1 which is the elapsed default replay time of the still picture of the PlayItem currently reproduced, or the timing x2 at which the command for switching the still picture is received from the user interface 27. The replay of the Play List comes to a close when the last still picture of the Play Item has been reproduced.

That is, if the replay start time of each still picture shown in FIG. 20 is predetermined, the IN_time of the still picture of the PlayItem, reproduced next, is read out at the timing x1, that is, at a timing when the finite time of the default_duration of the Play Item has elapsed. The controller 22 then is able to send out a command to the readout unit 21 to read out the corresponding still picture. If, in the PlayItem in which the infinite default_duration, as shown in FIG. 21, has been set, the user is allowed to instruct the switching of the still pictures, the controller is able to read out the IN_time of the still pictures, such as PlayItem, reproduced next, at a timing of the user's instructions to switch the still pictures, to instruct the readout of the corresponding still picture.

The present invention is not limited to the above-described embodiments and may be changed as desired within a range not departing from the purport of the invention. For example, although the recording apparatus is distinct in the above-described embodiments from the reproducing apparatus, an apparatus for recording and/or reproducing apparatus may be used. Although the above-described embodiments refer to the hardware structure, this is merely illustrative and an optional processing may be realized by having a CPU (Central Processing Unit) execute a corresponding computer program. In this case, the computer program may be provided in a form it is recorded on the recording medium, or in a form it is transmitted over a transmission medium, such as the Internet.

INDUSTRIAL APPLICABILITY

The information processing apparatus, described in detail hereinabove, comprises attribute information formulating means for formulating the picture attribute information supervising each still picture of one or more still pictures forming a set of still pictures, replay control information formulating means for formulating the replay control information indicating a replay path specifying replay of at least a fraction of the still pictures of the set of still pictures, recording means for recording the set of the still pictures, the picture attribute information corresponding thereto and the replay control information, on a recording medium, reproducing means for reading out and reproducing the still pictures from the recording medium, and controlling means for referring to the picture attribute information for controlling the reproducing means in accordance with the replay control information. The replay control information formulating means formulates the replay control information using the picture attribute information. Thus, the picture attribute information and the replay control information are recorded on the recording medium, apart from the set of the still pictures, so that, in reading out and reproducing the still pictures from the recording medium, the picture attribute information and the replay control information may be read out first and the respective still pictures of the set of the still pictures may be generated in a preset order, with the result that the consecutive replay of the still pictures (so-called slide show) may readily be achieved.

The invention claimed is:

1. An information processing apparatus comprising:
processing circuitry configured to
formulate picture attribute information supervising respective still pictures of a set of said still pictures;
formulate replay control information being a playlist, the replay control information specifying a replay path of said set of said still pictures; and
control recording of said set of the still pictures, said picture attribute information associated with said set of the still pictures, and said replay control information associated with said set of the still pictures,
wherein said replay control information being the playlist further includes, individually for each still picture of said set of the still pictures, picture replay control information indicating whether the still picture is to be displayed continuously until user intervention or whether the still picture is to be displayed only for a finite amount of time, and
wherein the processing circuitry is configured to control recording of said set of the still pictures, said picture attribute information associated with said set of the still pictures, and said replay control information associated with said set of the still pictures on a Blu-ray disc.

2. The information processing apparatus according to claim 1, wherein when the picture replay control information indicates that the still picture is to be displayed for a finite amount of time, the picture replay control information further includes an indication of a duration of a display period.

3. The information processing apparatus according to claim 1, wherein the picture replay control information includes information specifying a replay start time and a replay end time for the respective still picture.

4. The information processing apparatus according to claim 1, wherein the replay control information further includes sub information indicating whether or not replay of audio is asynchronous to the replay of the still picture.

5. The information processing apparatus according to claim 4, wherein the replay control information further includes sub information providing repetition information relating to the replay of the audio.

6. The information processing apparatus according to claim 1, wherein each still picture of said set of still pictures corresponds to a playitem in the playlist.

7. A method comprising:
formulating picture attribute information supervising respective still pictures of a set of said still pictures;
formulating replay control information being a playlist, the replay control information specifying a replay path of said set of said still pictures; and
controlling recording of said set of the still pictures, said picture attribute information associated with said set of the still pictures, and said replay control information associated with said set of the still pictures,
wherein said replay control information being the playlist further includes, individually for each still picture of said set of the still pictures, picture replay control information indicating whether the still picture is to be displayed continuously until user intervention or whether the still picture is to be displayed only for a finite amount of time, and
wherein the controlling further controls recording of said set of the still pictures, said picture attribute information associated with said set of the still pictures, and said replay control information associated with said set of the still pictures on a Blu-ray disc.

8. The method according to claim 7, wherein when the picture replay control information indicates that the still picture is to be displayed for a finite amount of time, the picture replay control information further includes an indication of a duration of a display period.

9. The method according to claim 7, wherein the picture replay control information includes information specifying a replay start time and a replay end time for the respective still picture.

10. The method according to claim 7, wherein the replay control information further includes sub information indicating whether or not replay of audio is asynchronous to the replay of the still picture.

11. The method according to claim 10, wherein the replay control information further includes sub information providing repetition information relating to the replay of the audio.

12. A non-transitory computer readable medium having stored thereon a program that when executed by a computer causes the computer to execute a method comprising:

formulating picture attribute information supervising respective still pictures of a set of said still pictures;

formulating replay control information being a playlist, the replay control information specifying a replay path of said set of said still pictures; and controlling recording of said set of the still pictures, said picture attribute information associated with said set of the still pictures, and said replay control information associated with said set of the still pictures, wherein said replay control information being the playlist further includes, individually for each still picture of said set of the still pictures, picture replay control information indicating whether the still picture is to be displayed continuously until user intervention or whether the still picture is to be displayed only for a finite amount of time, and wherein the controlling further controls recording of said set of the still pictures, said picture attribute information associated with said set of the still pictures, and said replay control information associated with said set of the still pictures on a Blu-ray disc.

13. The non-transitory computer readable medium according to claim 12, wherein when the picture replay control information indicates that the still picture is to be displayed for a finite amount of time, the picture replay control information further includes an indication of a duration of a display period.

14. The non-transitory computer readable medium according to claim 12, wherein the picture replay control information includes information specifying a replay start time and a replay end time for the respective still picture.

15. The non-transitory computer readable medium according to claim 12, wherein the replay control information further includes sub information indicating whether or not replay of audio is asynchronous to the replay of the still picture.

16. The non-transitory computer readable medium according to claim 15, wherein the replay control information further includes sub information providing repetition information relating to the replay of the audio.

* * * * *